US006702156B2

(12) United States Patent

Shimada et al.

(10) Patent No.: US 6,702,156 B2
(45) Date of Patent: Mar. 9, 2004

(54) NON-LEAKING NON-DRIPPING LIQUID JET PUMP

(75) Inventors: Shinji Shimada, Koto-ku (JP); Katsuhito Kuwahara, Koto-ku (JP); Takao Kishi, Koto-ku (JP); Takayuki Abe, Koto-ku (JP); Shuzo Endo, Koto-ku (JP); Yuji Kohara, Koto-ku (JP); Takamitsu Nozawa, Koto-ku (JP)

(73) Assignee: Yoshino Kogyosho, Co., Ltd., Tokyo (JP)

( * ) Notice: Subject to any disclaimer, the term of this patent is extended or adjusted under 35 U.S.C. 154(b) by 0 days.

(21) Appl. No.: 10/026,907

(22) Filed: Dec. 27, 2001

(65) Prior Publication Data

US 2002/0056731 A1 May 16, 2002

Related U.S. Application Data

(62) Division of application No. 09/584,500, filed on Jun. 1, 2000, which is a division of application No. 09/227,137, filed on Jan. 8, 1999, now Pat. No. 6,119,902, which is a division of application No. 08/716,174, filed as application No. PCT/JP96/00156 on Jan. 26, 1996, now Pat. No. 5,924, 604.

(30) Foreign Application Priority Data

| | | |
|---|---|---|
| Jan. 27, 1995 | (JP) | 7-31358 |
| Jan. 27, 1995 | (JP) | 7-31359 |
| Mar. 29, 1995 | (JP) | 7-98109 |

(51) Int. Cl.[7] .......... G01F 11/06
(52) U.S. Cl. .......... 222/321.7; 222/380
(58) Field of Search .......... 222/321.3, 321.7, 222/321.9, 380

(56) References Cited

U.S. PATENT DOCUMENTS

| | | | |
|---|---|---|---|
| 3,237,571 | A | 3/1966 | Corsette |
| 3,248,022 | A | 4/1966 | Schulman et al. |
| 3,406,909 | A | 10/1968 | Pfeiffer |
| 3,583,605 | A | 6/1971 | Corsette |
| 3,774,849 | A | 11/1973 | Boris |

(List continued on next page.)

FOREIGN PATENT DOCUMENTS

| | | |
|---|---|---|
| EP | 0 389 688 A | 10/1990 |
| EP | 0 486 378 A1 | 5/1992 |

(List continued on next page.)

OTHER PUBLICATIONS

Patent Abstracts of Japan, vol. 018, No. 325 (M–1625), Jun. 21, 1994 & JP 06 074147 A (Toyo Seikan Kaisha Ltd.), Mar. 15, 1994.

(List continued on next page.)

*Primary Examiner*—Joseph A. Kaufman
(74) *Attorney, Agent, or Firm*—Oliff & Berridge, PLC

(57) ABSTRACT

A liquid jetting pump of the present invention is constructed such that an intra container liquid is sucked into a cylinder 3 through a suction valve 9 by moving a vertically movable member 4 up and down, and the intra cylinder liquid is jetted out of a nozzle 29 through a discharge valve 31 from a stem 28. A plurality of ribs 10 are protruded in a peripheral direction from a lower edge part within the cylinder. Engagement recessed portions 11 are formed in inner parts of the upper surfaces of the ribs. A lower edge of a coil spring 38 for biasing the vertically movable member 4 is secured to each of the engagement recessed portions 11, thereby permitting a flow of liquid on both sides of the lower edge of the spring internally externally.

18 Claims, 59 Drawing Sheets

U.S. PATENT DOCUMENTS

| | | | |
|---|---|---|---|
| 4,057,176 | A | 11/1977 | Horvath |
| 4,065,038 | A | 12/1977 | Magers et al. |
| 4,071,172 | A | 1/1978 | Balogh |
| 4,133,457 | A | 1/1979 | Klassen |
| 4,624,413 | A | 11/1986 | Corsette |
| 4,930,670 | A | 6/1990 | Kuo |
| 4,991,746 | A | 2/1991 | Schultz |
| 4,991,747 | A | 2/1991 | Van Brocklin |
| 5,234,135 | A | 8/1993 | LaFosse et al. |
| 5,447,258 | A | 9/1995 | Suzuki |

FOREIGN PATENT DOCUMENTS

| | | | |
|---|---|---|---|
| EP | 0 487 412 | A | 5/1992 |
| FR | 2 054 453 | A | 4/1971 |
| GB | 1 304 903 | | 1/1973 |
| GB | 1 414 637 | A | 11/1975 |
| GB | 2 179 406 | A | 3/1987 |
| JP | U-51-86341 | | 7/1976 |
| JP | U-52-95755 | | 7/1977 |
| JP | B2-60-140273 | | 9/1985 |
| JP | 61-140273 | | 8/1986 |
| JP | U-179760 | | 12/1989 |
| JP | 2-59164 | | 4/1990 |
| JP | U-29466 | | 3/1991 |
| JP | Y2-4-23815 | | 6/1992 |
| JP | Y2-5-47099 | | 12/1993 |
| WO | WO 93/25319 | | 12/1993 |
| WO | WO 95/00253 | | 1/1995 |

OTHER PUBLICATIONS

Patent Abstracts of Japan vol. 013, No. 498 (M–890), Nov. 9, 1989 & JP 01 199862 A (Tada Gijutsu Kenkyusho: KK), Aug. 11, 1989.

NON-LEAKING NON-DRIPPING LIQUID JET PUMP

This is a Division of application No. Ser. 09/584,500 filed Jun. 1, 2000, which in turn is a Divisional of application Ser. No. 09/227,137, filed Jan. 8, 1999 now U.S. Pat. No. 6,119,902, which in turn is a Divisional of application Ser. No. 08/716,174, filed Sep. 18, 1996, which is the U.S. National Stage of International Application No. PCT/JP96/00156 filed Jan. 26, 1996 now U.S. Pat. No. 5,924,604. The entire disclosure of the prior applications is hereby incorporated by reference herein in its entirety.

TECHNICAL FIELD

The present invention relates generally to a variety of improvements of a liquid jet pump and, more particularly, to a pump suitable for jetting a liquid exhibiting a high viscosity.

BACKGROUND ART

There is a push-down head type of pump as a liquid jetting pump. For example, as illustrated in FIG. 7, a well-known pump includes a mounting cap 102 fitted to an outer periphery of a neck portion 101 of a container 100 and a cylinder 104 fixed to an interior of the container through the cap and having a suction valve 103 provided in an inner lower edge part extending downward within the container. The pump also includes a stem 106 having an annular piston 105 fitted to the interior of the cylinder and protruding from a lower part of the outer periphery thereof while being so provided as to be vertically movable in an upward biased state within the cylinder. The pump further includes a head 108 with a nozzle 107, this head being provided in continuation from an upper edge of the stem 28 and a coil spring 111 for always biasing upward a vertically movable member 110 constructed of a discharge valve 109 provided in an inner upper part of the stem, the stem and the push-down head. A liquid within the container is sucked into the cylinder 104 through the suction valve 103 by moving the vertically movable member up and down, and the intra cylinder liquid is jetted out of the tip of the nozzle 107 through the discharge valve 109 from the stem.

Further, an engagement member 112 fixedly fitted to an upper part of the cylinder is helically attached to an outer surface of the upper part of the vertically movable member in a state where the vertically movable member is pushed down. On this occasion, the lower edge part within the stem is liquid-tightly sealed by a cylindrical member 13 fixed to the lower edge of the cylinder.

Moreover, the cylinder lower edge part is reducible in diameter, and a plurality of ribs 114 are provided in a peripheral direction on the inner surface of the diameter-reducible portion. The coil spring 111 is attached by securing it slower edge to the upper surface of each of the ribs 114 through a flange of the cylindrical member 113 and fitting its outer surface to the inner surface of the diameter-reducible portion.

In this type of conventional pump, when the vertically movable member is raised after jetting the liquid by pushing down the vertically movable member, as illustrated in FIG. 7, the liquid to be sucked into the cylinder is sucked zig-zag. If a viscosity of the liquid to be reserved is high, a suction quantity per unit time is small (conspicuous with a viscosity as high as over 4000 cps), and, as a result, there is such an inconvenience that it takes much time from the vertically movable member to return to a maximum ascent position.

It is a first object of the present invention, which was contrived to obviate the defects inherent in the above prior art, to provide an excellent liquid jetting pump enabling the vertically movable member to quickly return to the ascent position even when containing the high-viscosity liquid and easy to manufacture at a low cost by modifying a slight part of structure of this type of conventional pump.

In addition to the above object, the present invention aims at solving the technical problems that the liquid jetting pump is desired to obviate as will hereinafter be described.

According to the conventional pump, there are disadvantages in which the liquid remaining in the nozzle after jetting the liquid drops out of the tip thereof, and the liquid remaining at the tip edge part within the nozzle is to be dry-solidified. This dry-solidification is neither desirable in appearance nor preferable because of hindering the jetting operation of the liquid as the case may be.

It is a second object of the present invention to provide an excellent liquid jetting pump capable of eliminating the liquid leakage and, besides, preventing the dry-solidification of the liquid as much as possible as well as providing an improvement of the prior art pump described above.

Further, there is provided a pump exhibiting such an advantage that the pump can be easily manufactured at the low cost because of being manufactured by modifying a slight part of the structure of the prior art pump.

A pump type liquid discharge container has the following defect. If the liquid contained has a relatively high viscosity, the liquid remaining within a nozzle hole after finishing the discharge of the liquid may drop out of the tip of the nozzle hole, and this liquid dropping may spoil a reliability of a consumer on the discharge container.

For eliminating the above defects, as disclosed in Japanese Utility Model Laid-Open Number 1-17976, the present applicant has applied a liquid discharge container constructed such that the bar-like portion is erected from an inner lower part of the cylinder, the upper part of the bar-like portion is inserted into the stem constituting a part of the operating member, the bar-like portion is inserted long into the stem when pushing down the operating member, the stem is negative-pressurized while removing the bar-like portion from within the stem when the operating member rises, and the liquid within the nozzle of the push-down head fitted to the upper edge of the stem can be thus sucked back.

In the above liquid discharge container, when the operating member is raised, the bar-like portion erecting from within the lower part of the cylinder is removed from within the stem, and the intra nozzle liquid is sucked back by the negative-pressuring the interior of the stem due to the removable thereof. Hence, if the operating member is insufficiently pushed down, a length of insertion of the bar-like portion inserted into the stem is also short. Accordingly, there is also insufficient negative-pressurization in the interior of the stem due to the removable of the bar-like portion when the operating member is raised, and there exists a defect in which the intra nozzle liquid is insufficiently sucked back due to the insufficient negative-pressurization.

It is another object of the present invention to obviate such a defect.

DISCLOSURE OF INVENTION

According to a first characteristic point of the present invention, for accomplishing the above objects, a liquid jetting pump comprising a mounting cap 2 fitted to a container neck portion, a cylinder 3 fixed to a container through the cap 2 and including a suction valve 9 provided in a lower edge part extending downward within the container, a stem 28 having an annular piston 27 fitted to the interior of the cylinder 3 and protruding from a lower part of the outer periphery thereof while being so provided as to be vertically movable, a push down head 30, with a nozzle 29, so provided in continuation from an upper edge of the stem 28 as to be vertically movable above the mounting cap 2, a discharge valve 31 provided in an upper part within the stem 28 and a coil spring 38 for always biasing upward a vertically movable member 4 constructed of the stem and the push-down head. A liquid within the container is sucked into the cylinder 3 through the suction valve 9, and a liquid within the cylinder 3 is jetted out of the nozzle 29 via the discharge valve 31 from the stem by moving the vertically movable member 4 up and down, there is provided an improvement characterized in that a plurality of ribs 10 for securing the lower edge of the coil spring 38 are arranged at a lower edge part within the cylinder 3 in a protruded state in a peripheral direction, and liquid passageways 50 passing both on an inner side and on an outer side of the lower edge of the coil spring 38 are provided between the plurality of ribs.

Herein, if an engagement recessed portion 11 for receiving and securing the lower edge of the coil spring is provided on the upper surface of the rib. The engagement of the spring and securing the passageway are facilitated.

Further, the vertically movable member 4 is so constructed as to be possible of engaging by push-down, the engagement recessed portion 11 is formed as an engagement recessed portion 11 with its inside surface and upper surface opened, a flange 21 fixedly fitted to the lower edge part of each of the engagement recessed portions 11 is protruded from an outer periphery of a lower edge of a topped peripheral wall 20 and a window hole 23 communicating with an interior and an exterior of the peripheral wall 20, and there may be provided a cylindrical member 19 constructed so that an outer periphery of an upper edge of the peripheral wall 20 can be liquid-tightly fitted to an inner surface of the stem lower edge in a push-down engaged state.

Furthermore, an auxiliary spring 26 may be interposed between the cylindrical member 19 and a valve member 18 of the suction valve 9, and the suction valve member 18 is thereby always biased in a valve closing direction.

For example, the head 30 is raised from a state shown in FIG. 1 by detaching the helically fitted portion of the vertically movable member, and, when pushing down the thus raised head 30, the interior of the cylinder 3 is pressurized, with the result that the liquid in the cylinder passes inside through the stem 28 enough to open the discharge valve 31 and is jetted outside out of the nozzle 29 from the portion of the vertical cylinder 32 of the head. Subsequently when stopping the push-down of the head 30, the vertically movable member 4 is raised by a resilient force of the coil spring 38, and the interior of the cylinder 3 is negative-pressurized, whereby the discharge valve member 35 descends relatively to the vertically movable member 4, and the valve hole is closed. When the discharge valve 31 closes, the suction valve is opened by the negative pressure within the cylinder 3, and the intra container liquid is led into the cylinder 3 via the suction valve 9. Thereafter, the suction valve is closed by a biasing force of the auxiliary spring 26 as well as a self-weight of the suction valve member 18.

The thus led liquid flows across on both sides internally externally of the coil spring 38 and rises, with the result that the vertically movable member 4 is raised quickly.

According to a second characteristic of the present invention, a liquid jetting pump constructed to suck a liquid within a container mounted therein by pushing down a push-down head 226 and jet the liquid out of a nozzle 225 protruding forwardly of the head 226, wherein the nozzle 225 is so formed as to ascend forward obliquely, and there is provided a discharge valve 241 housing a ball-like valve member 243 for closing a valve seat 242 provided at a proximal edge part within the nozzle 25, the valve member 243 being movable back and forth within the nozzle 225.

Herein, in a liquid jetting pump comprising, a mounting cap 202 fitted to a container neck portion, a cylinder 203 fixed to a container through the cap 202 and including a suction valve 209 provided in a lower edge part extending downward within the container, a stem 222 provided so that said stem 222 is vertically movable in a central portion within the cylinder in an upward biased state, an annular piston 223 having its outer peripheral surface slidably fitted to the inner surface of the cylinder 203 and connected to a lower part of the outer surface of the stem 222 to permit a flow of liquid in the inner peripheral surface lower part, an annular auxiliary piston 224 so fitted to the lower part of the outer periphery of the stem as to be vertically movable at a predetermined stroke, having its outer peripheral surface slidably attached to the inner surface of the annular piston and formed so that a through-hole 229 holed in a peripheral wall portion of the stem is openable and closable, a head 226, with a nozzle 225, so provided in continuation from an upper edge of the stem as to be vertically movable above the mounting cap, and a discharge valve 241 incorporating a ball-like valve member 242 to make the valve member 243 movable back and forth within the nozzle, a valve member 243 serving to close valve seat 242 provided at a proximal edge part within the nozzle 225 protruding forwardly of the head 226, wherein the liquid within the cylinder is led into the stem via the opened through-hole 229 and jetted out of the nozzle 225 through a discharge valve 241 by pushing down the push-down head, and the liquid within the container is sucked into the cylinder through a suction valve 209 by negative-pressurizing the interior of the cylinder when the push-down head 226 is raised, wherein the through-hole 229 can be closed by the auxiliary piston 224 only in a maximum ascent position of the stem.

Further, the auxiliary piston 224 may be possible of engaging with the cylinder 203 in the closed state of the through-hole 229 in the maximum ascent position of the stem 222 but possible of disengaging after the through-hole 229 has been opened by pushing down the head 226.

When the head 226 is raised by detaching the helically fitted portion of the vertically movable member 204, the upper surface of the auxiliary piston 224 is finally engaged with a downward stepped portion 233 of an inner cylinder 215*a*, and an engagement protrusion 232 of the auxiliary piston 224 runs over and engages with an engagement protrusion of the inner cylinder. Then, only the stem rises till the lower surface of the auxiliary piston 224 closely contacts an upward stepped portion 230 of the stem. On this occasion, the auxiliary piston 224 descends relatively to the stem, and the stem stops in a state where the through-hole 229 is closed.

When the pushing down the head 226 from this state, the auxiliary piston 224 is raised by the liquid pressure relatively to the stem 222, whereby the through-hole 229 is opened. However, the auxiliary piston 224 stops in a maximum ascent position due to the mutual engagements of the respective engagement protrusions 232, 234. Then, the through-hole 229 certainly opens. Subsequently, the respective engagement protrusions are disengaged for the first time after the downward stepped portion 231 of the stem has engaged with the upper surface of the auxiliary piston, and the auxiliary piston 224 descends together with the stem 222. Further, on this occasion, the liquid in the cylinder 203 flows via the opened through-hole 229 and is jetted outside via the nozzle 225 from the stem 222 by opening the discharge valve 241. On the other hand, the discharge member 243 is extruded up to the tip part of the engagement protrusion 244 by the liquid pressure.

Subsequently, when releasing the head 226 from being pushed down, the vertically movable member 224 is raised by the resilient force of the coil spring 220, and the discharge valve member 243 moves toward the valve seat 242 by the negative-pressurization within the cylinder 203 and then opens. Till this discharge valve 227 is closed, the liquid in the stem 222 flows back into the cylinder 203 via the through-hole 229, and correspondingly the intra nozzle liquid flows back into the stem. In the meantime, the suction valve 209 won't open. When the discharge valve 241 is closed, the suction valve 209 opens, with the result that the intra container liquid is continuously led into the cylinder 203 till the vertically movable member 204 reaches the maximum ascent position.

In the maximum ascent position of the stem 222, the through-hole 229 reverts to a state where it is closed.

An embodiment relative to a second characteristic of the present invention will hereinafter be described with reference to the drawings.

FIGS. 8 to 11 illustrate one embodiment of the present invention, wherein the numeral 201 designates a liquid jet pump. The pump 201 includes a mounting cap 202, a cylinder 203 and a vertically movable member 204.

The mounting cap 202 serves to fix the cylinder 203 to a container 205 and is constructed such that an inward-flange-like top wall 208 extends from an upper edge of a peripheral wall 207 helically-fitted to an outer periphery of a container cap fitted neck portion 206.

The cylinder 203 is fixed to the container 205 through the mounting cap 202 and is provided with a suction valve 209 in a lower edge portion extending in the interior of the container.

In accordance with this embodiment, the cylinder 203 has a flange 211 protruding outward from the outer peripheral upper portion of a cylindrical peripheral wall 210, and a flange-like valve seat 213 descending inward obliquely is protruded from the window hole peripheral part opened at the center of the bottom wall 212. Further, a fitting cylindrical portion 214 is protruded downward from the peripheral edge of the lower surface of the bottom wall 212. An upper edge of a suction pipe is attached to this fitting cylindrical portion 214, and its lower part extends in the lower edge part in the container.

Further, an engagement member 215 for engaging the vertically movable member 204 in the push-down state is fixedly fitted to the upper edge part of the peripheral wall 210. The engagement member 215 is constructed such that the fitting cylindrical portion fitted via a rugged engagement element to the outer periphery of the upper edge of the cylinder 203 perpendicularly extends from a doughnut-like top plate, and an inner cylinder 215*a* fitted to the upper edge of the inner peripheral of the cylinder 203 extends perpendicularly from the inner peripheral edge of the top plate. The inner cylinder 215*a* and an upper edge inner surface of the cylinder 203 are prevented from being turned round by the engagement of vertical protrusions with each other, and a thread for helical fitting of the vertically movable member is formed along the inner periphery of the upper portion of the inner cylinder 215*a*.

Then, the outward flange 211 is placed via a packing 216 on the upper surface of the container neck portion 206 and is caught by a top wall 208 of the mounting cap 202 helically fitted to the outer periphery of the neck portion and by the upper surface of the container neck portion 206.

The suction valve 209 is constructed so that the suction valve member for clogging the valve hole formed in the inner peripheral edge of the valve seat 213 is so provided on the valve seat 413 as to be vertically movable at a predetermined stroke with its lower surface closely contact therewith.

In accordance with this embodiment, the lower surface peripheral edge portion is so tapered as to be closely fitted to the upper surface of the valve seat 213, and there is provided the cylindrical suction valve member 217 with its lower edge surface opened. Further, the member 217 is constructed such that a plurality of rectangular plate-like engagement protrusions 218 are formed in the peripheral direction on the lower edge part of the outer periphery thereof, the lower edge surface of the coil spring 220 for biasing upward the vertically movable member 204 is secured to the upper surface of a plurality of rectangular plate ribs 219 formed in the peripheral direction on the inner, peripheral lower edge portion of the peripheral wall 410 of the cylinder 403, and the member 217 is vertically movable till each engagement protrusion 218 impinges on the lower surface of the coil spring 220. Note that a plurality of ribs generally designated by 221 in the Figure are formed in the peripheral direction on the outer peripheral upper portion of the suction valve member 217.

The vertically movable member 204 includes a stem 222, an annular piston 223, an auxiliary piston 224 and a push-down head 226 with a nozzle 225.

The stem 222 is provided so that the central portion within the cylinder 203 is vertically movable in an upward biased state, and, in accordance with this embodiment, the lower edge surface takes a cylindrical shape with the lower edge surface closed and includes a flange 227 protruding outward from the lower part of the outer periphery.

The annular piston 223 is so provided as to be movable integrally with the stem by attaching its outer peripheral surface to the inner surface of the cylinder 203 liquid-tightly and slidably while being integrally linked to the lower portion of the outer surface of the stem 222 so that the liquid is allowed to flow along the lower portion of the inner peripheral surface.

In accordance with this embodiment, an upward skirt-like upper slide portion 223*b* and a downward skirt-like lower slide portion 223*c* are protruded from the upper and lower portions of the outer peripheral portion of a cylindrical proximal member 223*a*. The respective slide portions are so press-fitted to the inner peripheral surface of the cylinder liquid-tightly and slidably. Further, a plurality of connecting rods 230 erecting upward outwardly obliquely from the outer peripheral edge of the upper surface of the flange 227 of the above stem 222 are provided in the peripheral direction, and tips thereof are integrally connected to the lower portion of the inner surface of the proximal portion 223*a* of each annular piston 223.

The auxiliary piston 224 is so fitted to the outer peripheral lower portion of the stem 222 as to be movable up and down at a predetermined stroke while making its outer peripheral edge slidably contact the inner surface of the annular piston 223 and has a through-hole 229 so holed as to be openable and closable in the stem peripheral wall.

In accordance with this embodiment, an upward skirt-like inside slide portion 224*b* protruding from the inner peripheral upper edge of a cylindrical proximal portion 224*a* is liquid-tightly slidably to the outer peripheral surface of the stem 222, and a downward skirt-like outside slide portion 224*c* protruding from the outer peripheral lower portion of the proximal portion 224*a* is liquid-tightly slidably fitted to the inner peripheral surface of a proximal portion 223*a* of the annular piston 223. Further, a cylindrical valve piece 224*d* extends downward from the inner peripheral lower portion of the proximal portion 224*a*, and an engagement cylindrical portion 224*e* protrudes from the upper part of the outer periphery of the proximal portion.

On the other hand, an upward stepped portion 230 is formed in a predetermined position along the lower portion of the outer periphery of the stem 222, while a downward stepped portion 231 is formed in a predetermined position along the upper portion of the stepped portion 230, thereby making it the vertically movable from a state where the lower surface of the cylindrical valve piece 224*d* is closely fitted to the upper surface of the upward stepped portion 230 to a state where it impinges on the lower surface of the downward stepped portion 231.

Further, a through-hole 229 is formed in the lower portion of the peripheral wall of the stem between the upward stepped portion 230 and the downward stepped portion 231.

Then, when the vertically movable member 204 is pushed down from an ascent position, the auxiliary piston 224 is relatively raised by the liquid pressure (by an air pressure when using a pump with no liquid in the cylinder for the first time) with respect to the stem 222, with the result that the through-hole 229 opens. On the other hand, when the vertically movable member 204 rises, the lower edge of the inner cylinder 215*a* contacts and engages with the upper surface of the engagement cylindrical portion 224*e* of the auxiliary piston 224, and, when the stem 222 further rises, the lower surface of the cylindrical valve piece 224*e* closely contacts the upward stepped portion 232, with the result that the through-hole 229 is closed.

Further, in accordance with this embodiment, in the closed state of the through-hole 229 in the stem maximum ascent position, the auxiliary piston 224 is so constructed as to be possible of engaging with the cylinder 203 but possible of disengaging after opening the through-hole 229 by pushing down the head 226.

In accordance with this embodiment, the engagement protrusion 232 is formed along the upper edge part of the outer periphery of the engagement cylindrical portion 224*e*. On the other hand, the downward stepped portion 233 is formed in the predetermined position along the lower edge part of the inner periphery of the inner cylinder 215*a* of the engagement member 215, and the engagement protrusion 234 engaging with the above engagement protrusion 232 is formed downwardly of the stepped portion 233. When the stem 222 is raised, the upper surface of the engagement cylindrical portion 224*e* contacts and engages with the lower surface of the above stepped portion 233, and the respective engagement protrusions 232, 234 are engaged with each other. When the stem 222 is further raised, the lower edge of the cylindrical valve piece 224*d* impinges on the upper surface of the upward stepped portion 230, thereby closing the through-hole 229. Further, when the head is push down from this state, the auxiliary piston 224 initially certainly engages with the inner cylinder 215*a* due to the mutual engagement of the engagement protrusions. Accordingly, the through-hole 229 is surely opened, and subsequently the upper surface of the inside slide portion 224*b* is engaged with the downward stepped portion 231 of the stem 222, thereby disengaging the respective engagement protrusions. Then, the auxiliary piston 224 descends together with the stem 222.

Further, on this occasion, the auxiliary piston 224 plays the role of shutting off the outside air introducing through-hole 235 formed in the cylinder 203. If the through-hole 235 is formed in the upper portion of the peripheral wall of the cylinder, and when the vertically movable member 204 rises, the outside air flows from between the stem 222 and the inner cylinder 215*a* and is led into the container negative-pressurized via this through-hole 235. If the stem 222 is in the maximum ascent position, the upper edge of the engagement cylindrical portion 224*e* of the auxiliary piston 224 air-tightly contacts the lower edge of the inner cylinder 215*a*, thereby shutting off the exterior and interior of the container.

The push-down head 226 is provided in continuation from the upper edge of the stem 222 so that the upper portion of the mounting cap 202 is movable up and down. In accordance with this embodiment, the push-down head 226 includes a cylindrical casing 236 having its peripheral wall extending perpendicularly from the top wall peripheral edge and its lower edge surface opened. The lower edge of a vertical cylinder 237 perpendicularly extending from the lower surface central portion of the top wall of the casing 236 is attached to the outer peripheral upper edge of the stem 222, thus fixing it to the stem 422. Further, a horizontal cylinder 238 with its proximal portion opened to the front surface of the upper portion of the vertical cylinder 237 penetrates the casing peripheral wall and thus protrudes forward, thus forming this horizontal cylinder 238, a bent cylindrical member 239 fixedly fitted to the tip of the horizontal cylinder and the nozzle 225. The nozzle 225 is constructed so that the whole part exclusive of the tip thereof ascends forward obliquely while its tip descends obliquely. With this construction, it is possible to prevent the liquid from dropping.

Moreover, a thread formed along the outer periphery of the vertical cylinder 237 with respect to the portion protruding downward from the casing 236 meshes with the thread of the engagement member 215 when pushing down the vertically movable member 204 and is thus made possible of engaging therewith in the state where the vertically movable member 204 is pushed down. On this occasion, the lower edge part of the outer periphery of the vertical cylinder 237 is light-tightly fitted to the inner periphery of a downward skirt-like annular protruded piece 240 provided on the inner surface of the inner cylinder 215*a* of the engagement member 215.

The nozzle 225 incorporates the discharge valve 241. The discharge valve 241 is constructed such that the ball-like valve member 243 for closing the valve seat 242 formed in the proximal portion within the nozzle 225 is so housed as to be movable back and forth.

In accordance with this embodiment, the inward-flange-like valve seat 242 is formed in the nozzle proximal portion, and, besides, a plurality of notched grooves are formed in the peripheral direction in the internal fitting portion of the horizontal cylinder 238 of the bent cylindrical member 239 constituting the tip part of the nozzle 225. Then, the engagement protrusion 244 capable of engaging wit the valve member 243 to permit the flow of liquid is protruded in the peripheral direction at the tip part of the inner surface of the nozzle.

Further, in accordance with this embodiment, a plurality of spring pieces 245 are protruded integrally from the lower surface of the stem, and the thread of the vertically movable member 204 engages with the thread of the inner cylinder 215*a*. Then, when the vertically movable 204 engages with the cylinder in the pushed-down state, each spring piece 245 is press-fitted to the upper surface of the top wall of the suction valve member 217. With this construction, the suction valve can be surely closed during a transportation while certainly pushing down the suction valve member 217.

The respective members are properly selectively composed of synthetic resins, metals and materials such as particularly elastomer exhibiting an elasticity.

Note that the pump according to the preset invention is not limited to the embodiment discussed above, and a variety of specific structures of the pump can be selected on condition that the pump is of the push-down head type.

As discussed above, the pump of the present invention is constructed so that the nozzle ascends forward obliquely, and there is provided the discharge valve in which the ball-like valve member for closing the valve seat formed at the proximal portion within the nozzle is so housed in the nozzle as to be movable back and forth. Hence, it hardly happens that the valve member extruded forwardly of the nozzle by the liquid pressure immediately reverts to the valve seat closed state by the self-weight but moves to and from substantially along the flow of liquid. Accordingly, if there is set a large distance enough to make the back-and-forth movements from the valve seat, a backflow quantity also increases, and it is possible to prevent the liquid leakage and the liquid dry-solidification preferably.

Further, the pump exhibits such advantages that the pump can be constructed by modifying a slight part of structure of the conventional pump and is therefore easily manufactured at a low cost.

Moreover, the pump according to the present invention includes the annular piston having its outer peripheral surface slidably attached to the inner surface of the cylinder and its inner peripheral surface lower part so connected to the lower part of the outer surface of the stem as to permit the flow of liquid. The pump also includes the auxiliary piston with its outer peripheral surface slidably attached to the inner surface of the annular piston and with the through-hole formed in an openable/closable manner in the peripheral wall portion of the stem. The pump further includes the discharge valve in which the ball-like valve member for closing the valve seat formed at the proximal edge part within the nozzle is so housed in the nozzle as to be movable back and forth. The intra cylinder liquid is led into the stem via the through-hole opened by pushing down the push-down head and jetted out of the nozzle through the discharge valve. When the head is raised, the liquid within the container is sucked into the cylinder through the suction valve by negative-pressurizing the interior of, the cylinder. Further, the through-hole can be closed by the auxiliary piston only in the stem maximum ascent position. Hence, when the head rises after jetting the liquid by pushing down the push-down head, the liquid within the stem flows back into the cylinder via the though-hole till the discharge valve is closed, and correspondingly the intra nozzle liquid flows back into the stem. Therefore, it is feasible to obviate the liquid dropping from the nozzle tip and prevent the liquid dry-solidification as much as possible.

Further, there are provided the annular piston sliding on the inner periphery of the cylinder and the auxiliary piston for opening and closing the through-hole. Therefore, the annular piston serving to guide the vertical movements of the stem can be formed solid and thick, the stable vertical movements of the stem can be made, and the durability is also enhanced.

Moreover, even if the container is carelessly turned over when used, since the auxiliary piston closes the through-hole in the stem maximum ascent position, the liquid leakage from the nozzle tip can be prevented as much as possible.

Further, the auxiliary piston 224 is possible of engaging with the cylinder 203 in the closed state of the through-hole 229 in the maximum ascent position of the stem 222 but possible of disengaging after the through-hole 229 is opened by pushing down the head 226. The thus constructed liquid jetting pump is capable of surely obviating such inconvenience that if the air still exists in the cylinder after being mounted in the container for the first time, the auxiliary piston is not raised by the air pressure relatively to the stem when pushing down the head.

According to the present invention, in a liquid jetting pump comprising: a mounting cap 302 fitted to a container neck portion; a cylinder 303 fixed to a container through the cap and including a suction valve 309 provided in a lower edge part extending downward into the container; a stem 323 having an annular piston 322 fitted to an interior of the cylinder 303, protruding from a lower part of an outer periphery and so provided as to be vertically movable in an upward-biased state; a push-down head 325, with a nozzle 324, disposed in continuation from an upper edge of the stem 323 and so provided as to be vertically movable above the mounting cap 302; and a discharge valve 326 provided with a valve member 331, for closing a valve hole formed in an inner upper part of the stem 323, so provided as to be vertically movable by a liquid pressure, wherein a liquid within the container is sucked into the cylinder 303 through the suction valve 309, and a liquid within the cylinder 303 is jetted out of the nozzle 324 through the discharge valve 326 from the stem by vertically moving a vertically movable member 304 constructed of the stem 323 and the push-down head 325, wherein a vertical stroke of the discharge valve member 331 is regulated so that $Vb-Vc$ is equal to or larger than Va, where Va is the volumetric capacity of the nozzle 324, Vb is the volumetric capacity of the liquid passageway where the discharge valve member 331 is vertically movable, and Vc is the volume of the discharge valve member 331.

Further, herein, the suction valve 309 may be a suction valve 309 including a valve member 317 always biased in a valve hole closing direction by a resilient member 316.

Moreover, the suction valve 309 may be a suction valve 309 constructed of a dome-like valve plate 337, formed with a slit 336, for closing an opening of the lower edge of the cylinder 303 by fixedly fitting a lower edge periphery to an inner lower edge part of the cylinder 303.

Furthermore, the suction valve 309 may be a suction valve 309 constructed of a hollow truncated cone proximal portion 339, with its lower edge surface opened, for closing an opening of the lower edge of the cylinder 303 by fixedly fitting a lower edge periphery thereof to an inner lower edge part of the cylinder 303, and an elastic cylinder 341 so closely attached to an outer periphery of the wall of the proximal portion so as to be incapable of coming off and to liquid-tightly close a window hole 340 holed in the peripheral wall of the proximal portion 339.

It is used while mounted in the container 305 containing the liquid exhibiting the viscosity. For example, the head

325 is raised by detaching the helical fitted portion of the vertical movable member 304 from the state of FIG. 12, and, when pushing down the raised head 325, the interior of the cylinder 303 is pressurized. The liquid within the cylinder 303 then passes inside through the stem 323 enough to open the discharge valve 326 and is then jetted outside out of the nozzle 324 from the portion of the vertical cylinder 328 of the head. On this occasion, the discharge valve 331 is thrust up to the lower surface of the engagement bar 333 by the liquid pressure. Subsequently, when releasing the head 325 from being depressed, the vertically movable member 304 rises by the resilient force of the coil spring 330, and the interior of the cylinder 303 is negative-pressurized, with the result that the discharge valve 331 is lowered relatively to the vertically movable member 304 enough to close the valve hole. In the meantime, the liquid within the vertical cylinder 328 flows back into the cylinder 303, and correspondingly the liquid in the nozzle 324 flows back into the vertical cylinder 328. When the discharge valve 326 is closed, the suction valve 309 opens by the negative pressure within the cylinder 303. Then, after the liquid within the container has been led into the cylinder 303 through the suction valve 309, the suction valve is closed.

According to the present invention, in a liquid jetting pump comprising: a mounting cap 402 fitted to a container neck portion; a cylinder 403 fixed to a container through the cap 402 and including a suction valve 409 provided in a lower edge part extending downward within the container; a stem 422 provided so that said stem is vertically movable in a central portion within the cylinder in an upward biased state and having a discharge valve 427 in which a valve hole formed in an inner upper part is closed by a valve member 439 vertically movable by a liquid pressure; an annular piston 423 having its outer peripheral surface slidably fitted to the inner surface of the cylinder 403, and connected to a lower part of the outer surface of the stem 422 to permit a flow of liquid in the inner peripheral surface lower part; an annular auxiliary piston 424 so fitted to the lower part of the outer periphery of the stem as to be vertically movable at a predetermined stroke, having its outer peripheral surface slidably attached to the inner surface of the annular piston and formed with a through-hole 431 holed in a peripheral wall portion of the stem is openable/closable manner; and a head 426, with a nozzle 425, so provided in continuation from an upper edge of the stem as to be vertically movable above the mounting cap, wherein the liquid within the cylinder is led into the stem via the opened through-hole 431 and jetted out of the nozzle 425 through the discharge valve 427 by pushing down the push-down head, and the liquid within the container is sucked into the cylinder through a suction valve 409 by negative-pressurizing the interior of the cylinder when the push-down head 426 is raised, wherein the through-hole 431 can be closed by the auxiliary piston 424 only in a maximum ascent position of the stem.

Herein, a vertical stroke of the discharge valve member 439 may be regulated so that Vb−Vc is equal to or larger than Va, where Va is the volumetric capacity of the nozzle 455, Vb is the volumetric capacity of the liquid passageway where the discharge valve member 439 is vertically movable, and Vc is the volume of the discharge valve member 439.

Further, a suction valve member 417 constituting the suction valve 409 may be always biased in a valve hole closing direction.

Moreover, the auxiliary piston 424 may be always biased upward with respect the stem 422, and the through-hole 431 can be closed by the auxiliary piston 424 only when the stem 422 is raised at the maximum.

Furthermore, the auxiliary piston 424 may be possible of engaging with the cylinder 403 in a closed state of the through-hole 431 in the maximum ascent position of the stem 422 but possible of disengaging after the through-hole 431 by pushing down the head 426.

It is used while mounted in the container 405 containing the liquid exhibiting the viscosity. For example, the head 426 is raised by detaching the helical fitted portion of the vertical movable member 404 from the state of FIG. 20, finally the upper surface of the auxiliary piston 424 engages with the lower surface of the inner cylinder 415*a* with the result that the only the stem 422 rises and continues to rise till the lower surface of the auxiliary piston 424 closely contacts the upper surface of the upward stepped portion 432 of the stem. On this occasion, the auxiliary piston 424 is lowered relatively to the stem 422, and the stem 422 stops in the state where the through-hole 431 is closed.

When pushing down the head 426 from this state, the auxiliary piston 424 rises relatively to the stem 422 by the liquid pressure enough to open the through-hole 431, and the liquid within the cylinder 403 passes via the opened through-hole 431 enough to open the discharge valve and is jetted outside out of the nozzle 425. On this occasion, the discharge valve 439 is thrust up to the lower surface of the engagement plate 441 by the liquid pressure.

Subsequently, when releasing the head 426 from being depressed, the vertically movable member 404 rises by the resilient force of the coil spring 420, and the interior of the cylinder 303 is negative-pressurized, with the result that the discharge valve 439 is lowered relatively to the vertically movable member 404 enough to close the valve. The liquid within the stem 422 flows back into the cylinder 403 till the discharge valve 427 is closed, and correspondingly the liquid in the passageway where the discharge valve member 439 moves up down flows back into the stem 422 disposed upstream of the discharge valve, and further the liquid within the nozzle 425 flows back into the passageway. In the meantime, the suction valve 409 won't open. When the discharge valve 427 is closed, the suction valve 409 opens, whereby the liquid in the container is continuously led into the cylinder 403 till the vertically movable member 404 reaches the maximum ascent position.

In the maximum ascent position of the stem 422, it reverts to a state where the through-hole 431 is closed.

The present invention provides an excellent liquid jetting pump capable of causing no liquid dropping and, besides, preventing the liquid dry-solidification. In a liquid jetting pump comprising: a mounting cap 502 fitted to a container neck portion; a cylinder. 503 fixed to a container through the cap and including a suction valve 510 provided in a lower edge part extending downward into the container; a stem 521 having an annular piston 520 fitted to an interior of the cylinder, protruding from a lower part of an outer periphery and so provided as to be vertically movable in an upward-biased state; a push-down head 523, with a nozzle 522, disposed in continuation from an upper edge of the stem and so provided as to be vertically movable above the mounting cap 502; and a discharge valve 524 provided with a valve member 530, for closing a valve hole by placing it on a valve seat 529 provided on an inner upper part of the stem, wherein a liquid within the container is sucked into the cylinder through the suction valve by vertically moving a vertically movable member 504 constructed of the stem and the push-down head, and a liquid within the cylinder is jetted out of the nozzle through the discharge valve from the stem, there is provided an improvement characterized in that a bar-like member 505 with its upper edge part protruding into the stem is provided, a tip of the bar-like member is in a lower position of the valve seat 529 of the discharge valve in the maximum ascent position of the vertically movable member 504, the tip of the bar-like member protrudes with a gap along the periphery upwardly of the valve seat 529 by pushing down the vertically movable member, and the liquid existing downstream of the discharge valve flows back upstream of the discharge valve via the gap when the vertically movable member 504 is raised.

Further, the suction valve may be a suction valve 510*a* including a valve member 519 always biased in a valve hole closing direction by a resilient member 539.

Moreover, the suction valve may be a suction valve 510*b* including a suction valve member 519*b* having a weight that is more than twice the weight of the discharge valve member 530.

For instance, when pushing down the head 523 from the state of FIG. 31, the interior of the cylinder 503 is pressurized, and the liquid within the cylinder 503 passes inside through the stem 521 enough to open the discharge valve 524 and is jetted outside out of the nozzle 522 from the portion of the vertical cylinder 526 of the head 523. On this occasion, the discharge valve member 530 is thrust up to the lower surface of the engagement bar 531 when pushed up by the liquid pressure within the cylinder 503 and/or by the tip of the bar-like member 505. Subsequently when releasing the head 523 from being depressed, the vertically movable member 504 rises by the resilient force of the coil spring 528, and the interior of the cylinder 503 is negative-pressurized, with the result that the discharge valve 530 is lowered relatively to the vertically movable member 504 enough to close the valve hole. However, the valve member 530 won't close till the tip of the bar-like member 505 retracts under the valve seat 529. Accordingly, in the meantime, the liquid within the vertical cylinder 526 surely flows back into the cylinder 503, and correspondingly the liquid in the nozzle 522 flows back into the vertical cylinder 526.

When the discharge valve 524 is closed, the suction valve 510 opens by the negative pressure within the cylinder 503. Then, after the liquid within the container has been led into the cylinder 503 through the suction valve 510, the suction valve is closed.

The above-described pump still has, though quite excellent, a room for the improvement in order to obtain a more preferable effect of preventing the liquid dropping.

An excellent liquid jetting pump capable of venting the liquid dropping and the liquid dry-solidification preferably is to be proposed. For this purpose, according to the present invention, in a liquid jetting pump comprising: a mounting cap 602 fitted to a container neck portion; a cylinder 603 fixed to a container through the cap and having its lower edge part extending downward into the container; a bar-like suction valve member 605 having its lower surface closely fitted onto a valve seat 613 provided in an inner lower part of the cylinder to form a suction valve 617 and erecting upward so as to be vertically movable at a predetermined stroke; a stem 622 having an annular seal portion 627 with its inner peripheral edge liquid-tightly slidably fitted to the outer periphery of the member 605, protruding from a lower edge of the inner periphery and being vertically movable in an upward biased state; an annular piston 623 so fitted to a lower edge part of the outer periphery of the stem as to be vertically movably at a predetermined stroke, having its outer peripheral edge slidably attached to the inner surface of the cylinder and formed so that a through-hole 631 holed in the lower edge part of the stem as to be openable and closable; and a push-down head 625, with a nozzle 624, provided in continuation from an upper edge of the stem 622 so as to be vertically movable above the mounting cap 602, wherein a liquid within the cylinder 603 is led into the stem via the opened through-hole 631 by pushing down the push-down head, and a liquid in the container is sucked up into the cylinder by negative-pressurizing the interior of the cylinder, there is provided the liquid jetting pump comprising: a discharge valve 626 in which a valve hole formed in an inner upper part of the stem is closed by a valve member 637 vertically moved by a liquid pressure, the suction valve member 605 including a vertical groove 640 for a liquid backflow that is formed along its outer periphery.

Further, vertical stroke of the discharge valve member 637 may be regulated so that Vb−Vc is equal to or larger than Va, where Va is the volumetric capacity of the nozzle 624, Vb is the volumetric capacity of the liquid passageway where the discharge valve member 637 is vertically movable, and Vc is the volume of the discharge valve member 637. Moreover, a suction valve member 605 may be a suction valve member 605 always biased in a valve hole closing direction by a resilient member 641.

It is used while mounted in the container 606 containing the liquid exhibiting the viscosity. For example, the head 625 is raised by detaching the helical fitted portion of the vertical movable member 604 from the state of FIG. 35, and, when pushing down the raised head 625, the interior of the cylinder 603 is pressurized. The liquid within the cylinder 603 then thrusts up the annular piston 623, passes via the opened through-hole 631 enough to open the discharge valve 626 and is then jetted outside out of the nozzle 624. Further, the liquid within the cylinder 603 flows into the stem 622 through the vertical groove 640 of the suction valve member 605 also, on this occasion, the discharge valve 637 is thrust up to the lower surface of the engagement bar 639 by the liquid pressure.

Subsequently, when releasing the head 625 from being depressed, the vertically movable member 604 rises by the resilient force of the coil spring 620, and the annular piston 623 descends relatively to the stem 622 enough to close the through-hole 631. With the negative-pressurization in the cylinder 603, the discharge valve member 637 closes the valve hole, ad the discharge valve thereby closes. In the meantime, the liquid within the passageway where the discharge valve member 637 moves up an down flows back into the stem 622 disposed upstream of the valve seat 638, and correspondingly the liquid within the nozzle 624 flows back int the above passageway. Further, the liquid in the stem 622 passes along the vertical groove 640 of the suction valve member 605 and flows back into the cylinder 603. On the other hand, the suction valve 617 is opened by negative-pressurizing the interior of the cylinder 603, and the liquid within the container is led into the cylinder 603 through the suction valve 617. After the discharge valve 626 has been closed, the liquid within the container is continuously led into the cylinder 603 through the suction valve 617 till the vertically movable 604 reaches the maximum ascent position.

Provided is an excellent liquid jetting pump capable of preventing the liquid dropping and, besides, the liquid dry-solidification. According to the present invention, in a liquid jetting pump comprising: a mounting cap 702 fitted to a container neck portion; a cylinder 703 fixed to a container through the cap and including a suction valve 714 provided in a lower edge part extending downward into the container;

a stem 717 having its lower edge surface closed and provided so that the stem is vertically movable in a central portion within the cylinder in an upward biased state and including a discharge valve 721 with a valve hole so holed in an upper part of the interior as to be closed by a valve member 722 vertically moved by a liquid pressure; an annular piston 718 so fitted to a lower edge part of the outer periphery of the stem as to be vertically movable at a predetermined stroke, having its outer peripheral surface slidably fitted to the inner surface of the cylinder and so provided as to be make openable closable a through-hole 728 holed in the lower-edge part of the stem; and a head 720, with a nozzle 719, so provided in continuation from an upper edge of the stem as to be vertically movable above the mounting cap, a liquid within the cylinder is led into the stem via the opened through-hole 728 and jetted out of the nozzle 719 through a discharge valve 721 by pushing down the push-down head, and the liquid within the container is sucked into the cylinder through a suction valve 714 by negative-pressurizing the interior of the cylinder when the push-down head 720 is raised, there is provided an improvement characterized in that the annular piston 718 is always biased upward with respect to the stem, and the through-hole 728 is so formed as to be closable only in a maximum ascent position of the stem.

Further, a vertical stroke of the discharge valve member 722 may be regulated so that Vb−Vc is equal to or larger than Va, where Va is the volumetric capacity of the nozzle 719, Vb is the volumetric capacity of the liquid passageway where the discharge valve member 722 is vertically movable, and Vc is the volume of the discharge valve member 722.

It is used while mounted in the container 705 containing the liquid exhibiting the viscosity. For example, the head 720 is raised by detaching the helical fitted portion of the vertical movable member 704 from the state of FIG. 42, and, when pushing down the raised head 720, the interior of the cylinder 703 is pressurized. The liquid within the cylinder 703 then passes via the opened through-hole 728, flows from the stem 717 enough to open the discharge valve 721 and is jetted outside out of the nozzle 719. Moreover, on this occasion, the discharge valve member 722 is through up to the lower surface of the engagement plate 736.

Subsequently, when releasing the head 720 from being depressed, the vertically movable member 704 rises by the resilient force of the coil spring 727, and the interior of the cylinder 703 is negative-pressurized, with the result that the discharge valve member 722 is lowered relatively to the vertically movable member 704 enough to close the valve hole, thereby closing the discharge valve 721. In the meantime, the liquid within the passageway where the discharge valve member 722 moves up and down flows back into the stem 717 disposed upstream of the valve seat, and correspondingly the liquid in the nozzle 719 flows back into the above passageway. Also, the liquid within the stem 717 passes via the through-hole 728 and flows back into the cylinder 703. On the other hand, the suction valve 714 is opened by negative-pressurizing the interior of the cylinder 703, and the intra container liquid is led into the cylinder 703 through the suction valve 714.

Even after the discharge valve 721 has been closed, the liquid in the container is continuously led into the cylinder 703 till the stem 717 reaches the maximum ascent position. In the maximum ascent position of the stem 717, the annular piston 718 engages with the lower surface of the inner cylinder 712*a* of the engagement member 712 and then descends relatively against the biasing force of the coil spring 730, and the through hole 728 is closed.

Provided is an excellent liquid jetting pump capable of eliminating the liquid dropping and, besides, preventing the liquid dry-solidification. According to the present invention, in a liquid jetting pump comprising: a mounting cap 802 fitted to a container neck portion; a cylinder 803 fixed to a container through the cap and including a suction valve 814 provided in a lower edge part extending downward into the container; a stem 820 provided so that the stem is vertically movable in a central portion within the cylinder in an upward biased state and including a discharge valve 824 with a valve hole so holed in an upper part of the interior as to be closed by a valve member 826 vertically moved by a liquid pressure, the stem 820 being provided with the discharge valve 824 closed by the valve member 826 vertically movable at a predetermined stroke in a lower part of the outer periphery of the stem; an annular piston 821 so fitted to a lower edge part of the outer periphery of the stem as to be vertically movable at a predetermined stroke, having its outer peripheral surface slidably fitted to the inner surface of the cylinder and so provided as to be make openable closable a through-hole 836 holed in the peripheral wall of the stem; and a head 823, with a nozzle 822, so provided in continuation from an upper edge of the stem as to be vertically movable above the mounting cap, wherein the liquid within the cylinder is led into the stem via the opened through-hole 836 and jetted out of the nozzle 822 through a discharge valve 824 by pushing down the push-down head, and a liquid within the container is sucked into the cylinder through a suction valve 814 by negative-pressurizing the interior of the cylinder when the push-down head 823 is raised, there is provided the liquid jetting pump comprising: a check valve 825, provided in the lower edge part of the stem, for permitting a one-way flow into the cylinder from within the stem.

Further, a vertical stroke of the discharge valve member 826 may be regulated so that Vb−Vc is equal to or larger than Va, where Va is the volumetric capacity of the nozzle 822, Vb is the volumetric capacity of the liquid passageway where the discharge valve member 826 is vertically movable, and Vc is the volume of the discharge valve member 826.

Furthermore, the non-return valve 825 may be a non-return valve 825 for integrally and vertically movably supporting a valve plate 832 closing the lower surface of the valve hole holed in a bottom wall of the stem by use of a plurality of bar-like elastic portions 833 protruding from an inner surface of a cylindrical proximal portion 831 fixedly fitted to the lower edge of the stem. The discharge valve 814 may be a discharge valve 814 for integrally and vertically movably supporting a valve plate 815 closing an upper surface of a valve hole holed in the lower edge part of the interior of the cylinder by use of a plurality of bar-like elastic portions 817 integrally protruding from the inner surface of a cylindrical proximal portion 816 fixedly fitted to the lower edge part of the interior of the cylinder. Then, a pressure required for opening the check valve 825 may be smaller than a pressure required for opening the suction valve 814.

Moreover, engagement protrusions 845, 846 for regulating a stroke of the vertical movement of each valve plate may be protruded in a predetermined position under the check valve plate 832 and in a predetermined position above the suction valve plate 815.

It is used while mounted in the container 805 containing the liquid exhibiting the viscosity. For example, when the head 823 is raised by detaching the helical fitted portion of the vertical movable member 804 from the state of FIG. 47, the annular piston 821 is lowered relatively to the stem 820 and ascends up to the maximum ascent position in the closed state of the through-hole 836. Further, in the maximum ascent position of the stem 820, the annular piston 821 engages with the lower surface of the inner cylinder 812*a* of the engagement member 812.

When pushing down the raised head 823 from this state, the annular piston 821 rises relatively to the stem 820, and the through-hole 836 is opened. Then, the interior of the cylinder 803 is pressurized, and the liquid passes via the opened through-hole in the cylinder 803 and is jetted outside out of the nozzle 822 through the opened discharge valve 824 from the stem 820. Moreover, on this occasion, the discharge valve 826 is thrust up to the lower surface of the engagement plate 814 by the liquid pressure.

Subsequently, when releasing the head 823 from being depressed, the vertically movable member 804 rises by the resilient force of the coil spring 830, and the through-hole 836 is again closed. Then, the check valve 825 is opened by negative-pressurizing the interior of the cylinder 803, and the liquid within the stem 820 flows back into the cylinder. Then, the discharge valve 826 is lowered relatively to the vertically movable member 804. Note that the liquid within the stem 820 flows back into the cylinder trough the check valve 825 till the discharge valve is closed, and correspondingly the liquid within the passageway where the discharge valve 826 moves up and down flows back into the stem 820 disposed upstream of the discharge valve. Further the liquid in the nozzle 822 flows back into the above passageway.

The discharge valve 826 reaches above the valve seat 843, and the discharge valve 824 is closed. Hereupon, the check valve 825 is also closed, and the liquid within the container is continuously led into the cylinder 803 after opening the suction valve 814 (there is a slight difference depending on the pressures necessary for opening the non-return valve 825 and the suction valve 814 and also a possibility in which the non-return valve 825 and the suction valve 824 open simultaneously) till the vertical movable member 804 reaches the maximum ascent position.

According to a third characteristic of the present invention, in a pump type liquid discharge container comprising: a mounting cylinder 902 attached to an outer surface of a container neck portion; a cylinder 903 having a suction valve 907 provided on an inner surface of a bottom portion and extending downward into the container from the mounting cylinder; a operating member 930, with a discharge valve, erected from within the cylinder by biasing it upward; and a push-down head 931, with a nozzle 934, provided at an upper edge of the operating member, a liquid in the container being sucked into said cylinder and a liquid in the cylinder being jetted out of the nozzle 934 by vertical movements of the operating member, wherein a suction valve 907 in a bottom portion within the cylinder is constructed of a self-closing valve with a valve hole 910 resiliently closed by a valve member 911, the operating member 930 is constructed of the push-down head 931, a stem 935 having a small-diameter cylinder 938 extending downward through an outward flange 937 from a lower edge of a cylindrical portion 936 extending downwards into the cylinder 903 while fixing its upper edge part to the push-down head, a lower member 940 provided with a large-diameter board portion 943 at a lower edge of a bar-like portion 942 extending downward while fixing its upper part into the cylindrical portion 936 and provided vertically with a passageway forming groove 941 in its outer surface and a cylindrical piston 950 including an inner cylindrical portion 951 fitted to the outer surface of the bar-like portion so as to vertically movable between the outward flange 937 of the stem and the board-like portion 943, the cylindrical piston is formed in a triple cylindrical shape connected through a flange, an outer cylindrical portion 953 is water-tightly fitted to a wall surface within the cylinder and an upper part of a middle cylindrical portion 952 is water-tightly fitted to an inner wall surface of the small-diameter cylinder 938, the interior of the upper part of the middle cylindrical portion communicates with the passageway forming groove 941, a discharge valve 944 is formed of the lower edge part of the middle cylindrical portion 952 and of the outer peripheral part of the board-like portion 943, and a friction resistance of the cylindrical piston 950 with respect to the inner wall surface of the cylinder 903 is set larger than a friction resistance with respect to the bar-like portion 942 and the small-diameter cylinder 938 as well.

In the state where the operating member 930 is raised, the cylindrical piston 950 is in the descending position with respect to the lower member 940, and, when pushing the push-down head 931 from a state where the discharge valve 944 is closed, at first the stem 935 and the lower member 940 are lowered with respect to the cylindrical piston 950 by which the outer cylindrical portion 953 is press-fitted to the inner wall surface of the cylinder 903. Then, with the descents thereof, the discharge vale 944 opens, and the lower edge of the small-diameter cylinder 938 of the stem 935 contacts the cylindrical piston 950, whereby the cylindrical piston 950 also descends. The liquid within the cylinder flows though inside the stem and is jetted out of the nozzle 934.

When releasing the push-down head 931 from the state where the operating member is lowered, at first the stem 935 and the lower member 940 are raised with pushing-up by the coil spring 935 while the cylindrical piston 950 remains stopped, and the discharge valve 944 is closed. Thereafter, the cylindrical piston 950 also rises, and, during this ascent, the suction valve 907 opens, with the result that the liquid is sucked into the cylinder.

By the way, as illustrated in FIG. 59, till the discharge valve 944 is closed with the ascent of the operating member from the lowered state of the operating member 930, the stem 935 and the lower member 940 rise with respect to the cylindrical piston 950 remaining stopped, and the upper part of the middle cylindrical portion 952 of the cylindrical piston 950 is press-fitted water-tightly to the inner wall surface of the small-diameter cylinder 938. Hence, it follows that there increases a capacity of the liquid outflow portion from the lower edge of the cylindrical piston 950 to the upper edge of the stem 935. The discharge 907 remains closed till the discharge valve 944 is closed, and, therefore, the liquid within the nozzle hole 933 is sucked back into the stem, corresponding to the quantity of the increased capacity.

BEST MODE FOR CARRYING OUT THE INVENTION

Figure 1:
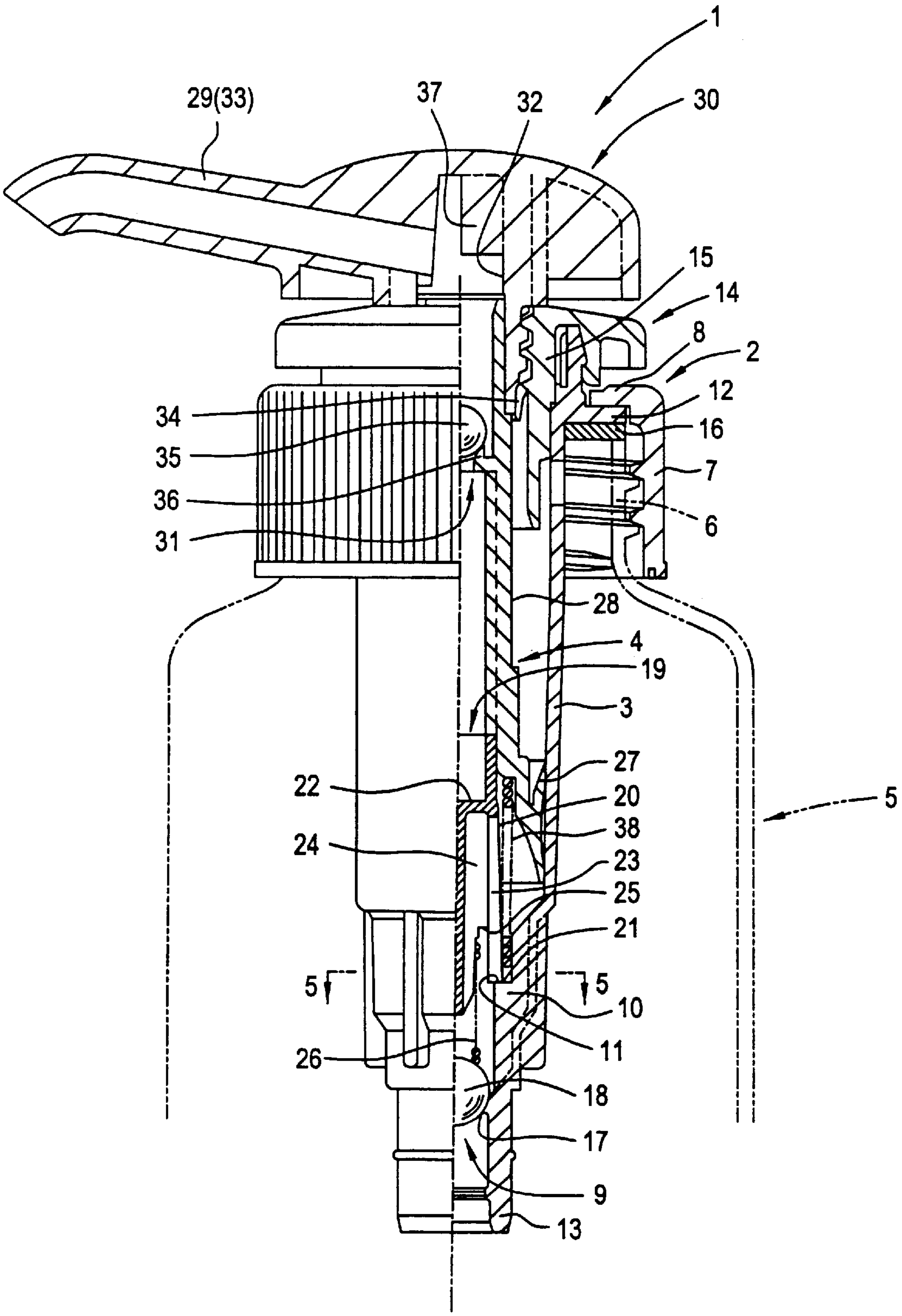
FIG. 1 is a side view with some portion cut away, illustrating one embodiment of the present invention.
Figure 2:
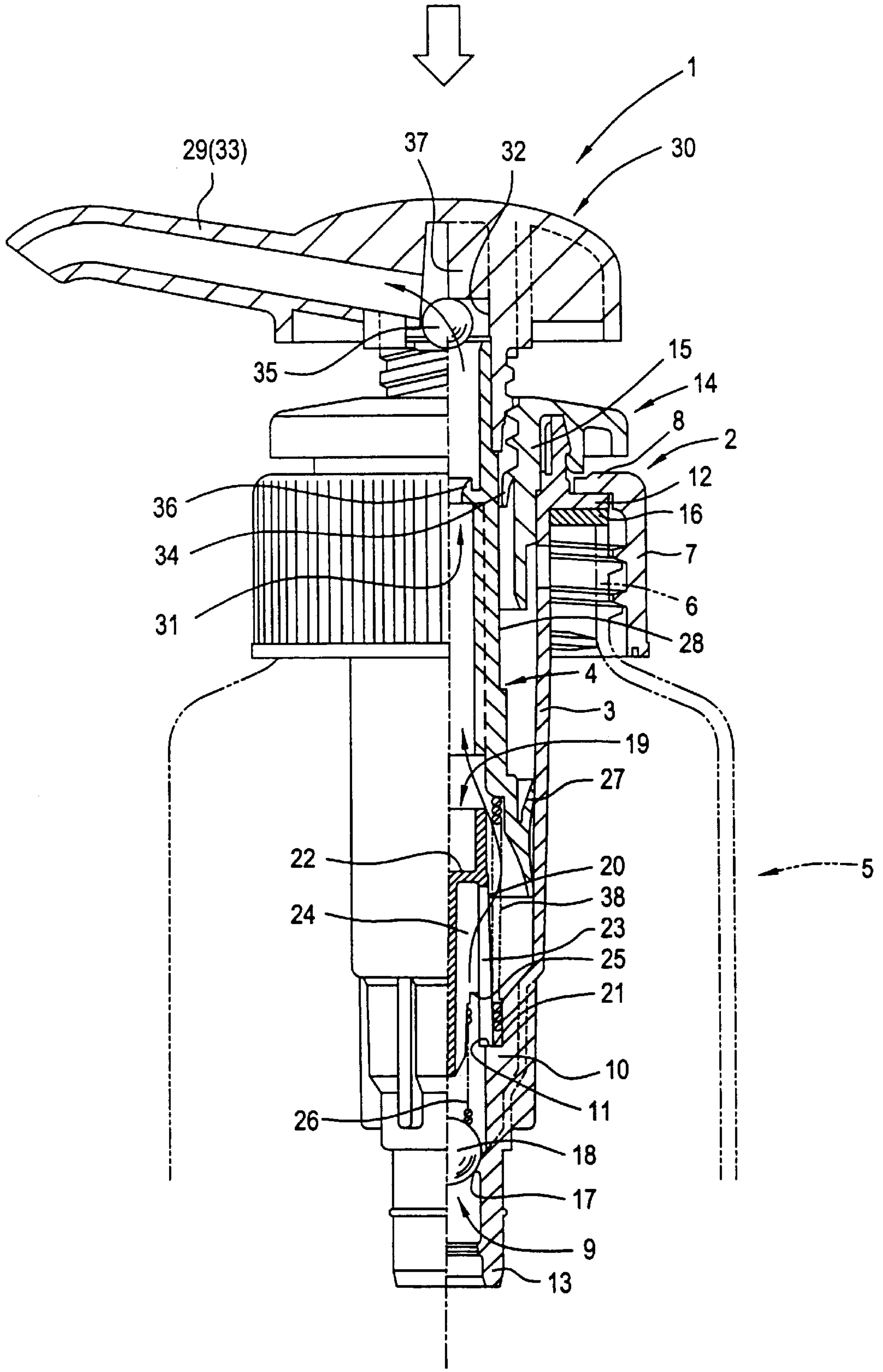
FIG. 2 is an explanatory side view with some portion cut away, showing a state where an operating member is pushed down in the same embodiment.

An embodiment relative to a first characteristic point of the present invention will hereinafter be described with reference to the accompanying drawings.

FIGS. 1 through 5 illustrate the embodiment of the present invention, wherein the numeral 1 designates a liquid jet pump. The pump 1 includes a mounting cap 2, a cylinder 3 and a vertically movable member 4.

The mounting cap 2 serves to fix the cylinder 3 to a container 5 and is constructed such that an inward-flange-like top wall 8 extends from an upper edge of a peripheral wall 7 helically-fitted to an outer periphery of a container cap fitted neck portion 6.

The cylinder 3 is fixed to the container 5 through the mounting cap 2 and is provided with a suction valve 9 in a lower edge portion vertically formed in the interior of the container.

Further, a plurality of ribs 10 are protruded in the peripheral direction along an internally lower portion inside the cylinder 3, and stepped engagement recessed portions 11 of the inner side surface and the upper surface opening are respectively formed on both sides of the upper surface of the individual ribs.

In accordance with this embodiment, the cylinder 3 has a flange 12 protruding outward from the outer peripheral upper portion, and a fitting cylindrical-portion 13 extends downwards from the lower end of the cylinder 3. An upper edge of a suction pipe (unillustrated) is fitted to this fitting cylindrical portion 13, and a lower part thereof extends down vertically toward the lower portion of the container.

Fitted and fixed, further, to the upper edge thereof is an engagement member 14 for engaging the vertically movable member 4 in a depressed state. The engagement member 14 is constructed such that a fitting cylindrical portion is fitted through a rugged engagement element to the upper edge outer periphery of the cylinder 3 and vertically formed from the top wall lower surface, and an inner cylinder 15 fitted to the inner upper portion of the cylinder from the tip wall inner peripheral edge is also vertically formed. The inner cylinder 15 and the upper edge inner surface of the cylinder 3 are hindered from being turning round by vertical protrusions meshing with each other, and, further, a thread for meshing with the vertically movable member is formed along the inner periphery of the inner cylinder 15.

Then, the pump is constructed in such a way that the outward flange 12 is placed through a packing 16 on the upper surface of the container neck portion 6, and the flange 12 is caught by the top wall 8 of the mounting cap 2 helically fitted to the outer periphery of the container neck portion and by the upper surface of the container neck portion 6.

The suction valve 9 is constructed such that a ball-like valve member 18 is placed on a valve seat 17 protruding from the inner lower edge of the cylinder 3.

Further, in accordance with this embodiment, a cylindrical member 19 is fitted to the inner lower portion of the cylinder 3. In the cylindrical member 19, a flange 21 is peripherally formed along the lower edge of the outer periphery of a cylindrical peripheral wall 20, a top wall 22 horizontally extends at the inner upper portion of the peripheral wall 20, and a window hole 23 is holed in the peripheral wall 22 in the lower portion of the top wall. Further, three pieces of radial walls 24 formed at a predetermined intervals and reading to the center extend from the inner surface of the peripheral wall 20 downwardly of the top wall 22, and a notched portion 25 is formed in the lower surface of each radial wall 24. Then, the above flange 21 is fitted to the lower edge of the engagement recessed portion 11 of each rib 10 formed on the cylinder 3, thus fixing the flange 21 to the cylindrical member 19.

Further, a lower edge of a coil-like auxiliary spring 26 secured to the upper edge within each notched portion 25 of the cylindrical member 19 is made to contact and thus engages with the upper surface of the valve member 18 of the suction valve 9, thus biasing the valve 18 in a valve-closing direction at all times. This auxiliary spring 26 is formed so that a resiliency of the spring 26 is smaller than the coil spring for biasing a vertically movable member upward, which coil spring will be mentioned later. The spring 26 has a strength to such an extent as to make the valve openable by an intra cylinder negative pressure due to a rise of the vertically movable member. Owing to an existence of this auxiliary spring 26, it is possible to prevent a liquid leak caused by to an expansion of the air in the container due to a rise in temperature of the outside air.

The vertically movable member 4 includes a stem 28 so provided as to be vertically movable within the cylinder 3 in an upwardly biased state with an annular piston 27 installed in the cylinder and protruding from the outer peripheral lower portion. The vertically member 4 also includes a push-down head 30 with a nozzle 29 attached to the upper edge of the stem 28, and a discharge valve 31 is provided at the upper portion inside the stem 28.

In accordance with this embodiment, the push-down head 30 has a cylindrical casing with an opening formed in the lower edge surface and a peripheral wall perpendicularly extending from the peripheral edge of the top wall, and a lower edge of a vertical cylinder 32 vertically extending from the center of the top wall lower surface of the casing is attached to the outer peripheral upper edge of the stem 28, thus fixing it to the stem 28. Further, a horizontal cylinder 33 with its proximal portion opened to the upper front surface of the vertical cylinder 32 penetrates the casing peripheral wall and protrudes forward therefrom, thus forming this horizontal cylinder by way of a nozzle 29. The nozzle 29 is constructed so that its proximal portion rises obliquely forward, while its tip is bent obliquely downward.

Furthermore, a thread formed along the outer periphery of the vertical cylinder 32 with respect to a portion protruding downward from the casing meshes with the thread of the engagement member 14 when pushing down the vertically movable member 4 and is thus made possible of engaging therewith in the state where the vertically movable member 4 is pushed down. Also, the construction is such that the inner peripheral lower edge of the stem 28 is liquid-tightly fitted to the outer peripheral upper portion of the cylindrical member peripheral wall 20 on that occasion. Further, the construction is such that the outer peripheral lower edge of the vertical cylinder 32 is liquid-tightly fitted to the inner surface of a reducible diameter portion 34 formed at the lower portion of the inner cylinder 15 of the engagement member 14.

The discharge valve 31 is provided so that a valve member 35 for clogging the valve hole formed in the inner upper portion of the stem 28 is vertically moved by a liquid pressure.

In accordance with this embodiment, the valve hole is holed in the center by making a valve seat 36 protrusive at the inner upper portion of the stem 28, the ball-like valve member 35 is put on the valve seat 36, the valve hole is thus clogged, thereby constructing the discharge valve 31. Further, the valve member 35 is so constructed as to be vertically movable up to a position where it impinges on the lower surface of an engagement plate 37 extending from the top wall of the casing.

The vertically movable member 4 is always biased upward by a coil spring 38.

Figure 3:
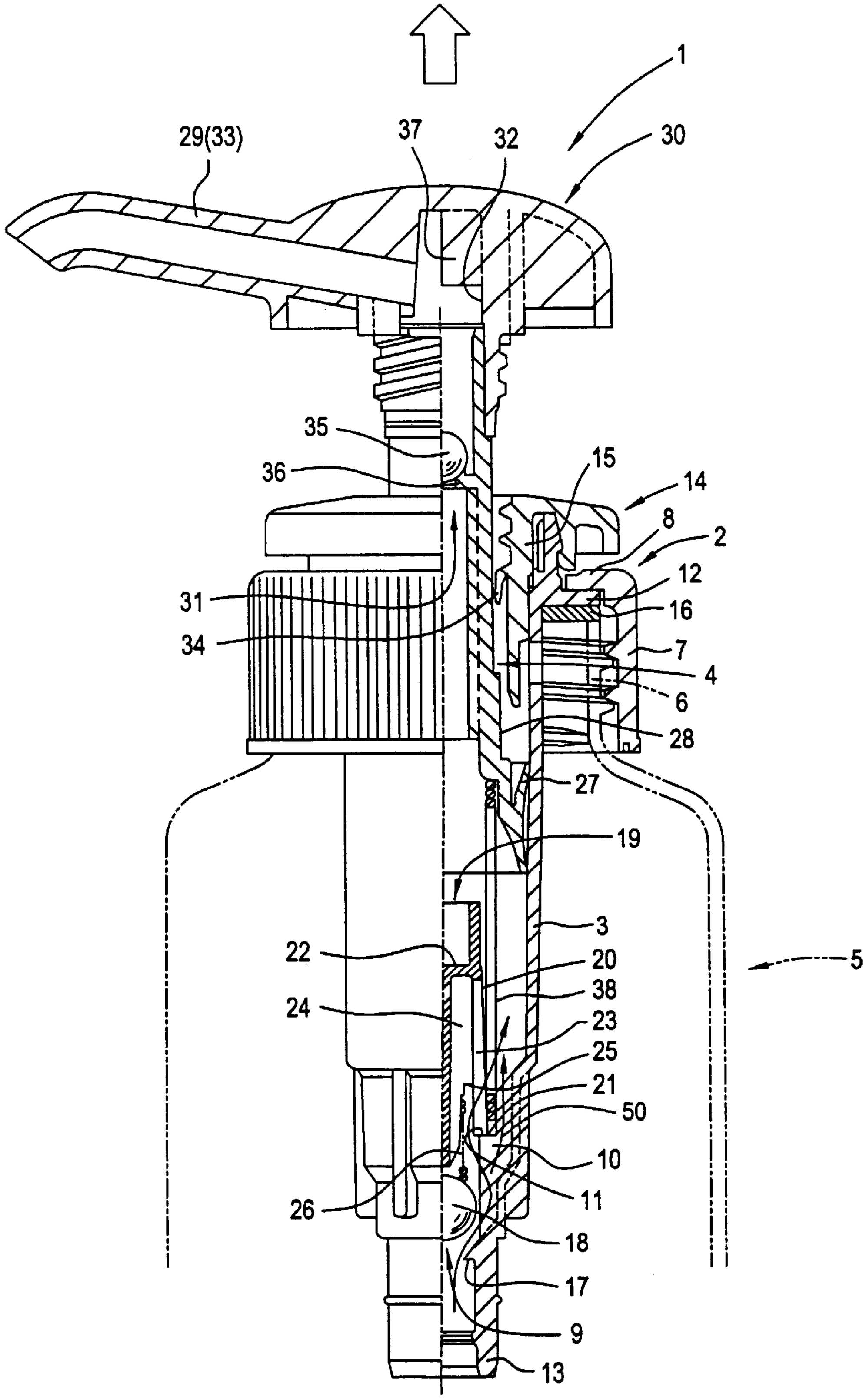
FIG. 3 is an explanatory side view with some portion cut away, showing a state where the operating member is raised in the same embodiment.
Figure 4:
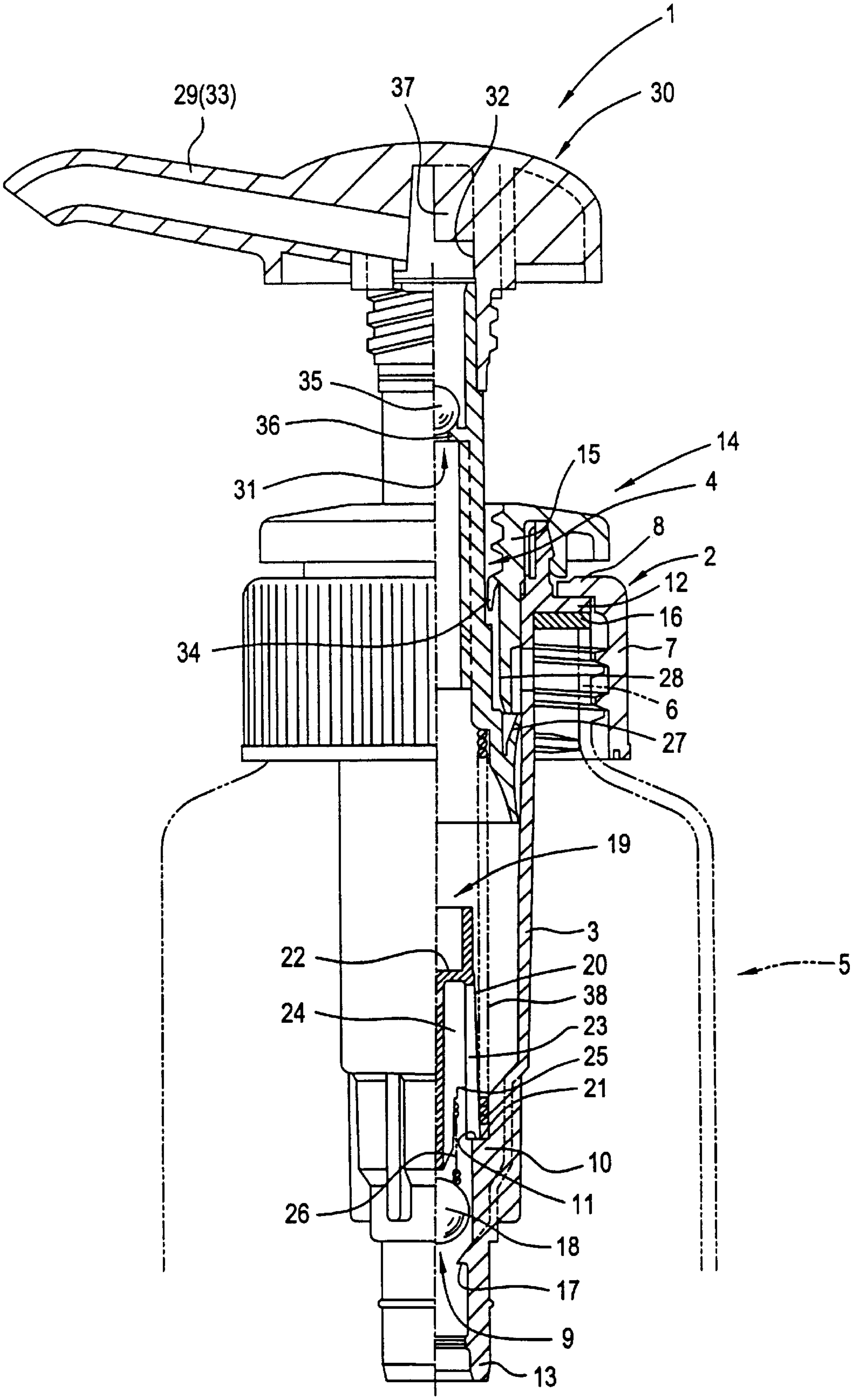
FIG. 4 is a side view with some portion cut away, illustrating a maximum ascent position of the operating member in the same embodiment.
Figure 5:
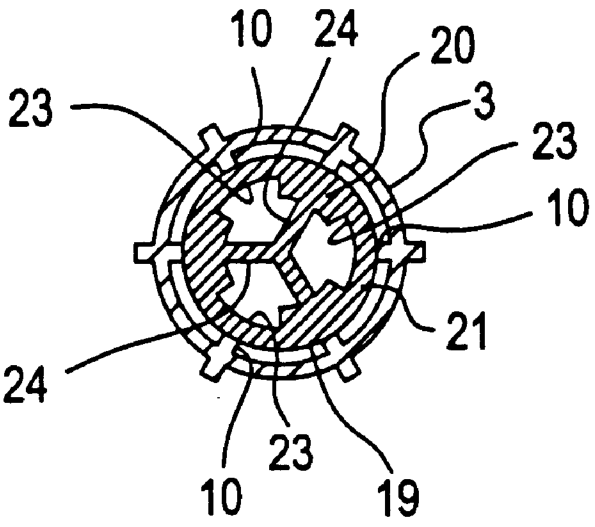
FIG. 5 is a cross-sectional view taken substantially along the lien A—A of FIG. 1 in the same embodiment.

In this embodiment, the coil spring 38 is secured by engaging with the upper surface of the flange having its upper edge fitted and engaged with the lower edge surface of the stem 28 and its lower edge fitted and fixed onto the engagement recessed portion 11, and, as illustrated in FIG. 3, there is formed a liquid passageway 50 which enables the liquid to flow across inwardly outwardly of the lower edge of the spring 38 on both sides thereof.

Figure 6:
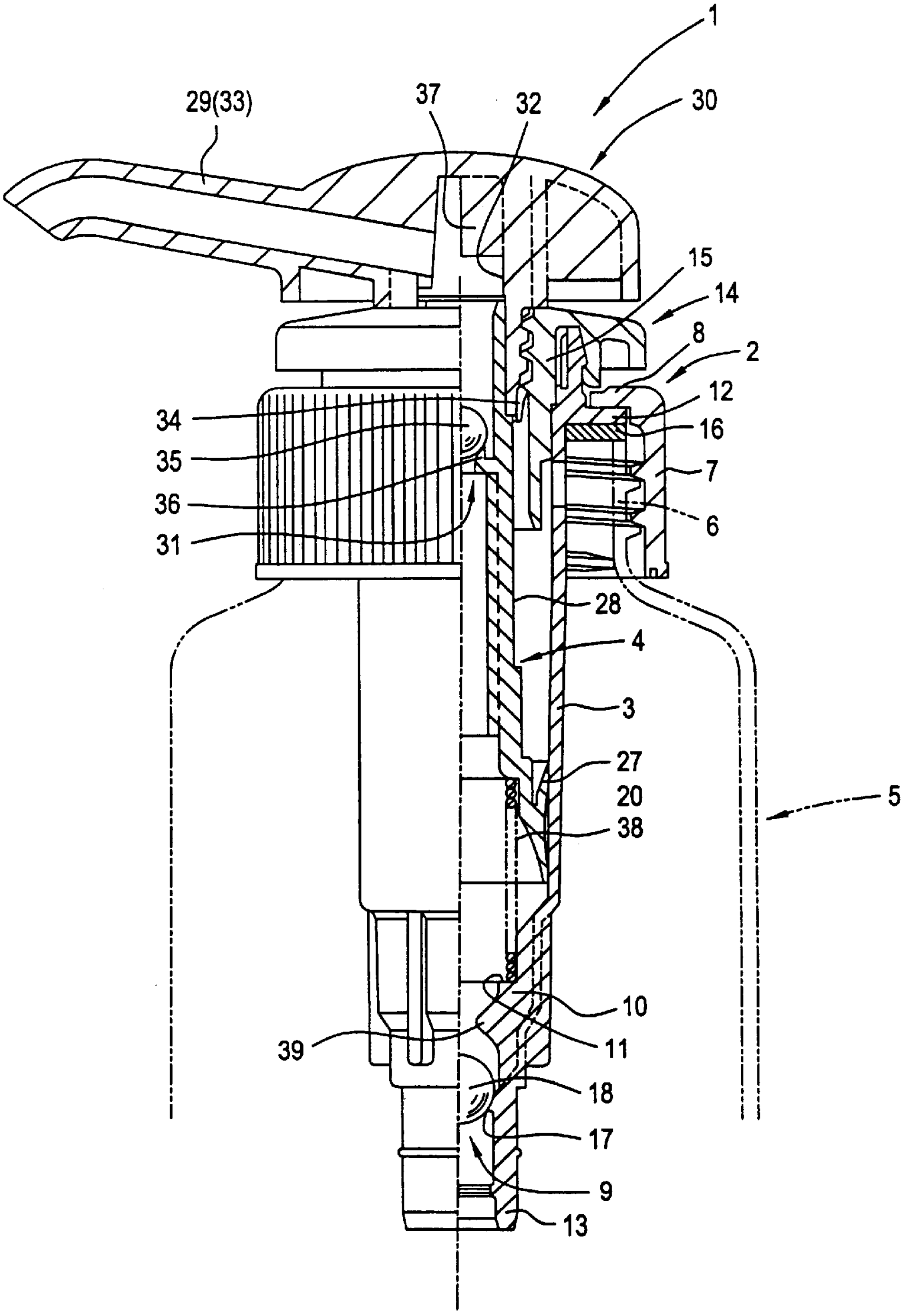
FIG. 6 is a side view with some portion cut away, illustrating another embodiment of the present invention.
Figure 7:
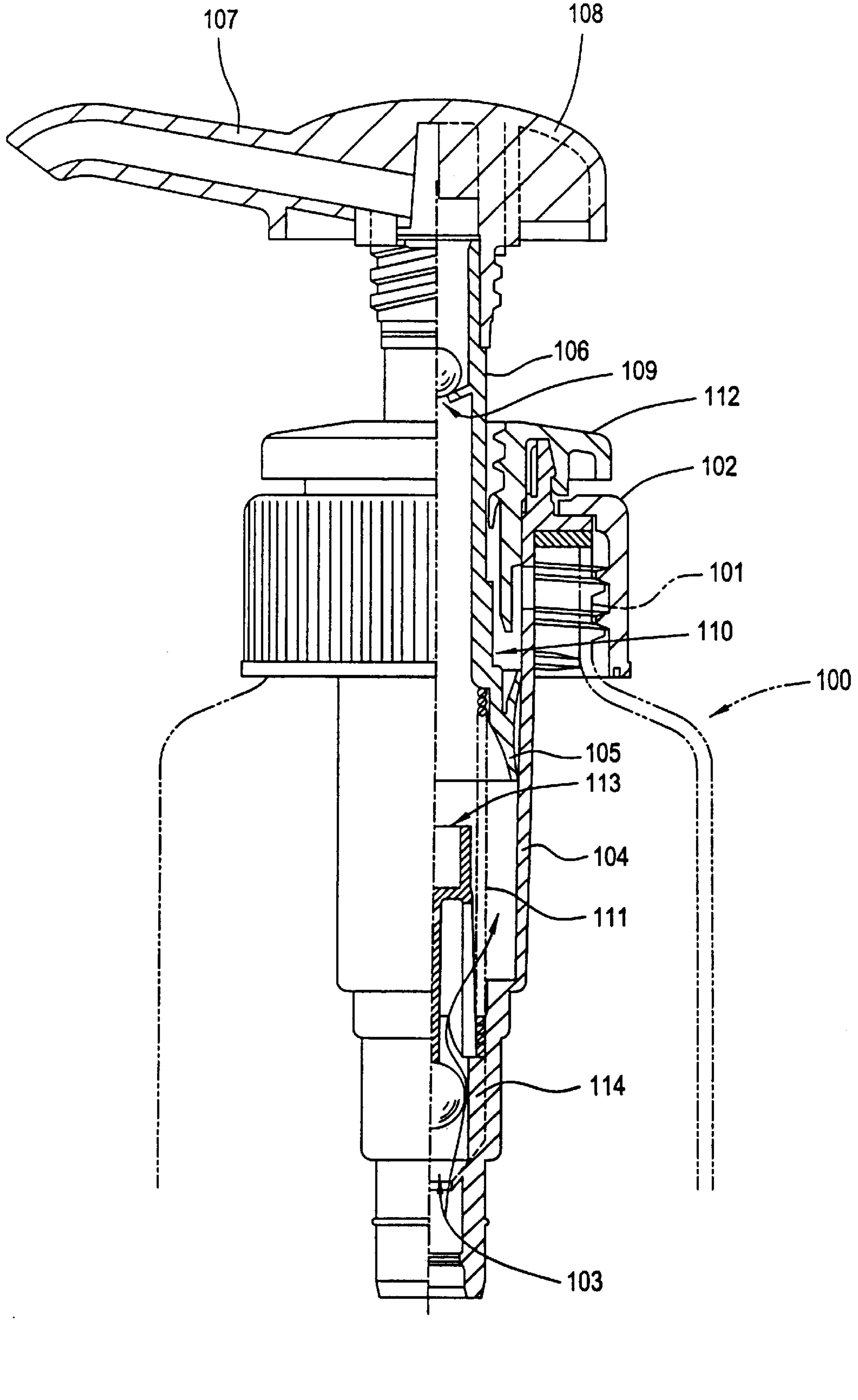
FIG. 7 PRIOR ART
FIG. 7 is a side view with some portion cut away, showing a prior art pump.
Figure 8:
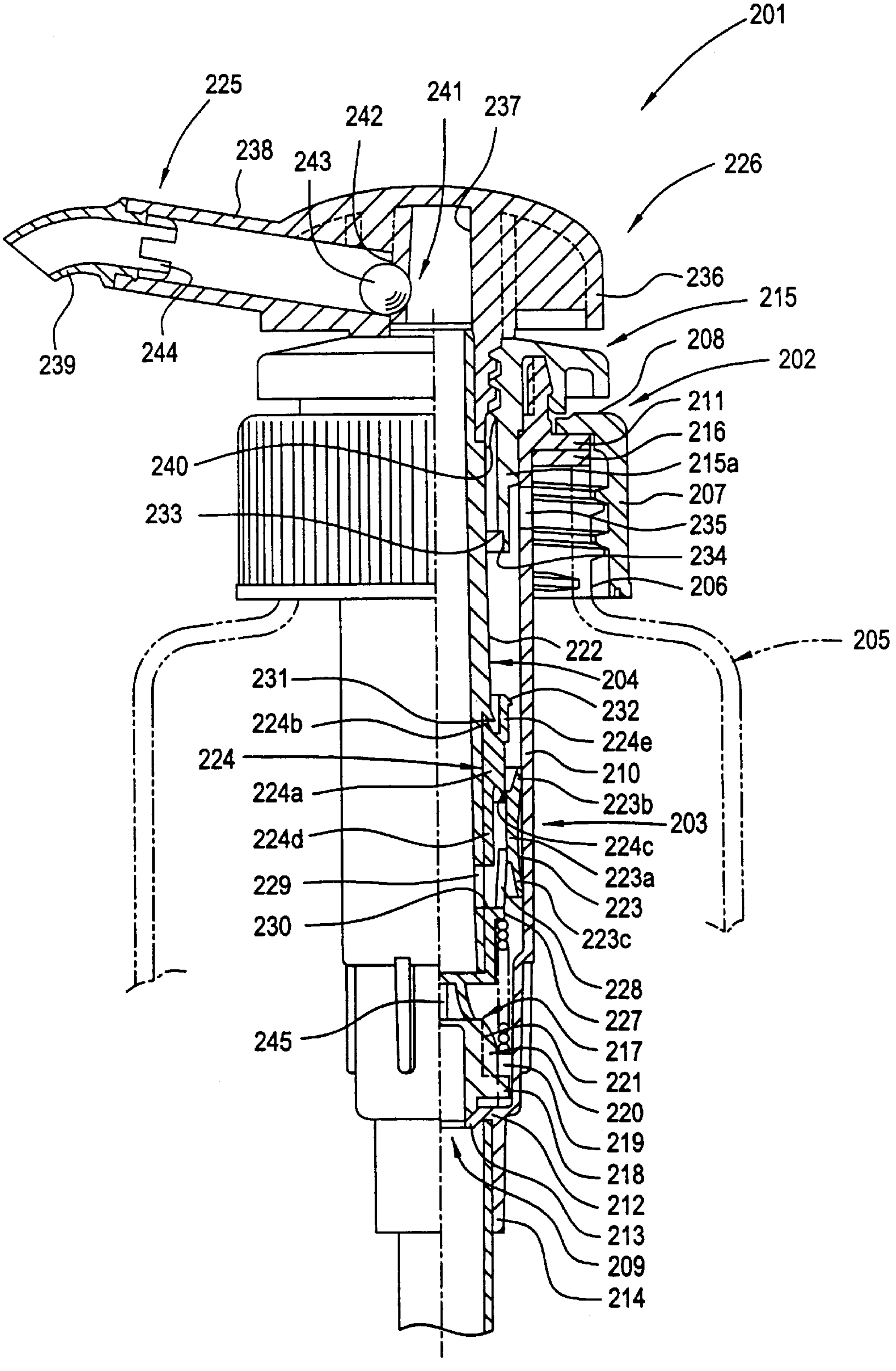
FIG. 8 is a sectional view illustrating one embodiment of the present invention.
Figure 9:
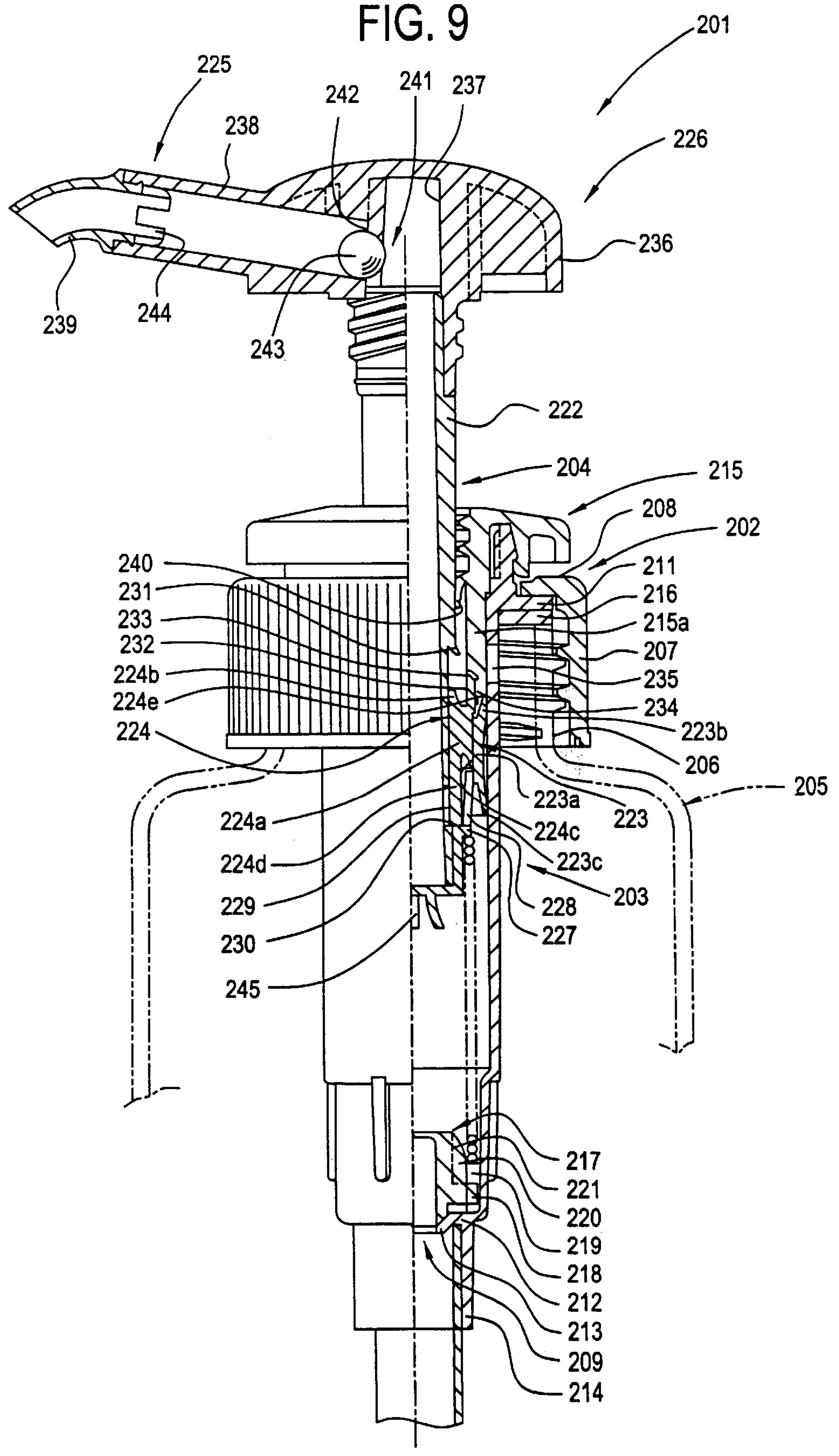
FIG. 9 is an explanatory sectional view showing a maximum ascent position of the head in the same embodiment.
Figure 10:
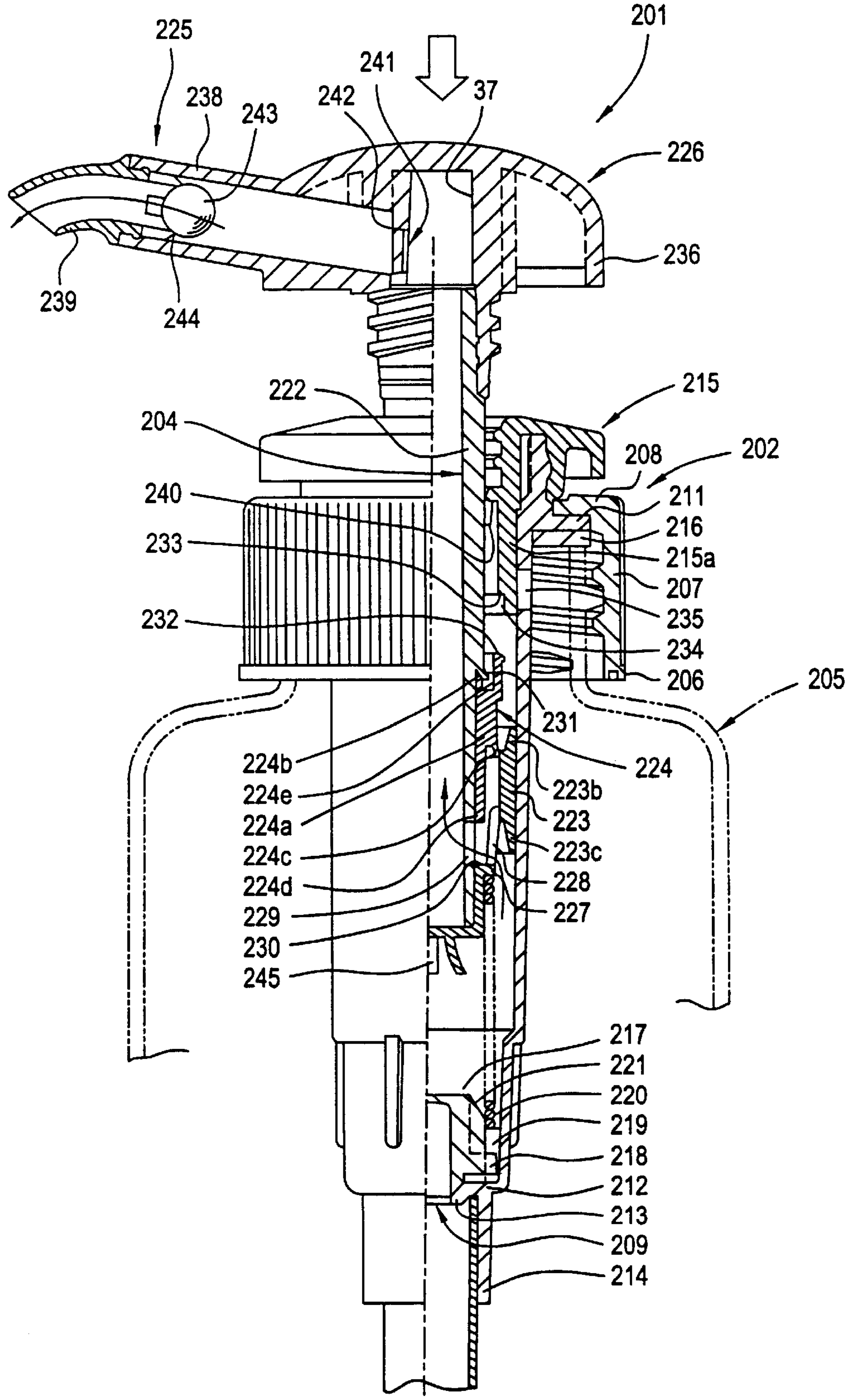
FIG. 10 is an explanatory sectional view when pushing down the head in the same embodiment.
Figure 11:
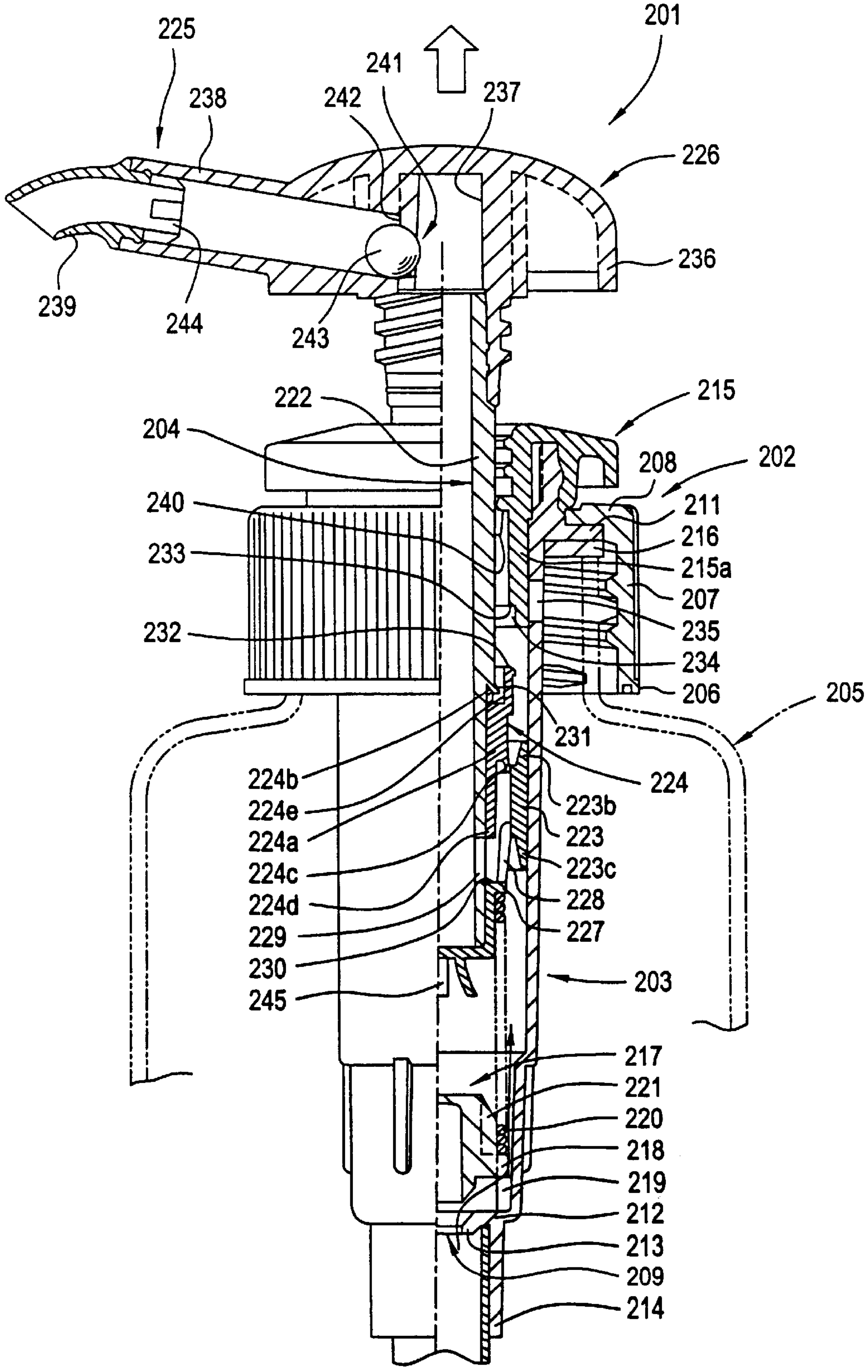
FIG. 11 is an explanatory view when the head is raised in the same embodiment.

FIG. 6 illustrates another embodiment of the present invention. In accordance with this embodiment, there is provided no cylindrical member 19, and the lower edge of the coil spring 38 is engaged and secured directly to the lower edge of the engagement recessed portion 11 of each rib 10. Further, a protrusion 39 so constructed as to protrude from the inner surface of each rib 10 serves to regulating a rise of the suction valve member 18. Other configurations are the same as those in the above-discussed embodiment, and hence the elements are marked with the like numerals.

Note that the engagement recessed portion 11 formed in each rib 10 is formed as the engagement recessed portion 11 with its inner side surface and its upper surface opening. If there is no cylindrical member 19, however, there may also be a notch groove recessed portion with only upper surface opened. In short, the recessed portion may be formed so that the liquid is allowed to flow across inwardly outwardly of the lower edge of the coil spring 38 on both sides.

Further, the respective members are properly selectively composed of synthetic resins, metals and materials such as particularly elastomer exhibiting an elasticity.

As explained above, the pump according to the present invention is constructed so that the liquid is allowed to flow across inwardly outwardly of the lower edge of the coil spring biasing the vertically movable member at all the times. Therefore, the liquid flowing into the cylinder via the suction valve can be quickly raised up to the upper portion of the cylinder while rising straight especially along the outer portion of the spring. As a result, there is eliminated such an inconvenience that the vertically movable member is decelerated in ascent, and the vertically movable member is capable of moving quickly. In particular, even when jetting the liquid with a viscosity as high as over 4000 cps enough to conspicuously hinder the movement of the vertically movable member, the vertically movable member is able to perform the smooth movements.

Further, the pump exhibits such advantages that the pump can be constructed by modifying a part of structure of this kind of conventional pump and is therefore easily manufactured at a low cost.

The vertically movable member 4 is constructed in the push-down possible-of-engaging manner, and the engagement recessed portion 11 is formed as the engagement recessed portion 11 with the inner side surface and the upper surface opened. The flange 21 fitted and fixed to the lower edge portion of each engagement recessed portion 11 is protruded from the outer periphery of the lower edge of the topped peripheral wall 20, a window hole 23 piercing the peripheral wall 20 inside and outside, and, besides, there is provided the cylindrical member 19 constructed so that the outer periphery of the upper edge of the peripheral wall 20 is liquid tightly fittable to the inner surface of the lower edge of the stem in the a push-down possible-of-engaging state. In the thus constructed liquid jet pump, it is possible to prevent the liquid leak even if the container is carelessly turned over because of the stem lower edge portion being liquid tightly clogged in the push-down possible-of-engaging state of the vertically movable member, and the vertically movable member can be quickly moved.

Further, according to the liquid jet pump constructed in such a way that the suction valve member 18 is always biased in the valve closing direction by the auxiliary spring 26 interposed between the cylindrical member 19 and the valve member 18 of the suction valve 9, in addition to the effect described above, the suction valve does not open even if the air within the container mounted with the pump expands due to an increase in temperature of the outside air, and accordingly the liquid leakage never happens.

Still another embodiment of the present invention will hereinafter be described with reference to the drawings.

Figure 12:
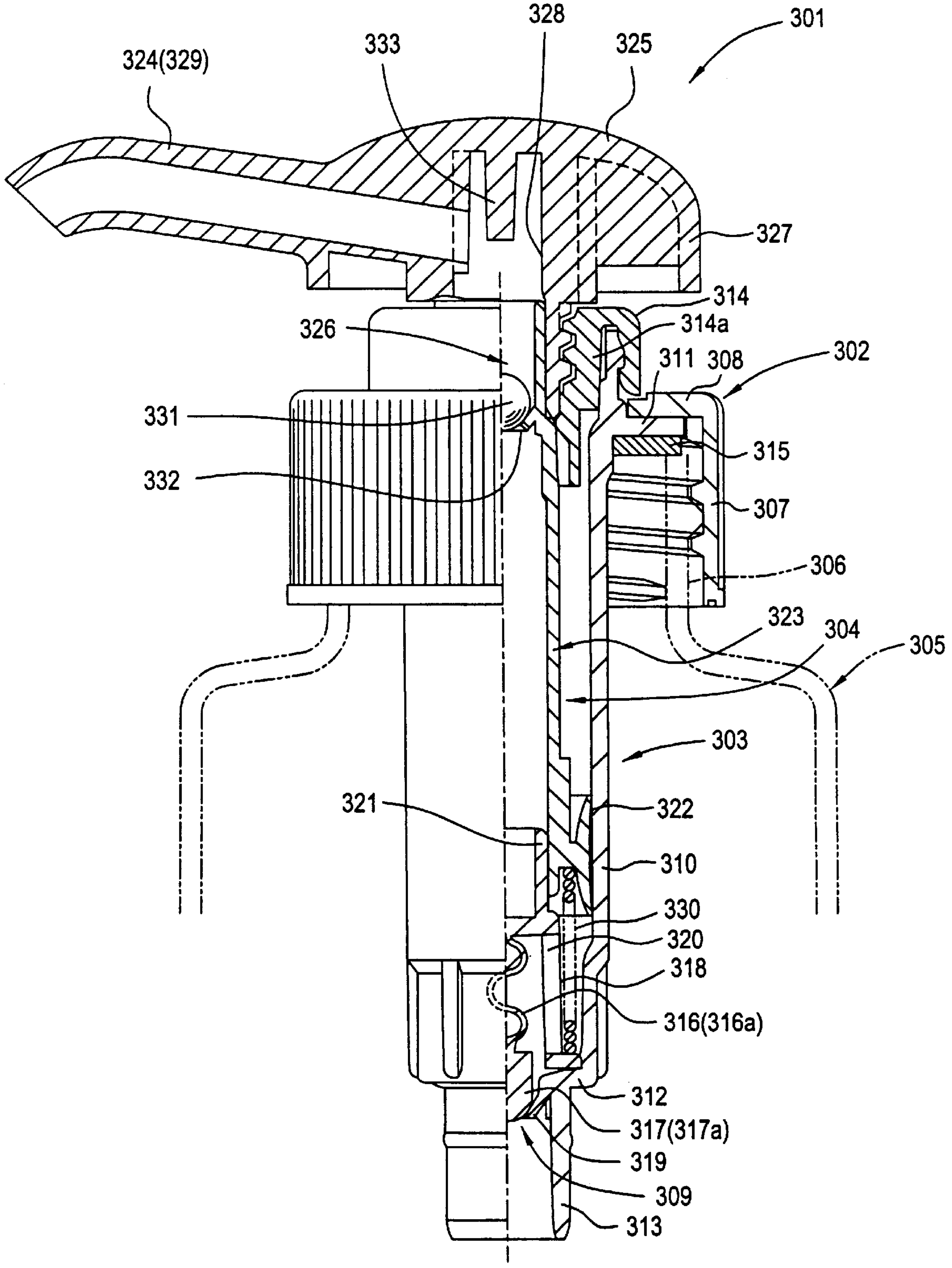
FIG. 12 is a sectional view illustrating pone embodiment of the present invention.
Figure 13:
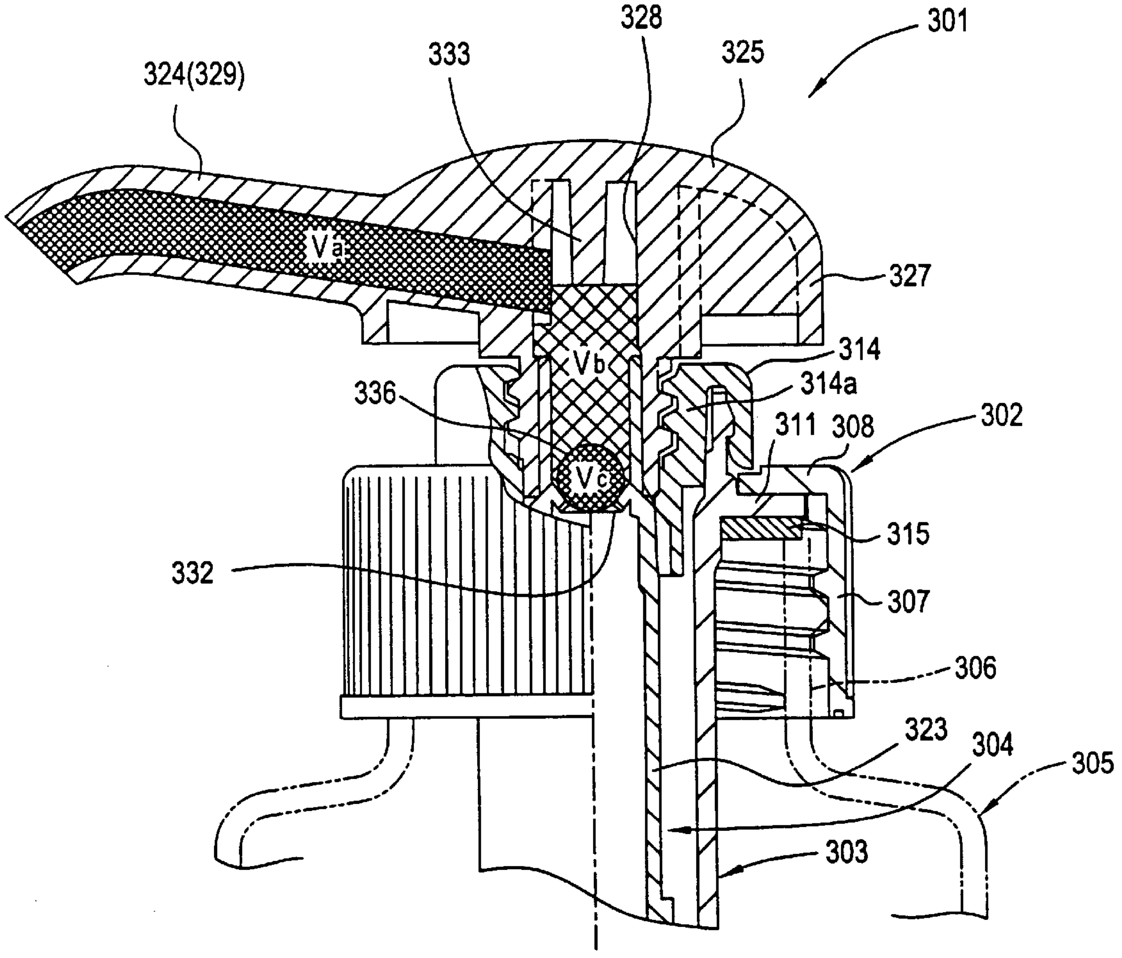
FIG. 13 is an explanatory view illustrating a pu-down head in the same embodiment.
Figure 14A:
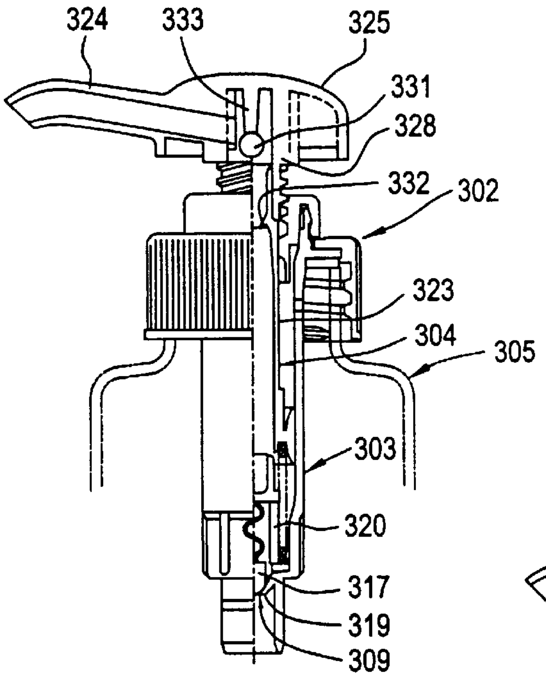
FIG. 14 is an explanatory view of assistance in explaining how a liquid is jetted in the same embodiment.
Figure 14B:
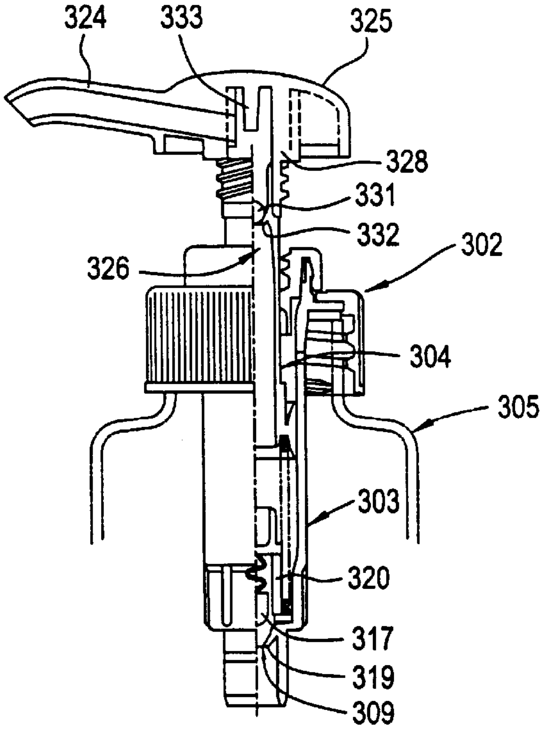
Figure 14C:
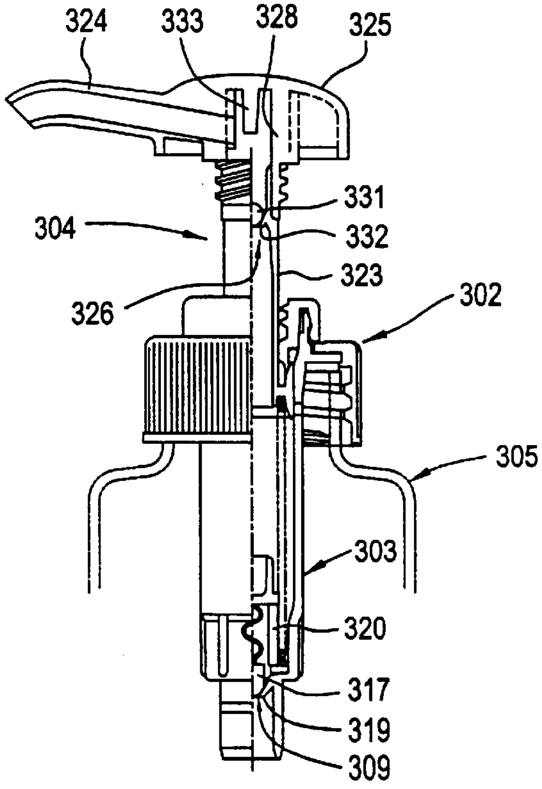

FIGS. 12 and 13 illustrates an embodiment of the present invention, wherein the numeral 301 represents a liquid jet pump. The pump 301 includes a mounting cap 302, a cylinder 303 and a vertically movable member 304.

The mounting cap 302 serves to fix the cylinder 303 to a container 305 and is constructed such that an inward-flange-like top wall 308 extends from an upper edge of a peripheral wall 307 helically-fitted to an outer periphery of a container cap fitted neck portion 306.

The cylinder 303 is fixed to the container 305 through the mounting cap 302 and is provided with a suction valve 309 in a lower edge portion vertically formed in the interior of the container.

In accordance with this embodiment, the cylinder 303 has a flange 311 protruding outward from the outer peripheral upper portion of a cylindrical peripheral wall 310, and a fitting cylindrical portion 313 extends downwards from a peripheral edge of a window hole holed in the central portion of a bottom wall 312. An upper edge of a suction pipe (unillustrated) is fitted to this fitting cylindrical portion 313, and an engagement member 314 for engaging the vertically movable member 304 in a push-down state is fixedly fitted to the upper edge portion of the peripheral wall 310. The engagement member 314 is constructed so that a flange extends inward from the upper edge of the fitting cylindrical portion fitted via a rugged engagement element to the outer periphery of the upper edge of the cylinder 303, and an inner cylinder 314*a* fitted to an inner upper portion of the cylinder 303 vertically extends from the inner peripheral edge of this flange. The inner cylinder 314*a* and the upper edge inner surface of the cylinder 303 are prevented from being turned round owing to vertical protrusions meshing with each other, and, further, a thread for meshing with the vertically movable member is formed along the inner periphery of the inner cylinder 314*a*.

Then, the pump is constructed in such a way that the outward flange 311 is placed through a packing 315 on the upper surface of the container neck portion 306, and the flange 311 is caught by the top wall 308 of the mounting cap 302 helically fitted to the outer periphery of the container neck portion and by the upper surface of the container neck portion 306.

The suction valve 309 in this embodiment has a valve member 317 biased in the valve hole clogging direction at all times by a resilient member 316.

In accordance with this embodiment, the flange is protruded from the lower edge outer periphery of the peripheral wall of a fixed cylinder 318 taking a cylindrical shape with its lower end surface opened and is fixedly attached to the lower edge portion of a peripheral wall 310 as well as to the cylinder bottom wall 312. A corrugated leaf spring 316*a* serving as a resilient member 316 is integrally protruded from the center of the top wall rear surface of the fixed cylinder 318, and a bullet-like valve member 317*a* is provided vertically downward integrally with the lower edge of the leaf spring 316*a* and is press-fitted to a valve 319 protruding from the central window hole peripheral edge of the cylinder bottom wall 312. A plurality of vertical notch grooves 320 extending in the peripheral direction are formed in the peripheral wall of the fixed cylinder 318, thereby enabling the liquid to flow in and out of the cylinder. The liquid sucked through the suction valve is led into the cylinder 303 via the notch groove 320. Further, a seal cylinder 321 extends from the peripheral edge of the upper surface of the fixed cylinder 318, and the stem lower edge inner surface is liquid-tightly fitted to the seal cylinder 321 when the vertically movable member 304 is pushed down and engaged.

The vertical movable member 304 incudes a stem 323. The stem 323 is provided vertically movable within the cylinder 303 in an upward biasing state, wherein an annular piston 322 fitted into the cylinder protrudes from the lower portion of the outer periphery. The vertically movable member 304 also includes a push-down head 325 with a nozzle 324 attached to the upper edge of the stem 323. A discharge valve 326 is provided on the upper portion within the stem 323.

In accordance with this embodiment, the push-down head 325 has a cylindrical casing 327 with its peripheral wall perpendicularly extending from the top wall peripheral edge and its lower edge surface opened. The lower edge of a vertical cylinder 328 extending vertically from the center of the lower surface of the top of the casing 327 is attached to the outer peripheral upper edge of the stem 323, thus fixing it to the stem 323. Further, a horizontal cylinder 329 with its proximal end portion opened to the upper front surface of the vertical cylinder 328 pierces the casing peripheral wall and protrudes forward and is thus constructed as a nozzle 324. The nozzle 324 is constructed so that the proximal end portion thereof extends forward upward and obliquely, while its tip descends obliquely. With this configuration, a drop of the liquid can be prevented.

Further, a thread is formed on the outer periphery of the vertical cylinder 328 with respect to a portion protruding downward from the casing 327 and, when pushing down the vertically movable member 304, meshes with the thread of the engagement member 314, thus making it possible of engagement in the state where the vertically movable member 304 remains pushed down. Further, on this occasion, the inner peripheral lower edge of the stem 323 is liquid-tightly fitted to the outer periphery of the seal cylinder 321. Moreover, the outer peripheral lower edge of the vertical cylinder 328 is liquid-tightly fitted to the inner surface of the reducible diameter portion provided in the lower portion of the inner cylinder 314*a* of the engagement member 314.

Further, a coil spring 330 is interposed between the lower surface of a mounting proximal portion of the annular piston 322 and the upper surface of the flange of the fixed cylinder 318 and works to bias the vertically movable member upward at all times.

The discharge valve 326 is provided so that the valve member 331 for clogging the valve hole formed in the inner upper portion in the stem 323 is vertically moved by a liquid pressure.

In accordance with this embodiment, a flange-like valve seat 332 descending inward obliquely is protruded at the upper portion within the stem 323, and then a valve hole is formed in the central portion thereof. The valve member 331 composed of a ball valve member is placed on the valve seat 332 to clog the valve hole, thus constituting the discharge valve 326. Further, the valve member 331 is so formed as to be vertically movable up to a position where it impinges on the lower surface of an engagement rod 333 extending perpendicularly from the top wall of the casing 327.

According to the present invention, if a length and an inside diameter of the nozzle, an inside diameter of the head vertical cylinder, and a volume of the discharge valve member are the same as those in the prior art, a vertical stroke of the discharge valve member 331 is set larger by a predetermined quantity than in the conventional one, thereby preventing the drop of liquid from expelling out from the nozzle.

Let Va be the volumetric capacity of the nozzle 324, let Vb be the volumetric capacity of a liquid passageway where the discharge valve member 331 is vertically movable, and let Vc be the volume of the discharge valve member 331, wherein the vertical stroke of the discharge valve member 331 is regulated so that Vb−Vc is equal to or larger than Va. An actual vertical stroke of the discharge valve member 331 based on this regulation is, though different depending on the length and inside diameter of the nozzle and the inside diameter of the stem 323, on the order of 5 mm–30 mm larger than in this type of conventional pump. More preferably, the actual vertical stroke thereof is 10 mm or above.

The pump according to the present invention is utilized for jetting the liquid exhibiting the high viscosity on the order of, e.g., 500 cps–800 cps. When using the high viscosity liquid as described above, it hardly happens that the discharge valve member 331 pushed up by the liquid pressure immediately drops down to the valve seat 332 by a self-weight thereof. The discharge valve member 331 vertically moves substantially along the flow of liquid, although slightly different depending on the liquid viscosity and a weight of the valve member. Accordingly, there is seen no remarkable error between a flow rate of the liquid and a moving velocity of the valve member.

Further, the vertical stroke of the discharge valve member 331 is set to the above condition, and, after the liquid has been jetted out by pushing down the vertical movable member 304, the liquid in the vertical cylinder 328 thereby flows back into the cylinder 303 negative-pressurized when the vertical movable member 304 rises. Consequently, the liquid the nozzle 324 flows back into the vertical cylinder 328. On this occasion, since Vb−Vc equal to Va or larger, the intra nozzle liquid substantially flows back into the vertical cylinder, thereby preventing the liquid drop from expelling out from the tip of the nozzle or preventing the liquid from being dry-solidified.

Figure 15:
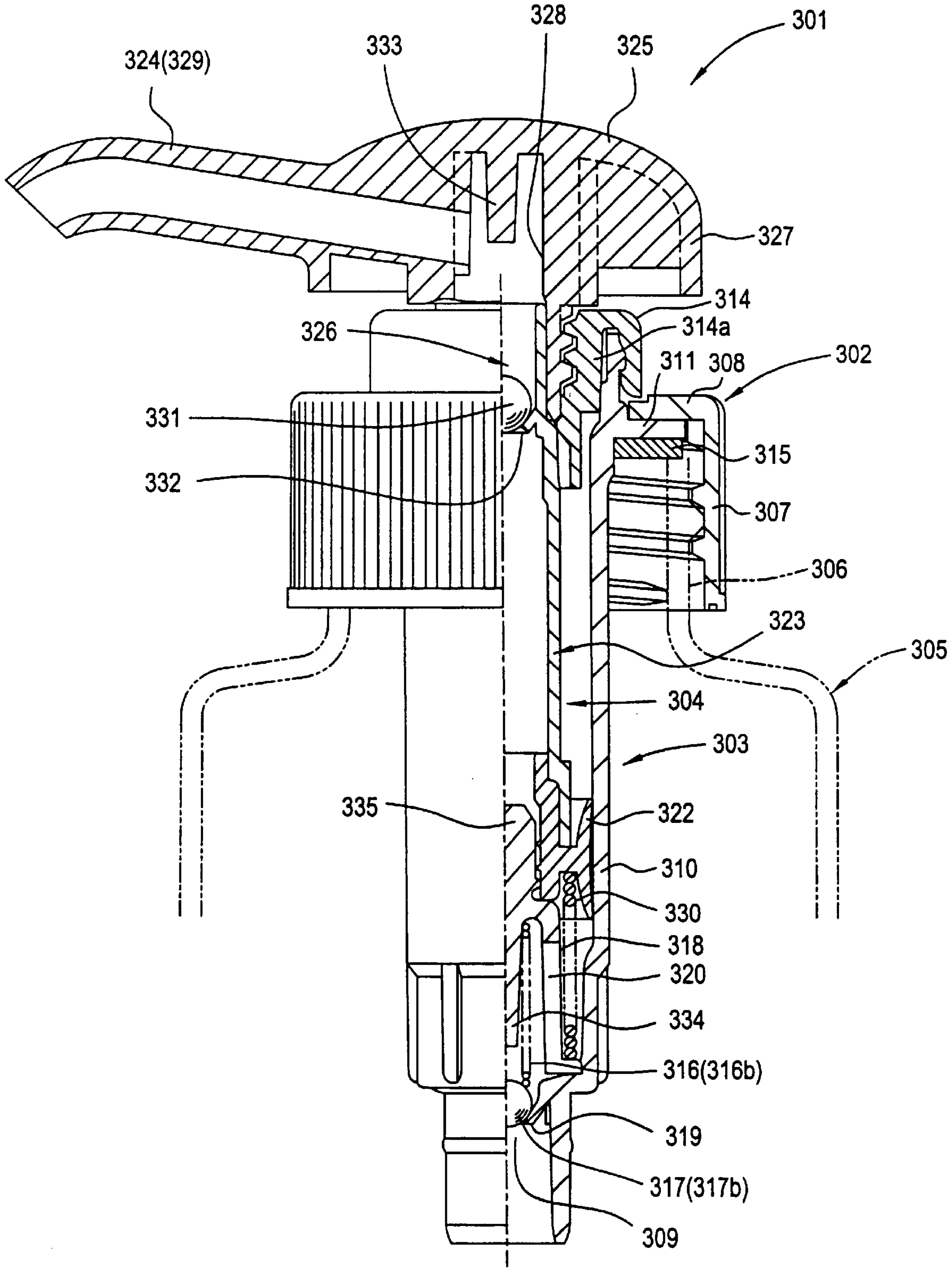
FIG. 15 is a vertical sectional view illustrating still another embodiment of the present invention.

FIG. 15 illustrates yet another embodiment of the present invention, wherein the suction valve has a structure different from that shown in the above-discussed embodiment.

In accordance with this embodiment, a ball-like suction valve member 317*b* is used in place of the bullet-like valve member employed in the preceding embodiment. Further, a lower edge of a coil spring 316*b* serving as a resilient member 316 with its upper edge secured to the outer periphery of a bar-like protrusion 334 protruding perpendicularly from the center of the top wall rear surface of the fixed cylinder 318 is press-fitted to the upper surface of the valve member 317*b*. Moreover, a bar-like protrusion 335 protrudes from the top wall upper surface of the fixed cylinder instead of the seal cylinder 321, and the stem inner peripheral surface is light-tightly fitted to the outer periphery of the protrusion 335 when the vertically movable member 304 is pushed down against the biasing force. Other configurations are the same as those in the embodiment discussed above.

Figure 16:
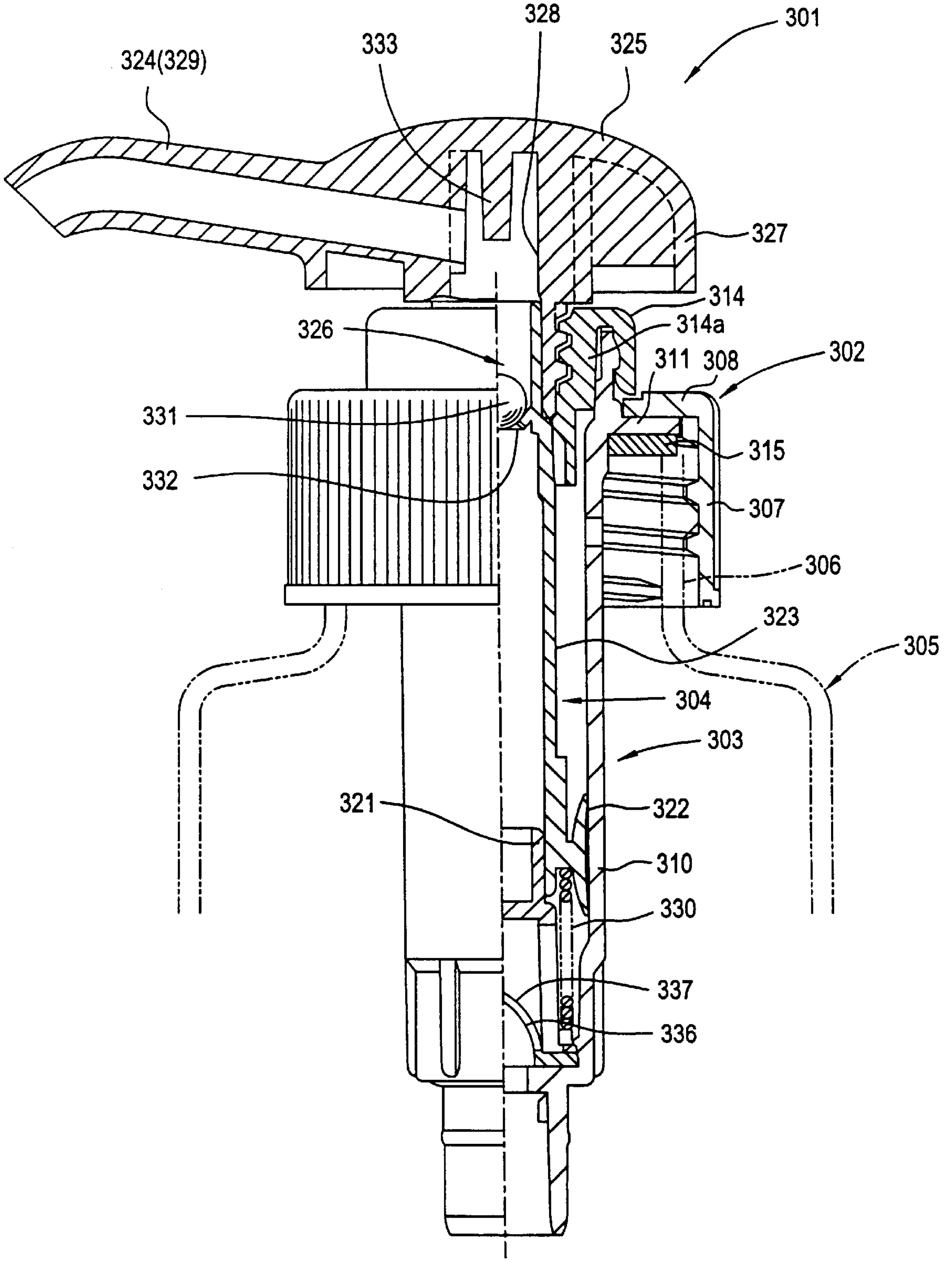
FIG. 16 is a vertical sectional view illustrating yet another embodiment of the present invention.
Figure 17:
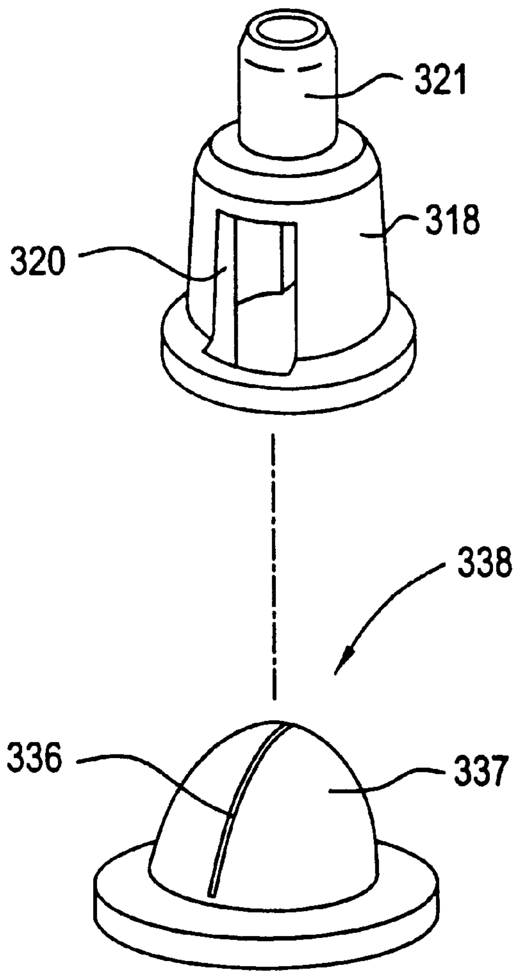
FIG. 17 is a perspective view showing a suction valve member and a fixed cylinder in the same embodiment.

Further, FIGS. 16 and 17 illustrate a further embodiment. In accordance with this embodiment, the suction valve 309 is constructed of a dome-like valve plate 337 formed with a slit 336 which serves to close a lower edge opening of the cylinder 303 by fixedly fitting its lower periphery to the inner lower edge of the cylinder 303.

In this embodiment, a flange extends outward from the lower edge of the dome-like valve plate 337 as shown in FIGS. 16 and 17, and there is prepared a valve member 338 formed with a slit 336 which traverses the central portion of the dome-like valve plate 337. On the other hand, there is prepared the same fixed cylinder 318 as that in the embodiment discussed above, and the flange is interposed between the flange lower surface of the fixed cylinder 318 and the cylinder bottom, wall 312, thereby fixing the valve member 338.

Then, when the interior of the cylinder 303 is negative-pressurized, the slit 336 is opened by the liquid pressure, with the result that the liquid is lead into the cylinder 303. On the other hand, when the interior of the cylinder 303 is pressurized, the slit 336 won't open so as to hinder communicating between the interior of the cylinder 303 and the interior of the container.

Other structures are the same as those in the embodiment illustrated in FIG. 12.

Figure 18:
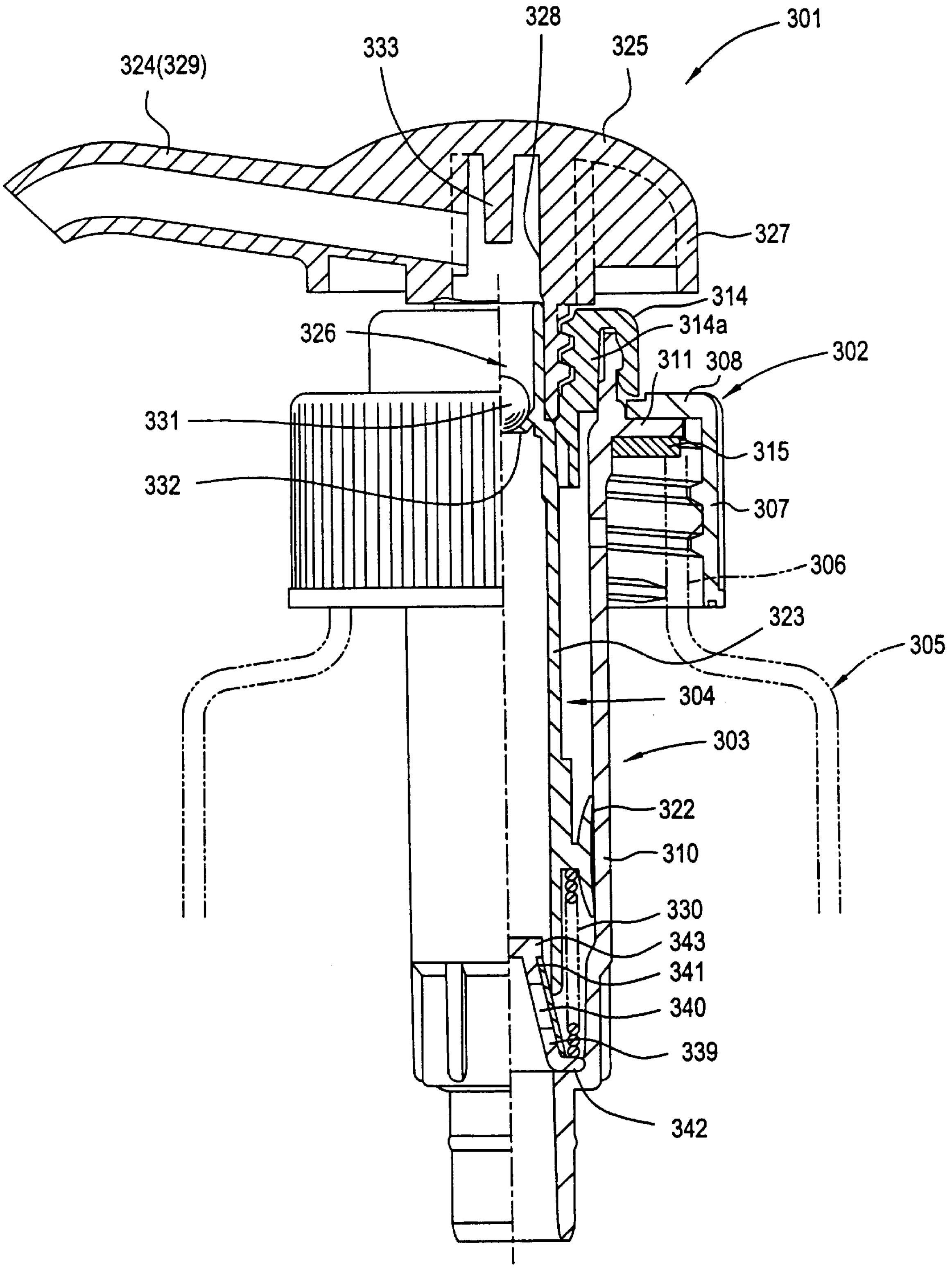
FIG. 18 is a vertical sectional view showing a further embodiment of the present invention.
Figure 19A:
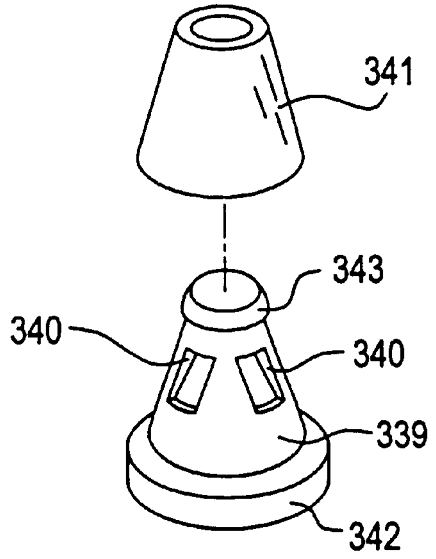
FIG. 19 is an explanatory view showing a structure of the suction valve in the same embodiment.
Figure 19B:
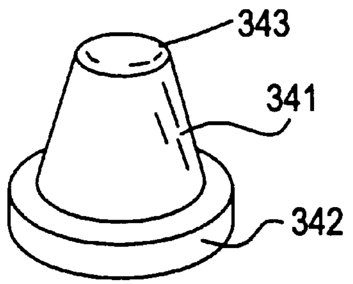

FIGS. 18 and 19 illustrate a still further embodiment. In this embodiment, the suction valve 309 is constructed of a hollow truncated cone proximal portion 339 with its lower end surface opened that serves to clog the lower edge opening of the cylinder 303 by fixedly fitting the lower edge periphery to the inner lower edge of the cylinder 303. The suction valve 309 is also constructed of an elastic cylinder 341 so closely fitted to the outer periphery of the peripheral wall of the proximal portion as to be unremovable by liquid-tightly clogging a window hole 340 holed in the peripheral wall of the proximal portion 339.

In accordance with this embodiment, as illustrated in FIG. 19, the suction valve 309 comprises the proximal portion 339 including flanges 342, 343 protruding from the outer peripheral upper and lower edges. The suction valve 309 also comprises the hollow truncated cone elastic cylinder 341 with its upper and lower edge surfaces opened. Further, when the vertically movable member 304 is pushed down against the biasing force, the outer surface of the elastic cylinder 341 is sealed with the lower edge of the stem 323.

Other structures are the same as those in the embodiment shown in FIG. 12.

Note that the respective members described above are properly selectively composed of synthetic resins, metals and materials such as particularly elastomer exhibiting an elasticity.

In the suction valve 309 in the embodiment illustrated in FIGS. 12 and 15, the valve member 317 is always biased in the valve hole clogging direction, and hence the suction valve 309 is surely prevented from being opened till the discharge valve member 331 is closed.

Further, in the embodiment illustrated in FIG. 16, the valve plate 337 takes the dome-like shape, and, therefore, when the vertically movable member 304 is pushed down, the pressure is applied in the central direction of the interior thereof while the slit 336 remains closed. On the other hand, when the vertically movable member 304 rises, the interior of the cylinder 303 is negative-pressurized, and hence the forces are radially applied to the valve plate 337 from the center, with the result that the slit 336 opens resisting a resilient force of the valve plate 337.

Further, in the embodiment illustrated in FIG. 18, similarly, a window hole 40 is clogged by a elastic cylinder 41 pressured from outside in the pressured state with the cylinder 3. While in the negative-pressured state within the cylinder 3, the liquid from each window hole 40 expands the elastic cylinder 41 and is thereby led into the cylinder from a gap with respect to the peripheral wall of the proximal portion 39.

In any of the respective embodiments shown in FIGS. 16 and 18, as in the embodiment of FIG. 12, there is required a larger opening pressure than the suction valve constructed simply by placing the ball-like valve member on the valve seat, and the suction valve 309 is certainly prevented from being closed till the discharge valve member is closed.

As discussed above, in the pump according to the present invention, the vertical stroke of the discharge valve member is regulated so that $Vb-Vc$ is equal to or larger than $Va$, where $Va$ is the volumetric capacity of the nozzle, $Vb$ is the volumetric capacity of the passageway where the discharge valve member is vertically movable, and $Vc$ is the volume of the discharge valve member. Accordingly, where the pump according to the present invention is employed for discharging the liquid exhibiting the viscosity, when the vertically movable member is raised after the liquid has been jetted upon pushing down the vertically movable member, the intra head vertical cylinder liquid of a quantity that exists substantially within the nozzle flows back into the cylinder till the discharge valve is closed, and the intra nozzle liquid correspondingly flows back into the vertical cylinder of the head. Then, the intra nozzle liquid is substantially removed, and, as a result, the liquid dropping from the nozzle tip can be obviated. Further, the intra nozzle liquid flows back substantially into the vertical cylinder of the head, and hence there is caused no inconvenience in which the liquid is dry-solidified.

Moreover, the suction valve can be certainly prevented from being opened till a predetermined quantity of liquid from the valve hole of the discharge valve flows back into the cylinder and the discharge valve is closed. Therefore, it is possible to prevent the intra nozzle liquid from flowing back into the head vertical cylinder more surely. As a result, the liquid can be prevented from dropping and being dry-solidified more preferably. Further, the pump can be manufactured by modifying a slight part of the structure of the prior art pump and therefore exhibits such an advantage that it can be easily manufactured at low costs.

A yet further embodiment of the present invention will hereinafter be described with reference to the drawings.

FIGS. 20 to 24 illustrate one embodiment of the present invention, wherein the numeral 401 designates a liquid jet pump. The pump 401 includes a mounting cap 402, a cylinder 403 and a vertically movable member 404.

The mounting cap 402 serves to fix the cylinder 403 to a container 405 and is constructed such that an inward-flange-like top wall 408 extends from an upper edge of a peripheral wall 407 helically-fitted to an outer periphery of a container cap fitted neck portion 406.

The cylinder 403 is fixed to the container 405 through the mounting cap 402 and is provided with a suction valve 409 in a lower edge portion vertically formed in the interior of the container.

In accordance with this embodiment, the cylinder 403 has a flange 411 protruding outward from the outer peripheral upper portion of a cylindrical peripheral wall 410 and a flange-like valve seat 413 protruding inwardly outwardly from the peripheral edge of a window hole holed in the central portion of a bottom wall 412. The cylinder 403 is also provided with a fitting cylindrical portion 414 protruding downward from the lower surface peripheral edge of the bottom wall 412. The upper edge of a pipe (unillustrated) is attached to this fitting cylindrical portion 414, and lower portion thereof extends downward in the container.

Further, an engagement member 415 for engaging the vertically movable member 404 in the push-down state is fixedly fitted to the upper edge of the peripheral wall 410. The engagement member 415 is constructed such that the fitting cylindrical portion fitted via a rugged engagement element to the outer periphery of the upper edge of the cylinder 403 perpendicularly extends from a doughnut-like top plate, and an inner cylinder 415 fitted to the upper edge of the inner peripheral of the cylinder 403 extends perpendicularly from the inner peripheral edge of the top plate. An inner cylinder 415*a* and an upper edge inner surface of the cylinder 403 are prevented from being turned round by the engagement of vertical protrusions with each other, and a thread for helical fitting of the vertically movable member is formed along the inner periphery of the upper portion of the inner cylinder 415*a*.

Then, the outward flange 411 is placed via a packing 416 on the upper surface of the container neck portion 406 and is caught by a top wall 408 of the mounting cap 402 helically fitted to the outer periphery of the neck portion and by the upper surface of the container neck portion 406.

The suction valve 409 is constructed so that the suction valve member for clogging the valve hole formed in the inner peripheral edge of the valve seat 413 is so provided on the valve seat 413 as to be vertically movable at a predetermined stroke with its lower surface closely contact therewith.

In accordance with this embodiment, the lower surface peripheral edge portion is so tapered as to be closely fitted to the upper surface of the valve seat 413, and there is provided the cylindrical suction valve member 417 with its lower edge surface opened. Further, the member 417 is constructed such that a plurality of rectangular plate-like engagement protrusions 218 are formed in the peripheral direction in the lower edge part of the outer periphery thereof, the lower edge surface of the coil spring 420 for biasing upward the vertically movable member 404 is secured to the upper surface of a plurality of rectangular plate ribs 419 formed in the peripheral direction on the inner peripheral lower edge portion of the peripheral wall 410 of the cylinder 403, and the member 217 is vertically movable till each engagement protrusion 418 impinges on the lower surface of the coil spring 420. Note that a plurality of ribs generally designated by 421 in the Figure are formed in the peripheral direction on the outer peripheral upper portion of the suction valve member 417.

The vertically movable member 404 includes a stem 422, an annular piston 423, an auxiliary piston 424 and a push-down head 426 with a nozzle 425.

The stem 422 takes a cylindrical shape with the lower edge surface closed and includes a discharge valve 427 so provided as to be vertically movable in a state where the central portion in the cylinder 403 is biased upward and having a valve hole formed in the inner upper portion and clogged by a valve member vertically movable by the liquid pressure.

According to this embodiment, in the cylindrical shape with the lower edge surface closed, a flange 428 is protruded outward from the outer peripheral lower edge portion, and a vertically descending wall 429 extends from the outer peripheral edge of the flange 428 so as to be spaced way from the internal surface of the cylinder.

The annular piston 423 is so provided as to be movable integrally with the stem by attaching its outer peripheral surface to the inner surface of the cylinder 403 liquid-tightly and slidably while being integrally linked to the lower portion of the outer surface of the stem 422 so that the liquid is allowed to flow along the lower portion of the inner peripheral surface.

In accordance with this embodiment, an upward skirt-like upper slide portion 423*b* and a downward skirt-like lower slide portion 423*c* are protruded from the upper and lower portions of the outer peripheral portion of a cylindrical proximal member 423*a*. The respective slide portions are so press-fitted to the inner peripheral surface of the cylinder liquid-tightly and slidably. Further, a plurality of connecting rods 430 erecting upward outwardly obliquely from the outer peripheral edge of the upper surface of the flange 428 of the above stem 422 are provided in the peripheral direction, and tips thereof are integrally connected to the lower portion of the inner surface of the proximal portion 423*a* of each annular piston 423.

The auxiliary piston 424 is so fitted to the outer peripheral lower portion of the stem 422 as to be movable up and down at a predetermined stroke while making its outer peripheral edge slidably contact the inner surface of the annular piston 423 and has a through-hole so holed openable and closable in the stem peripheral wall.

In accordance with this embodiment, an upward skirt-like inside slide portion 424*b* protruding from the inner peripheral upper edge of a cylindrical proximal portion 424*a* is liquid-tightly slidably to the outer peripheral surface of the stem 422, and a downward skirt-like outside slide portion 424*c* protruding from the outer peripheral lower portion of the proximal portion 424*a* is liquid-tightly slidably fitted to the inner peripheral surface of a proximal portion 423*a* of the annular piston 423. Further, a cylindrical valve piece 424*d* extends downward from the inner peripheral lower portion of the proximal portion 424*a*, and an engagement cylindrical portion 424*c* assuming an inverted L-shape in section protrudes from the outer peripheral upper portion of the proximal portion.

On the other hand, an upward stepped portion 432 is formed in a predetermined position along the lower portion of the outer periphery of the stem 422, while a downward stepped portion 433 is formed in a predetermined position along the upper portion of the stepped portion 432, thereby making it the vertically movable from a state where the lower surface of the cylindrical valve piece 424*d* is closely fitted to the upper surface of the upward stepped portion 432 to a state where it impinges on the lower surface of the downward stepped portion 433.

Further, a through-hole 431 is formed in the lower portion of the peripheral wall of the stem between the upward stepped portion 432 and the downward stepped portion 433.

Then, when the vertically movable member 404 is pushed down from an ascent position, the auxiliary piston 424 is relatively raised by the liquid pressure (by an air pressure when using a pump with no liquid in the cylinder for the first time) with respect to the stem 422, with the result that the through-hole 431 opens. On the other hand, when the vertically movable member 404 rises, the lower edge of the inner cylinder 415*a* contacts and engages with the upper surface of the engagement cylindrical portion 424*e* of the auxiliary piston 424, and, when the stem 422 further rises, the lower surface of the cylindrical valve member 424 closely contacts the upward stepped portion 432, with the result that the through-hole 431 is closed.

Further, on this occasion, the auxiliary piston 424 plays the role of shutting off the outside air introducing through-hole 434 formed in the cylinder 403. If the through-hole 434 is formed in the upper portion of the peripheral wall of the cylinder, and when the vertically movable member 404 rises, the outside air flows between the stem 422 and the inner cylinder 415*a* and is led into the container negative-pressurized via this through-hole 434. If the stem 422 is in the uppermost position, the upper edge of the engagement cylindrical portion 424*e* of the auxiliary piston 424 air-tightly contacts the lower edge of the inner cylinder 415*a*, thereby shutting off the exterior and interior of the container.

The push-down head 426 is provided in continuation from the upper edge of the stem 422 so that the upper portion of the mounting cap 402 is movable up and down. In accordance with this embodiment, the push-down head 426 includes a cylindrical casing 435 having its peripheral wall extending perpendicularly from the top wall peripheral edge and its lower edge surface opened. The lower edge of a vertical cylinder 436 perpendicularly extending from the lower surface central portion of the top wall of the casing 435 is attached to the outer peripheral upper edge of the stem 422, thus fixing the head 426 to the stem 422. Further, a horizontal cylinder 437 with its proximal portion opened to the front surface of the upper portion of the vertical cylinder 436 penetrates the casing peripheral wall and thus protrudes forward. This horizontal cylinder 437 is constructed as a nozzle 425. The nozzle 425 is constructed so that the proximal portion thereof ascends forward obliquely while its tip descends obliquely. With this construction, it is possible to prevent the liquid from dropping.

Moreover, a thread formed along the outer periphery of the vertical cylinder 436 with respect to the portion protruding downward from the casing 435 meshes with the thread of the engagement member 415 when pushing down the vertically movable member 404 and is thus made possible engagement therewith in the state where the vertically movable member 404 is pushed down. On this occasion, the outer surface of the vertically descending wall 429 protruding from the stem 422 is light-tightly fitted to the inner surface of the reducible diameter portion provided at the lower portion of the cylinder peripheral wall. Further, the outer peripheral lower edge of the vertical cylinder 436 is liquid-tightly fitted to the inner periphery of a downward skirt-like annular protruded piece 438 provided on the inner surface of the inner cylinder 415*a* of the engagement member 415, and the lower edge of the stem 422 contacts the upper surface of the suction valve member 417.

The discharge valve 427 has a valve member 439 clogging a valve hole holed in the inner upper portion of the stem 422. The valve member 439 is movable up and down by the liquid pressure.

In accordance with this embodiment, a flange-like valve seat 440 descending inward obliquely is protruded from the inner upper portion of the stem 422, a valve hole is formed in the central portion thereof but is closed by placing a ball-like valve member 439 on the valve seat 440, thus constituting a discharge valve 427. Further, the valve member 439 is so constructed as to be vertically movable up to a position where it impinges on the lower surface of the engagement plate 441 extending perpendicularly from the top wall of the casing 435.

The pump according to the present invention is utilized for jetting the liquid exhibiting the high viscosity on the order of, e.g., 500 cps–15000 cps. When using the high viscosity liquid as described above, it hardly happens that the discharge valve member 439 pushed up by the liquid pressure immediately drops down to the valve seat 440 by a self-weight thereof. The discharge valve member 439 vertically moves substantially along the flow of liquid, although slightly different depending on the liquid viscosity and a weight of the valve member. Accordingly, there is seen no remarkable error between a flow rate of the liquid and a moving velocity of the valve member.

Further, in accordance with this embodiment, let Va be the volumetric capacity of the nozzle 425, let Vb be the volumetric capacity of a liquid passageway where the discharge valve member 439 is vertically movable, and let VC be the volume of the discharge valve member 439, wherein the vertical stroke of the discharge valve member 439 is regulated so that Vb−Vc is equal to or larger than Va. An actual vertical stroke of the discharge valve member 439 based on this regulation is, though different depending on the length and inside diameter of the nozzle and the inside diameter of the stem 422, on the order of 5 mm–30 mm larger than in the conventional pump constructed by putting the ball valve on the valve seat. More preferably, the actual vertical stroke thereof is 10 mm or above.

Then, after the liquid has been poured by pushing down the vertically movable member 404, the vertically movable member is raised, and, at this time, the liquid in the stem 22 flows back into the cylinder 403 negative-pressurized via the through-hole 431. Further, the liquid in the passageway where the discharge valve member 439 moves up and down flows back into the stem 422 disposed upstream of the discharge valve 427, and the liquid within the nozzle 425 flows back into the above passageway. On this occasion, since Vb−Vc is equal to or larger than Va, the liquid in the nozzle flows back substantially into the vertical cylinder.

FIGS. 25 through 28 illustrate other embodiment of the present invention. In accordance with this embodiment, the suction valve member 417 is always biased by the resilient member in the valve hole closing direction.

In accordance with this embodiment, a horizontal spiral portion of the upper edge is fixedly attached between the upper surface of each plate rib 419 and the lower surface of a coil spring 420, the cylindrical portion extending from the inner peripheral edge of the horizontal spiral portion is provided downward along the inner surface of each rib 419, and there is also provided a coil spring 422 serving as a resilient member with its lower surface secured to the upper surface of each engagement protrusion 418 of the suction valve member 417 in the embodiment discussed above.

Further, in this embodiment, an auxiliary piston 424 is always biased upward with respect to the stem 422. A coil spring 443 is provided in such a way that its upper edge is secured to the lower surface of the proximal portion 424*a* while its lower edge is secured between the connecting rod 430 and the stem outer surface. This coil spring 443 is smaller in its resilience than the coil spring 420 for biasing the stem 422 upward. When the upper surface of the engagement cylindrical portion 424*e* of the auxiliary piston 424 engages with the lower surface of the inner cylinder 415*a* with the ascent of the stem 422, the stem further rises till the lower surface of the cylindrical valve member 424*d* of the auxiliary piston 424 closely contacts the upper surface of the upward stepped portion 432. Accordingly, the through-hole 431 is closed only in the maximum ascent position of the stem 422.

Figure 20:
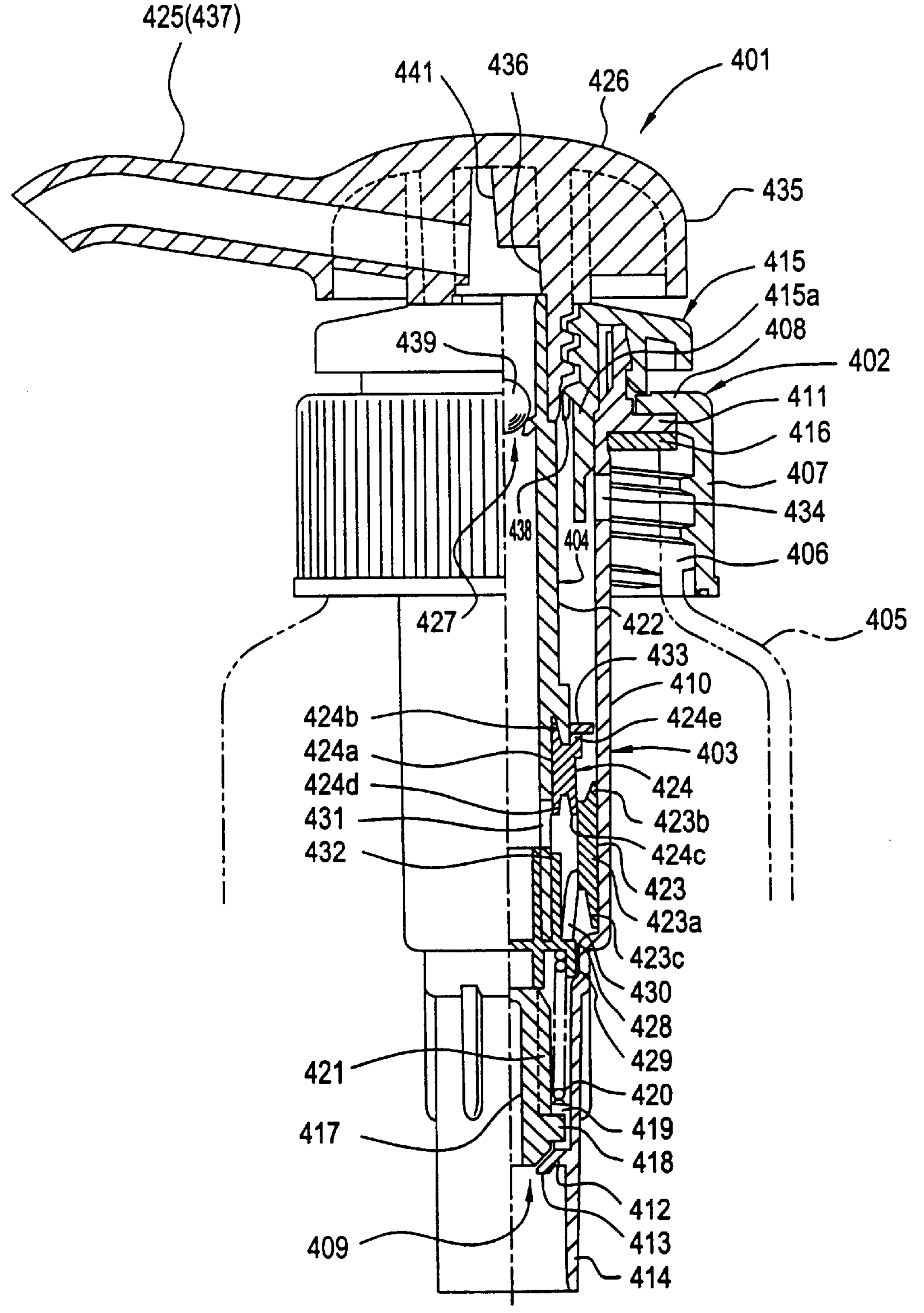
FIG. 20 is a sectional view illustrating one embodiment of the present invention.
Figure 21:
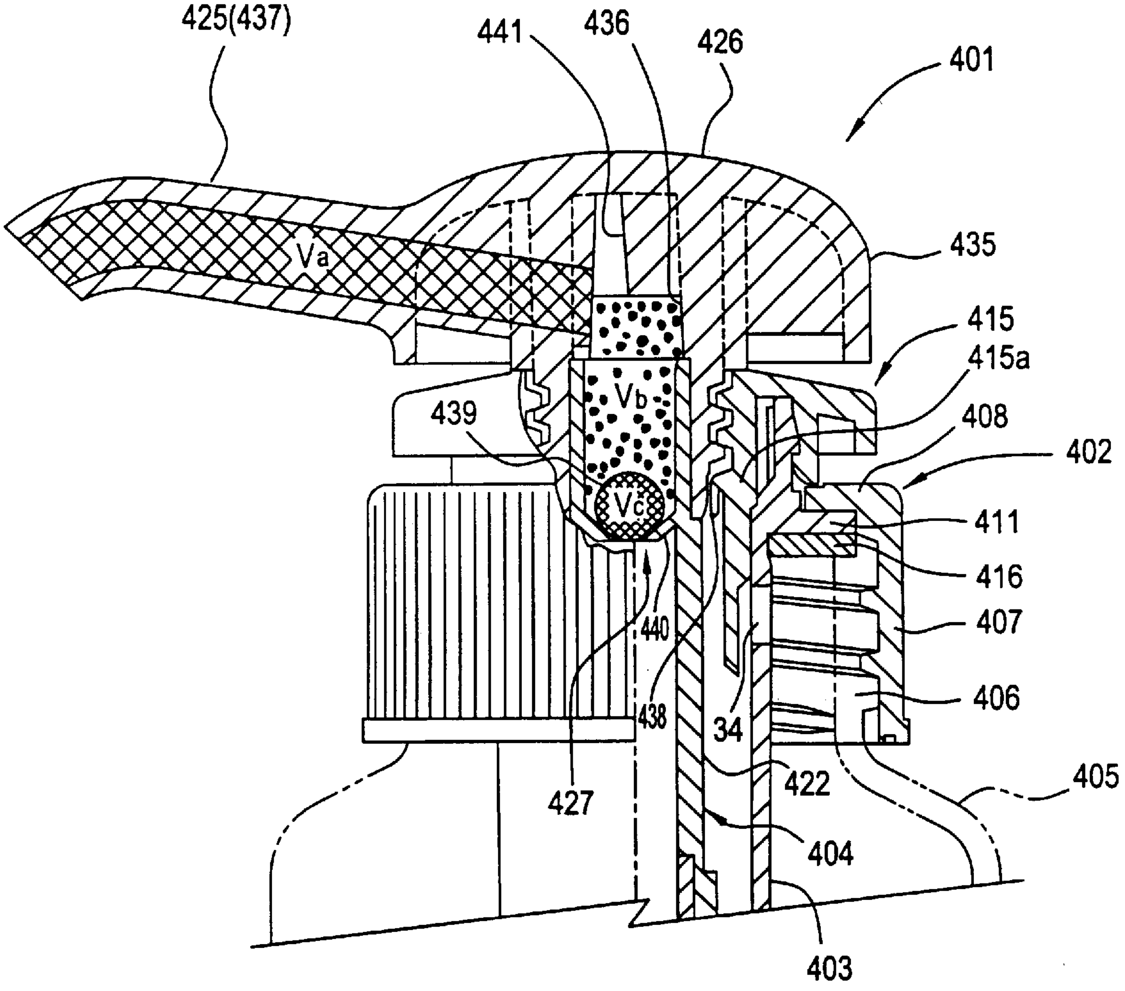
FIG. 21 is an explanatory view showing a push-down head in the same embodiment.
Figure 22:
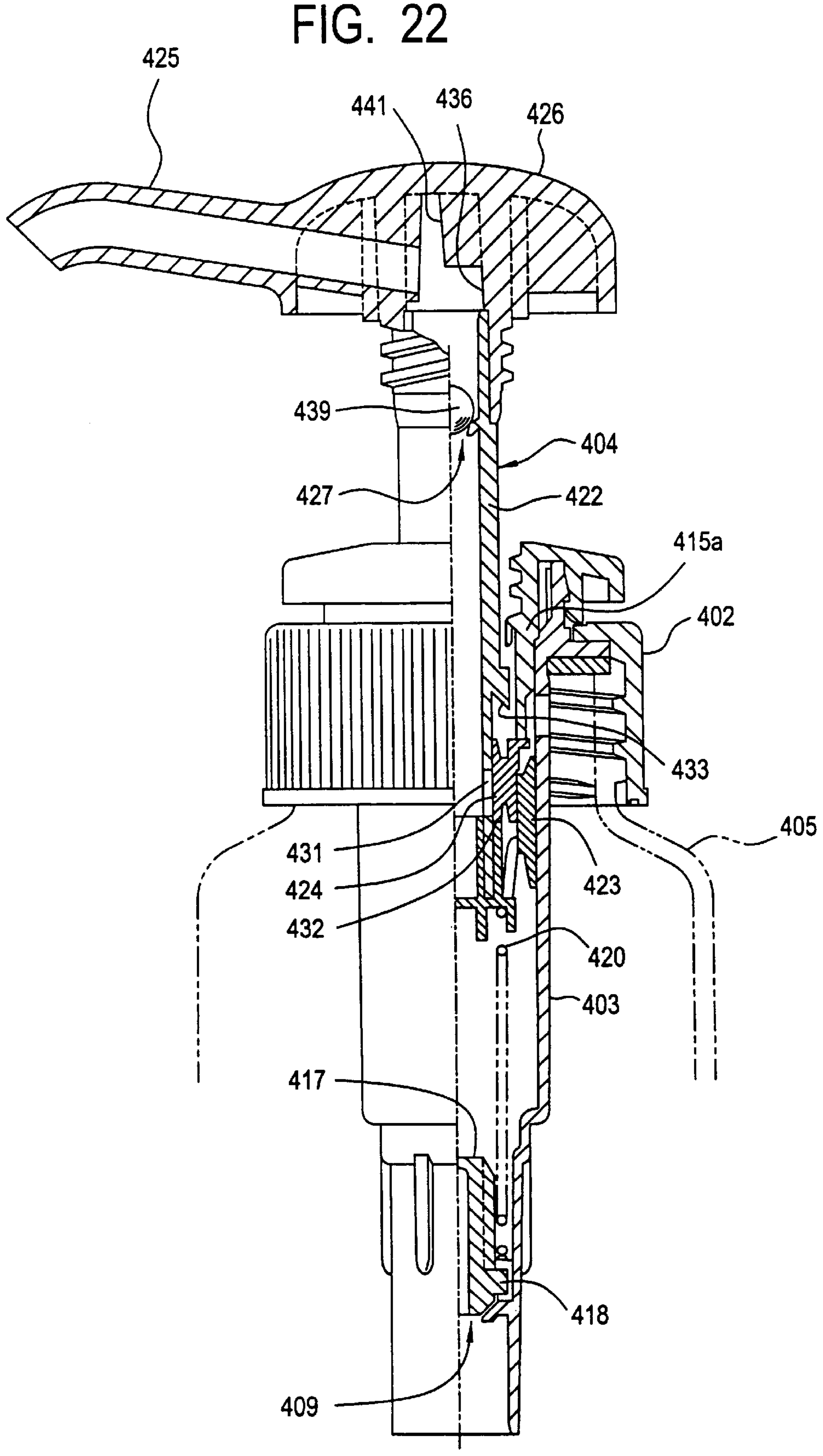
FIG. 22 is an explanatory sectional view showing the head maximum ascent position in the same embodiment.
Figure 23:
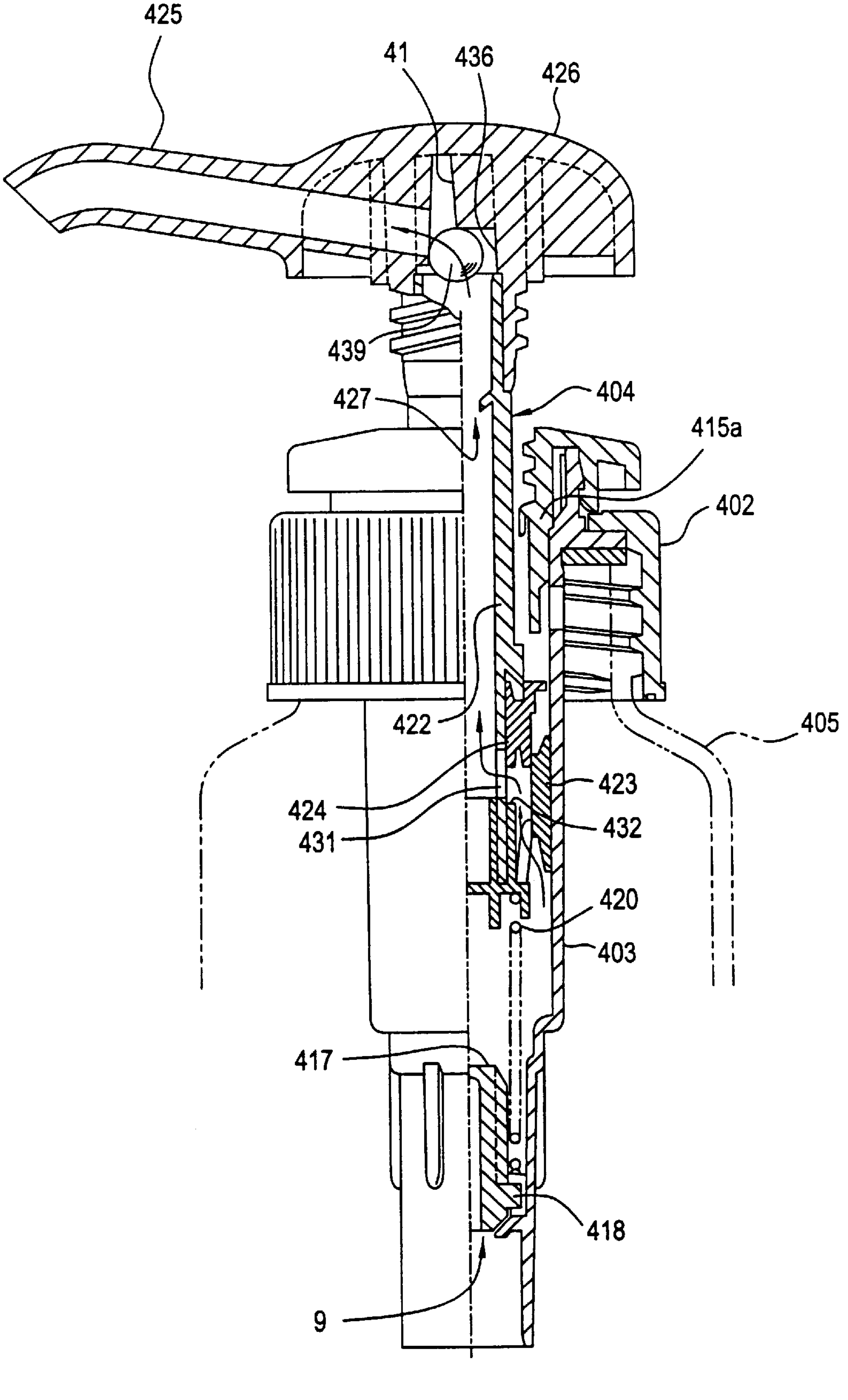
FIG. 23 is an explanatory sectional view when pushing down the head in the same embodiment.
Figure 24:
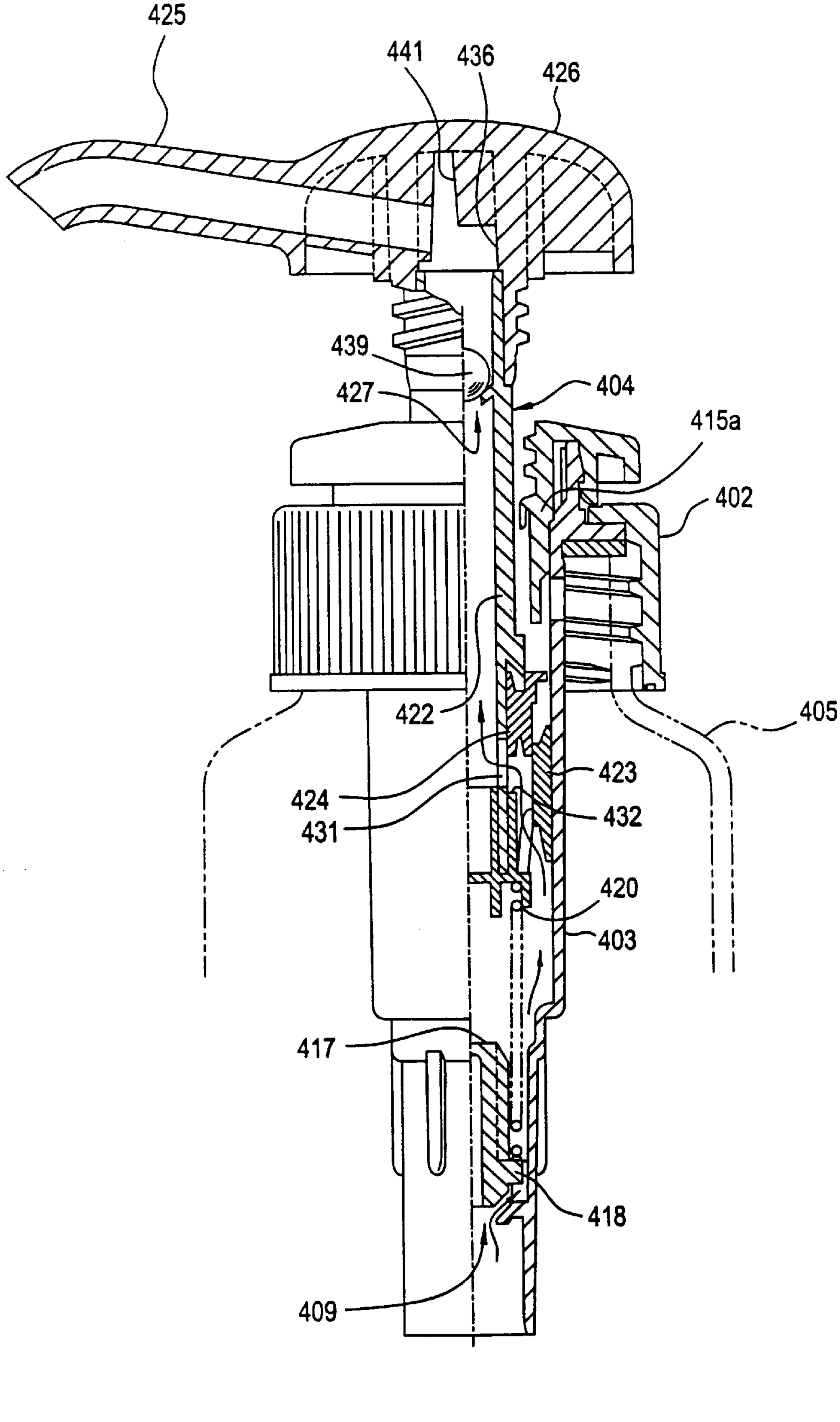
FIG. 24 is an explanatory sectional view when the head rises in the same embodiment.
Figure 25:
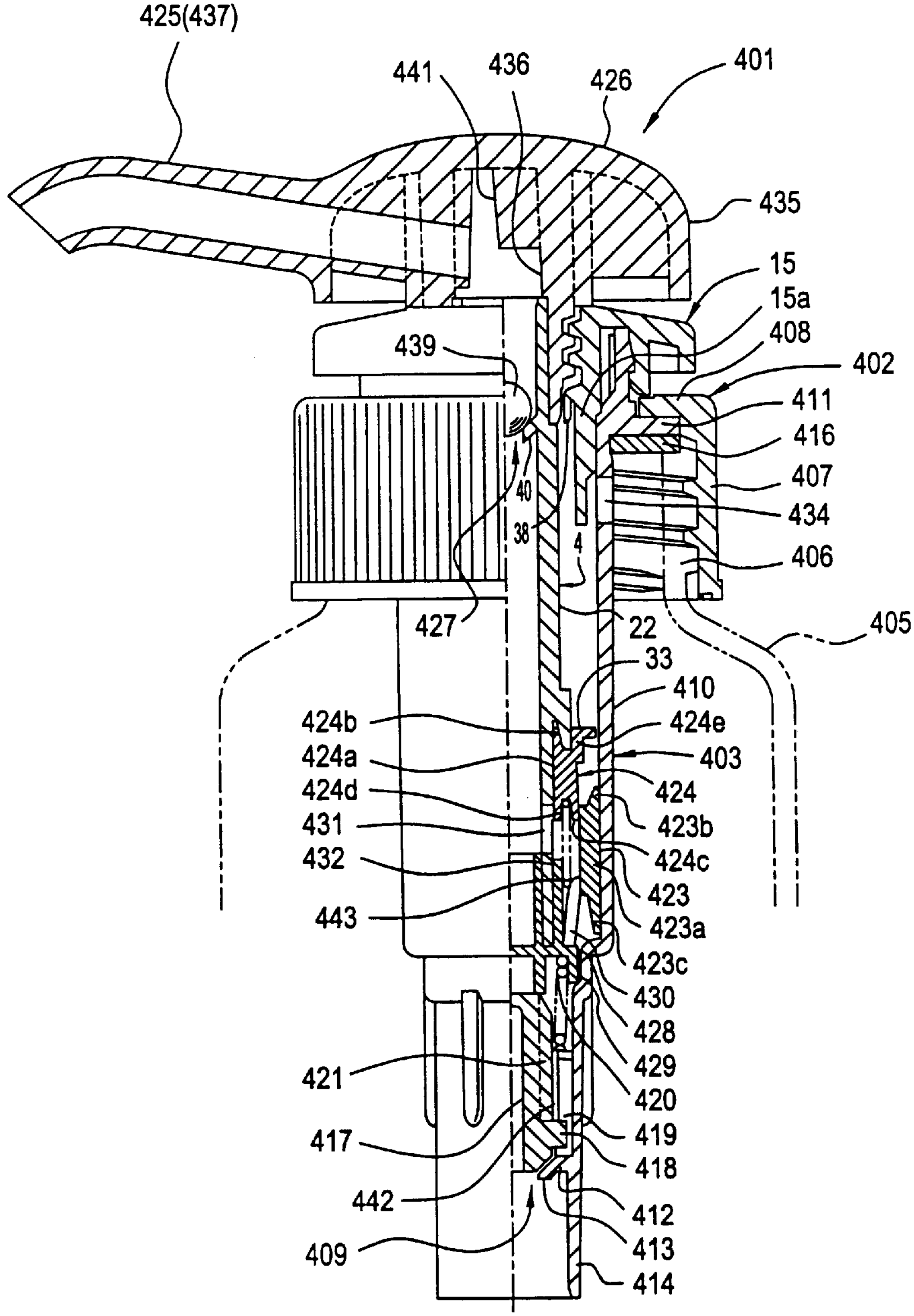
FIG. 25 is a sectional view illustrating a still further embodiment of the present invention.
Figure 26:
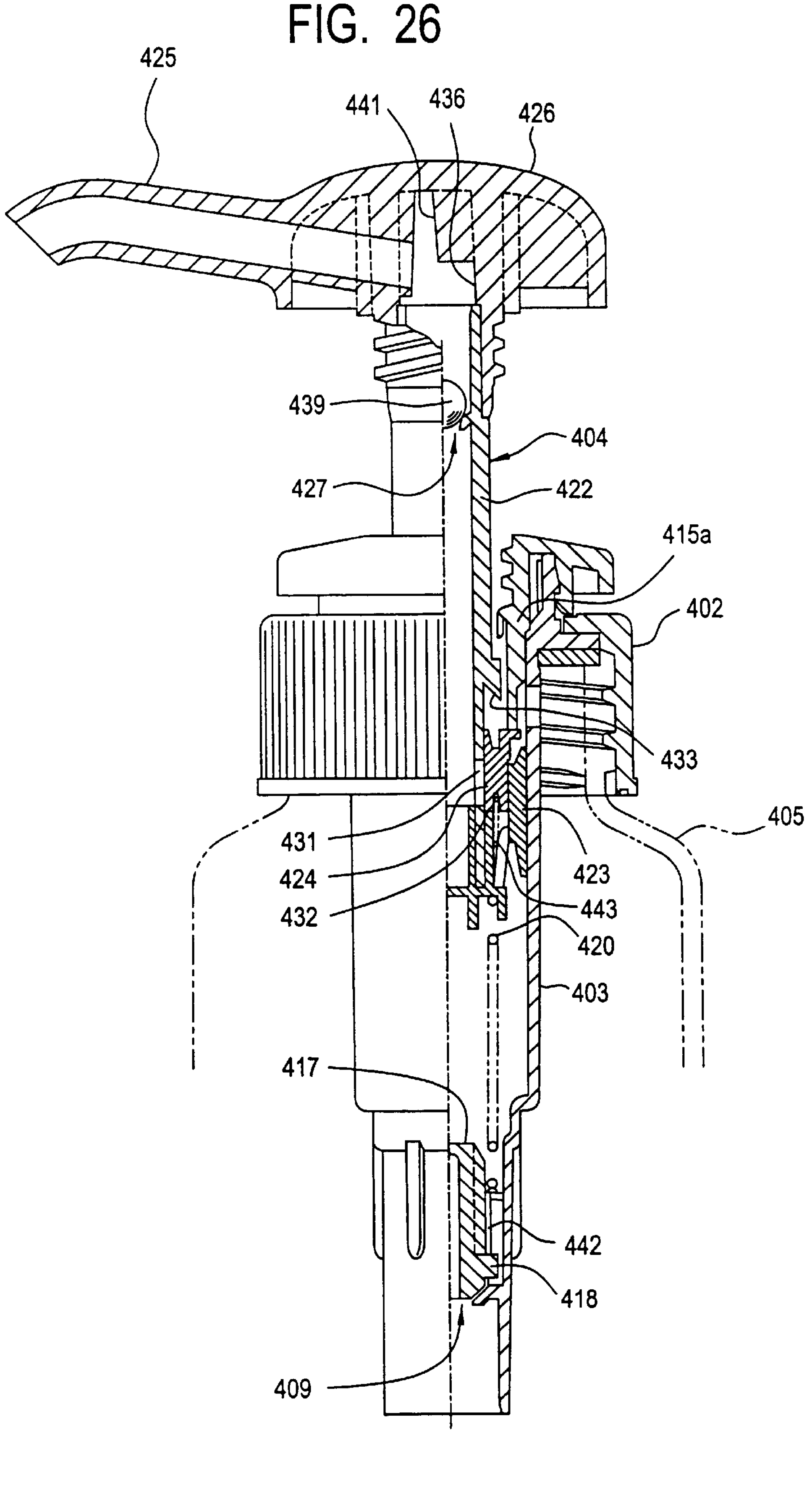
FIG. 26 is an explanatory sectional view showing the head maximum ascent position in the same embodiment.
Figure 27:
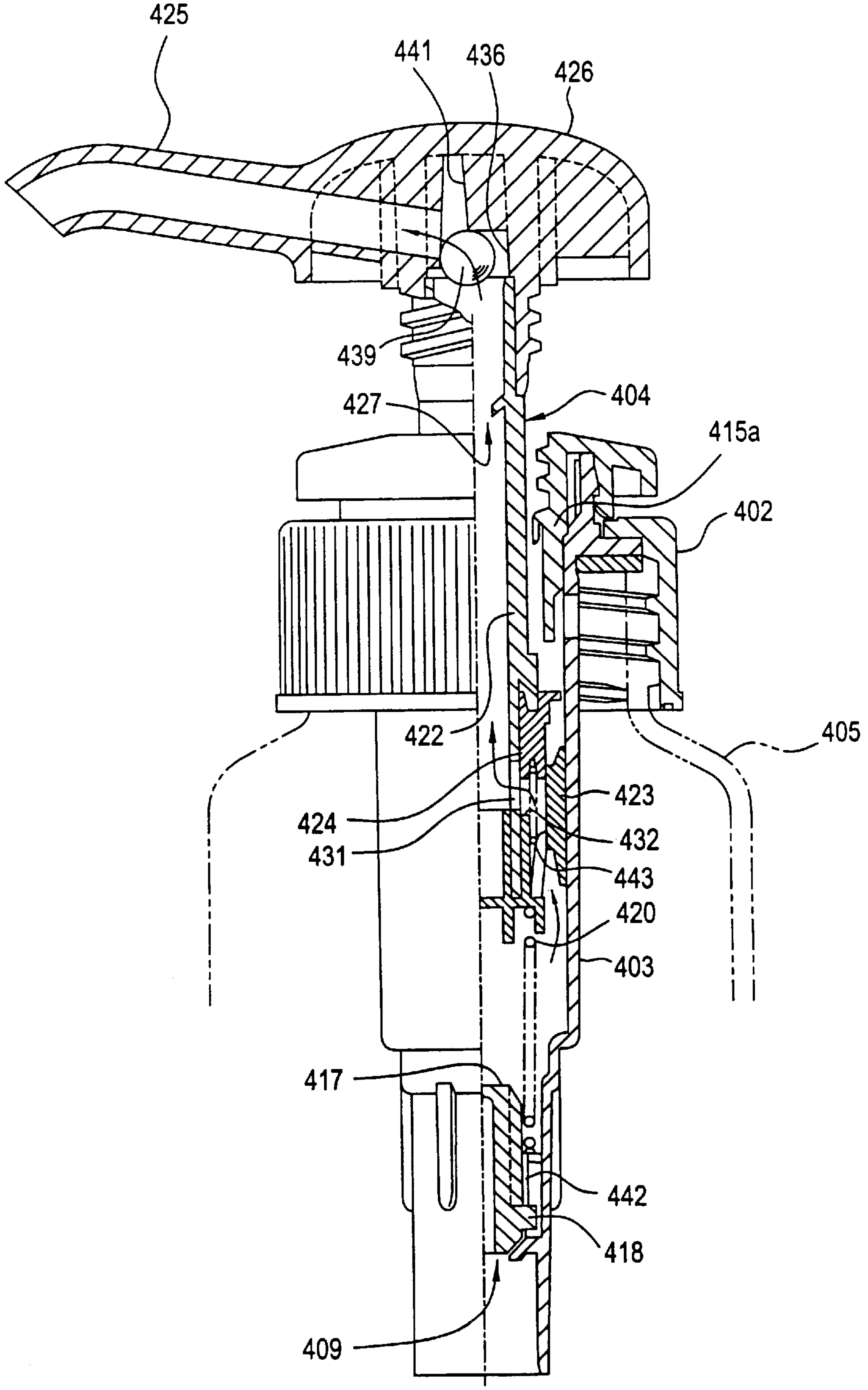
FIG. 27 is an explanatory sectional view when pushing down the head in the same embodiment.
Figure 28:
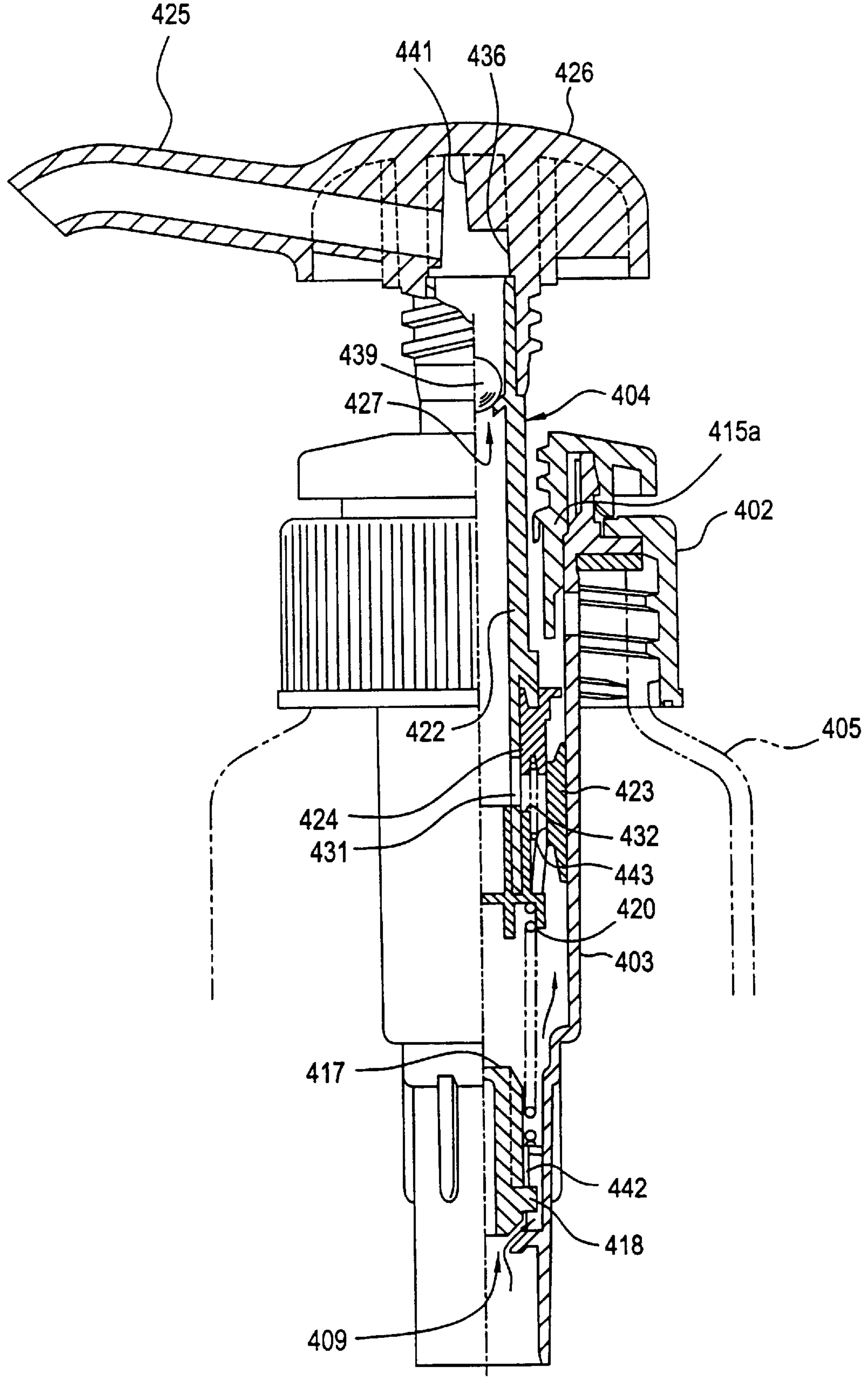
FIG. 28 is an explanatory sectional view when the head is raised in the same embodiment.

Other configurations are the same as those in the embodiment of FIG. 20.

Figure 29:
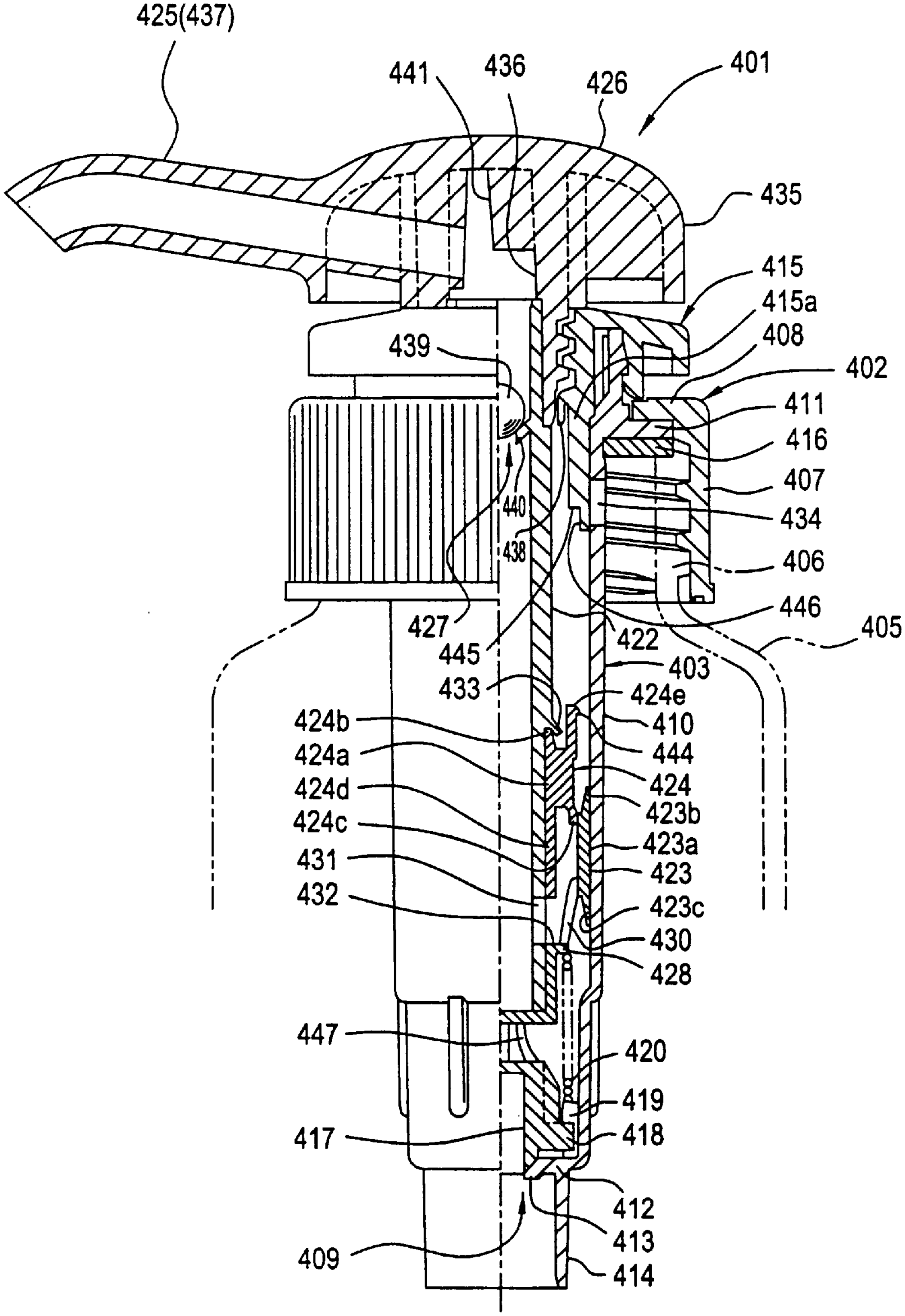
FIG. 29 is a sectional view illustrating a yet further embodiment of the present invention.
Figure 30:
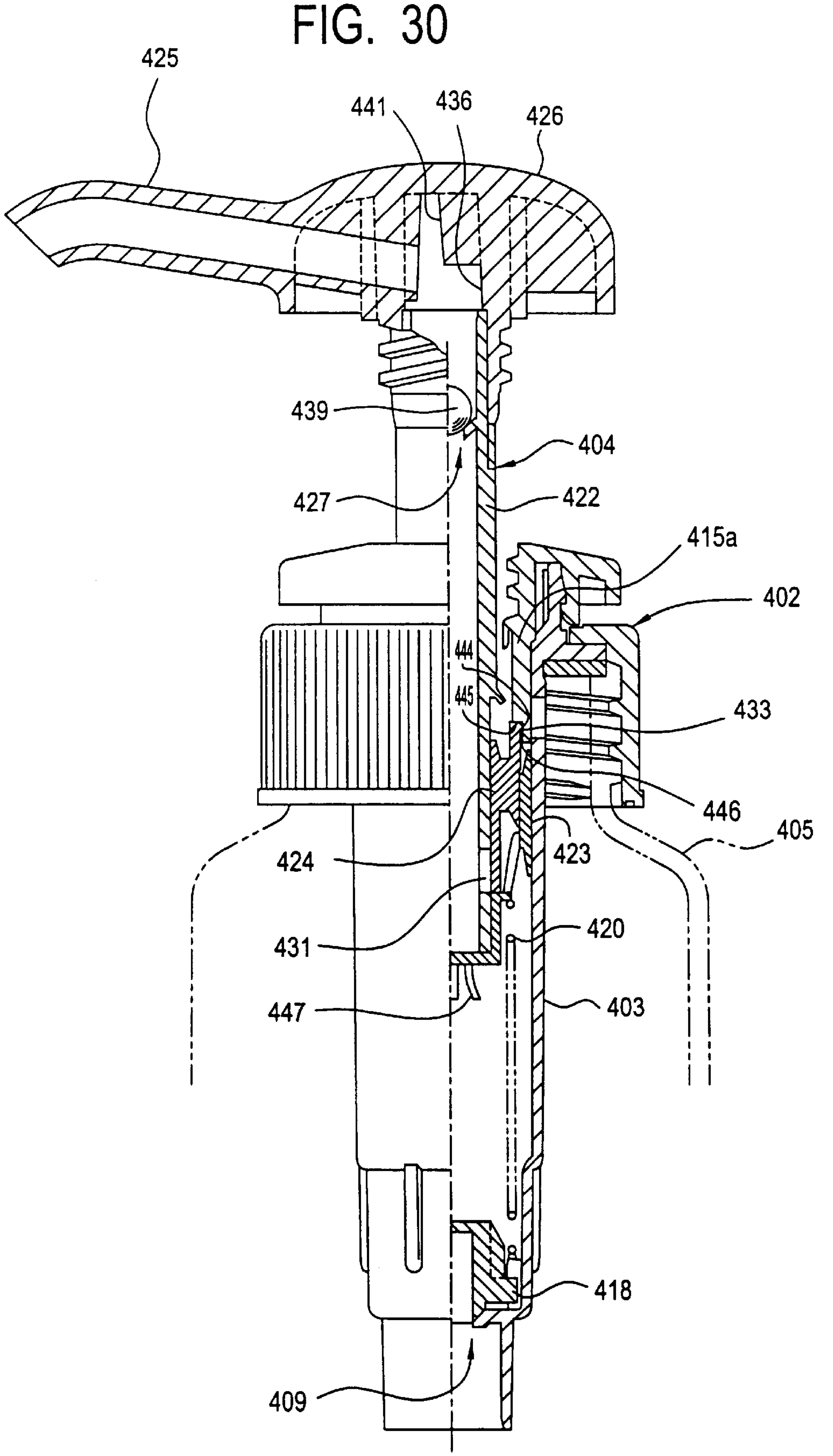
FIG. 30 is an explanatory sectional view showing the head maximum ascent position in the same embodiment.

FIGS. 29 and 30 illustrate still other embodiment of the present invention. In accordance with this embodiment, in the closed state of the through-hole 431 in the stem maximum ascent position, the auxiliary piston 424 is capable of engaging with the cylinder 403 but disengaging after the through-hole 431 opens when the head 426 is pushed down.

The following is a construction of this embodiment in relation to the embodiment discussed in FIG. 20. The engagement cylindrical portion is formed not in the inverted L-shape in section but in the cylindrical shape. An engagement protrusion 444 is formed along the outer peripheral upper edge. A downward stepped portion 445 is formed in a predetermined position along the inner peripheral lower edge portion of the inner cylinder 415*a* of the engagement member 415. An engagement protrusion 446 engaging with the above engagement protrusion 444 is formed along the lower portion of the stepped portion 445. The upper surface of the engagement cylindrical portion 424*e* impinges and engages with the lower surface of the stepped portion 445 when the stem 422 rises, and the respective engagement protrusions 444, 446 engage with each other. When the stem further rises, the lower edge of a cylindrical valve piece 424*d* impinges on the upper surface of the upward stepped portion 432, thereby closing the through-hole 431. Further, when the head is pushed down from this state, the auxiliary piston 424 initially certainly engages with the inner cylinder 415*a* due to the mutual engagement of the engagement protrusions. Accordingly, the through-hole 431 surely opens. Subsequently, the upper surface of the inside slide portion 424*b* is engaged by the downward stepped portion 433 of the stem 422, and the engagement, protrusions are disengaged from each other, with the result that the auxiliary piston 424 descends together with the stem 422.

Further, in accordance with this embodiment, a plurality of spring pieces 447 are integrally protruded from the stem lower surface, and a thread formed on the vertically movable member 404 meshes with the thread inn the inner cylinder 415*a*. Then, the vertically movable member 404 engages with the cylinder in the push-down state, and, at this time, the respective spring pieces 447 are press-fitted to the upper surface of the top wall of the suction valve member 417. With this construction, the suction valve member 417 is surely pushed down, and the sure closing of the suction vale can be thus attained.

Note that the respective members are properly selectively composed of synthetic resins, metals and materials such as particularly elastomer exhibiting an elasticity.

As explained above, the pump according to the present invention includes the annular piston with its outer peripheral surface slidably fitted to the cylinder inner surface and its inner peripheral surface lower portion connected to the stem outer surface lower portion to enable the liquid to flow. The pump also includes the auxiliary piston with its outer peripheral surface slidably fitted to the inner surface of the annular piston and its through-hole so holed in the stem peripheral wall as to be openable and closable. The liquid in the cylinder is led into the stem via the thus formed through-hole by pushing down the push-down head and then jetted out of the nozzle through the discharge valve. When the head is raised, the liquid within the container is sucked into the cylinder through the suction valve by the negative pressure within the cylinder. With this construction, if the pump of the present invention is employed for discharging the liquid exhibiting the viscosity, the intra stem liquid flows back into the cylinder via the through-hole till the discharge valve is closed on the occasion of the ascent of the head after jetting the liquid on pushing down the push-down head. Correspondingly, the liquid in the passageway where the discharge valve member moves up and down flows back into the stem, and further the intra nozzle liquid flows back int the passageway. Consequently, the liquid drop out of the nozzle tip can be obviated, and the liquid can be prevented from being dry-solidified as much as possible.

Further, there are provided the annular piston sliding on the inner periphery of the cylinder and the auxiliary piston for opening and closing the through-hole, and hence the annular piston serving also to guide the vertical movement of the stem can be formed thick and firmly. Besides, the stable vertical movement of the stem can be performed, and the durability is also enhanced.

Furthermore, the pump can be manufactured simply by modifying a slight part of the conventional pump and therefore has an advantage of being easily manufactured at the low cost.

Also, the liquid leakage from the nozzle tip can be prevented as much as possible because of the hold piston closing the through-hole in the stem maximum ascent position even when the container is carelessly turned over when used. Further, the vertical stroke of the discharge valve member is regulated so that $Vb-Vc$ is equal to or larger than Va, where Va is the volumetric capacity of the nozzle, Vb is the volumetric capacity of a liquid passageway where the discharge valve member is vertically movable, and Vc is the volume of the discharge valve member. Substantially the whole amount of liquid within the nozzle flows back into the passageway where the discharge valve member moves up and down, and it is possible to prevent the liquid leakage and the liquid dry-solidification more surely.

Further, the suction valve can be prevented from opening more certainly till the discharge valve is closed, and, as a result, the predetermined quantity of liquid within the stem flows back more surely. It is also possible to prevent the liquid dropping and the liquid dry-solidification more certainly.

Also, if the air still remains in the cylinder when initially mounted in the container, it is feasible to obviate such an inconvenience that the auxiliary piston is not raised by the air pressure along the stem on the whole when pushing down the head.

Yet other embodiment of the present invention will hereinafter be discussed with reference to the drawings.

Figure 31:
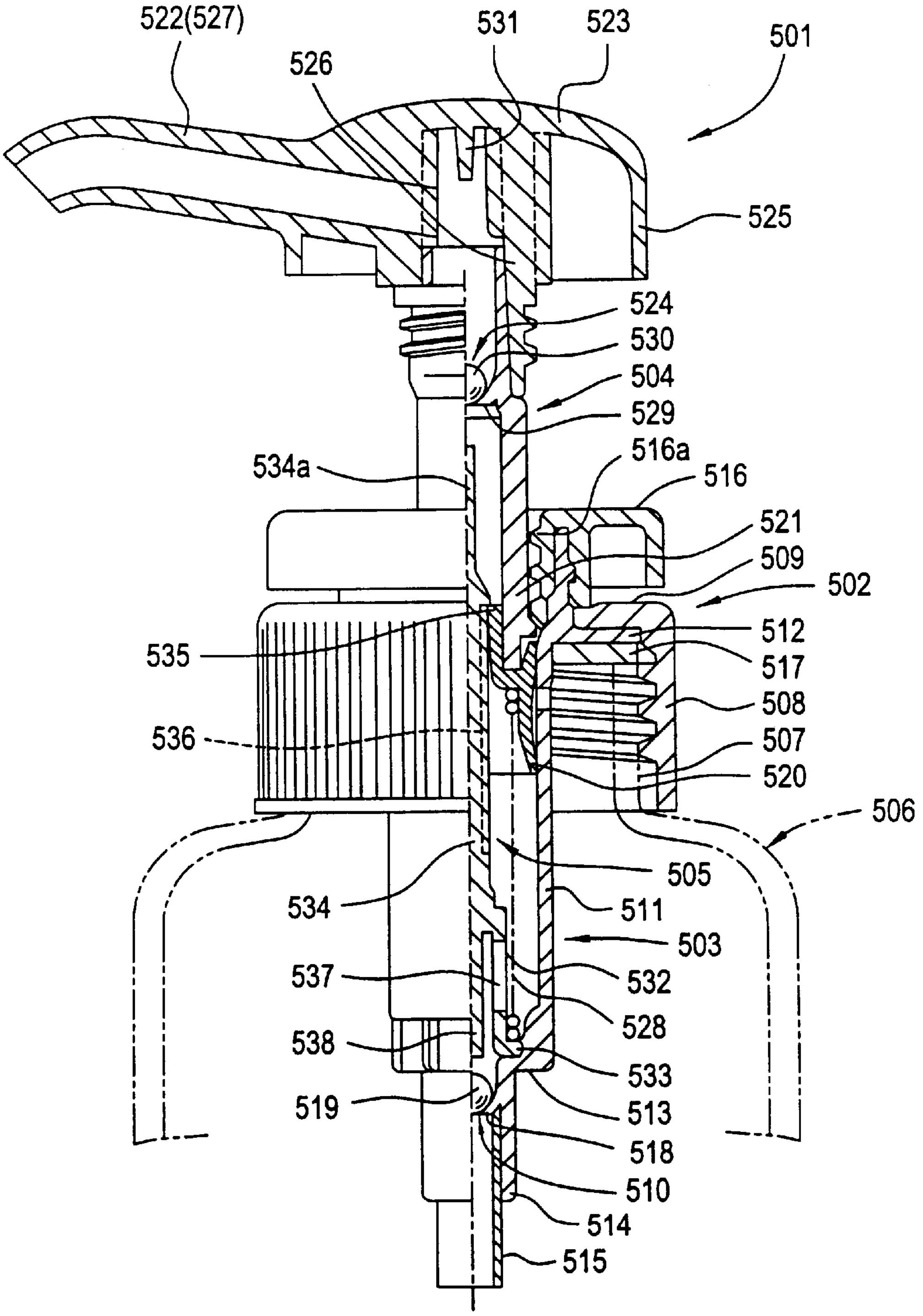
FIG. 31 is a sectional view showing one embodiment of the present invention.
Figure 32A:
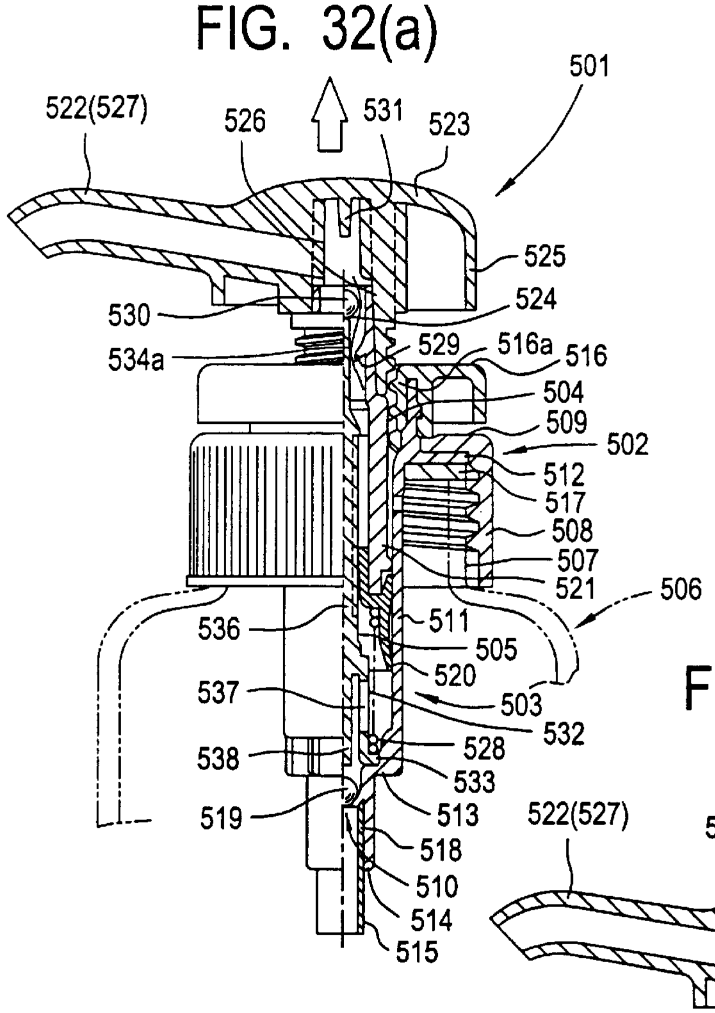
FIG. 32 is an explanatory view showing how the liquid is jetted in the same embodiment.
Figure 32B:
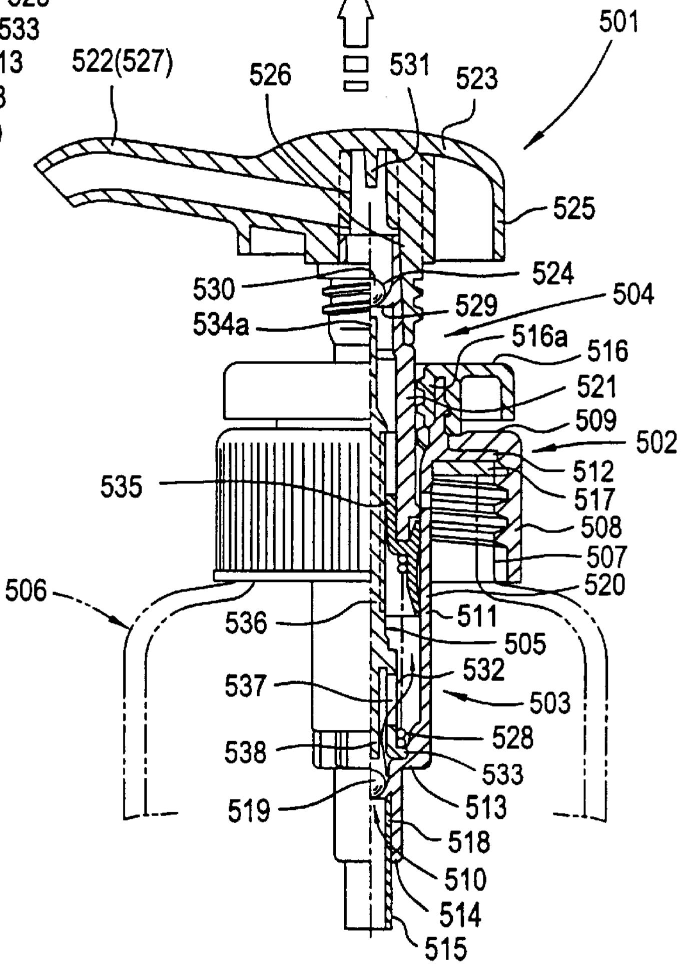

FIGS. 31 and 32 illustrates the embodiment of the present invention, wherein the numeral 501 represents a liquid jet pump. The pump 501 includes a mounting cap 502, a cylinder 503, a vertically movable member 504 and a bar-like member 505.

The mounting cap 502 serves to fix the cylinder 503 to a container 506 and is constructed such that an inward-flange-like top wall 509 extends from an upper edge of a peripheral wall 508 helically-fitted to an outer periphery of a container cap fitted neck portion 507.

The cylinder 503 is fixed to the container 506 through the mounting cap 502 and is provided with a suction valve 510 in a lower edge portion vertically formed in the interior of the container.

In accordance with this embodiment, the cylinder 503 has an outward flange 512 protruding outward from the outer peripheral upper portion of a cylindrical peripheral wall 511, and a fitting cylindrical portion 514 extends downward from a peripheral edge of a window hole holed in the central portion of a bottom wall 513. An upper edge of a suction pipe 515 is fitted to this fitting cylindrical portion 514, and its lower portion extends vertically downward to the lower portion in the container. Further, an engagement member 516 for engaging the vertically movable 504 in a push-down state is fixedly fitted to the upper edge portion of the peripheral wall 511. The engagement member 516 is constructed so that the fitting cylindrical portion flange fitted via a rugged engagement element to the outer periphery of the upper edge of the cylinder 503 extends inward from the rear surface of a doughnut-like top plate, and an inner cylinder 516*a* fitted to the inner upper edge of the cylinder 503 extends perpendicularly from the inner peripheral edge of the top plate. Also, a thread for helically fitting the vertically movable member is formed along the inner periphery of the inner cylinder 516*a*.

Then, the outward flange 512 is placed via a packing 517 on the upper surface of the container neck portion 507 and is caught by a top wall 509 of the mounting cap 502 and by the upper surface of the container neck portion.

The suction valve 510 is constructed so that a ball-like valve member 519 is placed on a flange-like valve seat 518 descending inward obliquely so as to protrude from the inner upper edge of the fitting cylindrical portion 514.

The vertically movable member 504 includes a stem 521 vertically movable in an upper biased state within the cylinder 503 while an annular piston 520 fitted to the interior of the cylinder protrudes from the outer peripheral lower portion. The vertically movable 504 also includes a push-down head 523 with a nozzle 522 attached to the upper edge of the stem 521, and a discharge valve 524 is provided in the inner upper portion of the stem 521.

In accordance with this embodiment, the push-down head 523 has a cylindrical casing with an opening formed in the lower edge surface and a peripheral wall perpendicularly extending from the peripheral edge of the top wall, and a lower edge of a vertical cylinder 526 vertically extending from the center of the top wall lower surface of the casing 525 is attached to the outer peripheral upper edge of the stem 521, thus fixing it to the stem 521. Further, a horizontal cylinder 527 with its proximal portion opened to the upper front surface of the vertical cylinder 526 penetrates the casing peripheral wall and protrudes forward therefrom, thus forming this horizontal cylinder 527 as a nozzle 522. The nozzle 522 is constructed so that its proximal portion ascends obliquely forward, while its tip descends obliquely. With this construction, the liquid leakage can be prevented. Furthermore, a thread formed along the outer periphery of the vertical cylinder 526 with respect to a portion protruding downward from the casing 525 meshes with the thread of the engagement member 516 when pushing down the vertically movable member 504 and is thus made possible of engagement therewith in the state where the vertically movable member 504 is pushed down.

Also, a coil spring 528 is interposed between the lower surface of a mounting proximal portion of the annular piston 520 and the upper surface of a flange, to be mentioned later, of the bar-like member 505 and works to bias the vertically movable member upward at all times.

The discharge valve 524 is constructed such that a flange-like valve seat 529 descending inward obliquely protrudes in an inner upper portion of the stem 521 and has a valve hole formed in its central portion, and the valve hole is closed by putting a ball-like valve member 530 on the valve seat 529. Further, the discharge valve 524 is so constructed as to be vertically movable up to a position in which it impinges on the lower surface of an engagement rod 531 extending vertically from the top wall of the casing 525.

The bar-like member 505 is provided in such a manner that the lower edge thereof is fixed to permit the flow of liquid in the lower edge portion within the cylinder 503, and the upper edge thereof protrudes in the stem 521 to narrow the passageways in the cylinder 503 and in the stem 521, thus providing smooth jetting of the liquid.

Also, according to the present invention, the tip of the bar-like member 505 is positioned downwardly of the valve seat 529 of the discharge valve in the maximum ascent position and protrudes upwardly of the valve seat 529 with a gap along the periphery when pushing down the vertically movable member 504, and the liquid existing downstream of the discharge valve 524 flows back upstream of the discharge valve via the gap when the vertically movable member 504 rises.

In accordance with this embodiment, the bar-like member 505 has a cylindrical mounting proximal portion 532 housed in the lower portion within the cylinder 503 and having its lower edge surface opened, and a flange 533 protruding from the lower edge of the outer periphery of the proximal portion 532 is fixedly fitted to the lower edge of the inner surface of the cylinder peripheral wall. Further, there erects a bar-like portion 534 extending from the upper surface of the top plate of the proximal portion 532 to the interior of the stem 521. The tip of the bar-like portion 534 is formed as a reducible diameter portion 534*a*, thereby making the interior of the valve hole insertable with a gap formed along the periphery enough to permit the flow of liquid. Then, if the vertically movable member 504 is in the maximum ascent position by a upward biasing force given by the coil spring 528, the tip thereof is positioned under the valve seat 529 enough to maintain a closed state of the discharge valve 524. When the vertically movable member 504 is pushed down, the reducible diameter portion 534*a* is so formed as to protrude upwardly of the valve seat 529 with a gap along the periphery. Further, on this occasion, the valve member 530 never closes so far as the protruded portion of the bar-like member 505 exists and is therefore formed closed till the tip of the bar-like member moves under the valve seat 529 even when the interior of the cylinder 503 is negative-pressurized with the ascent of the vertically movable member 504. In the meantime, the liquid in the vertical cylinder 526 flows back into the stem 521, and consequently the liquid in the nozzle 522 flows back into the vertical cylinder 526.

A dimension of an upward protrusion of the valve seat 529 of the reducible portion 534*a* may be properly selected. If the length and the inside diameter of the nozzle, the inside diameters of the stem and of the head vertical cylinder, and the volumetric capacity of the discharge valve member are the same as those of the conventional pump, however, a vertically movable stroke of the discharge valve member 530 may be preferably set remarkably larger than in the conventional pump. Especially, if a quantity obtained by subtracting a volumetric capacity of the valve member 530 and volumetric capacity of the reducible diameter portion 534*a* protruding upward of the valve seat 529 from a volumetric capacity of the passageway disposed downstream of the discharge valve in which the discharge valve member 530 vertically moves is equal to or larger than the volumetric capacity of the nozzle 522, the liquid in the nozzle flows back substantially into the vertical cylinder, whereby the liquid dropping can be well prevented. More specifically, the protrusion dimension is, though different depending on the inside diameter, etc. of the stem, selected within a range of approximately 5 mm–30 mm.

Also, the inner peripheral surface of an annular protruded portion 535 formed along the inner lower edge of the stem 521 is slidably fitted to the outer periphery of the bar-like portion 534, thereby enabling the vertically movable member 504 to move up and down stably with no lateral deflection. On the other hand, a plurality of vertical recessed grooves 536 are formed in the peripheral direction in the outer periphery of the bar-like portion 534 excluding the reducible diameter portion 534*a*, and the interior of the cylinder 503 communicates via the respective recessed grooves 536 with the interior of the stem 521.

Further, a plurality of window holes 537 are holed in the peripheral direction in the peripheral wall of the mounting proximal portion 532, thus making the interior and exterior of the proximal portion 532 communicable. An engagement rod 538 for regulating the vertical movement of the valve member 519 of the suction valve 510 extends vertically from the central portion of the top plate of the proximal portion 532.

Figure 33:
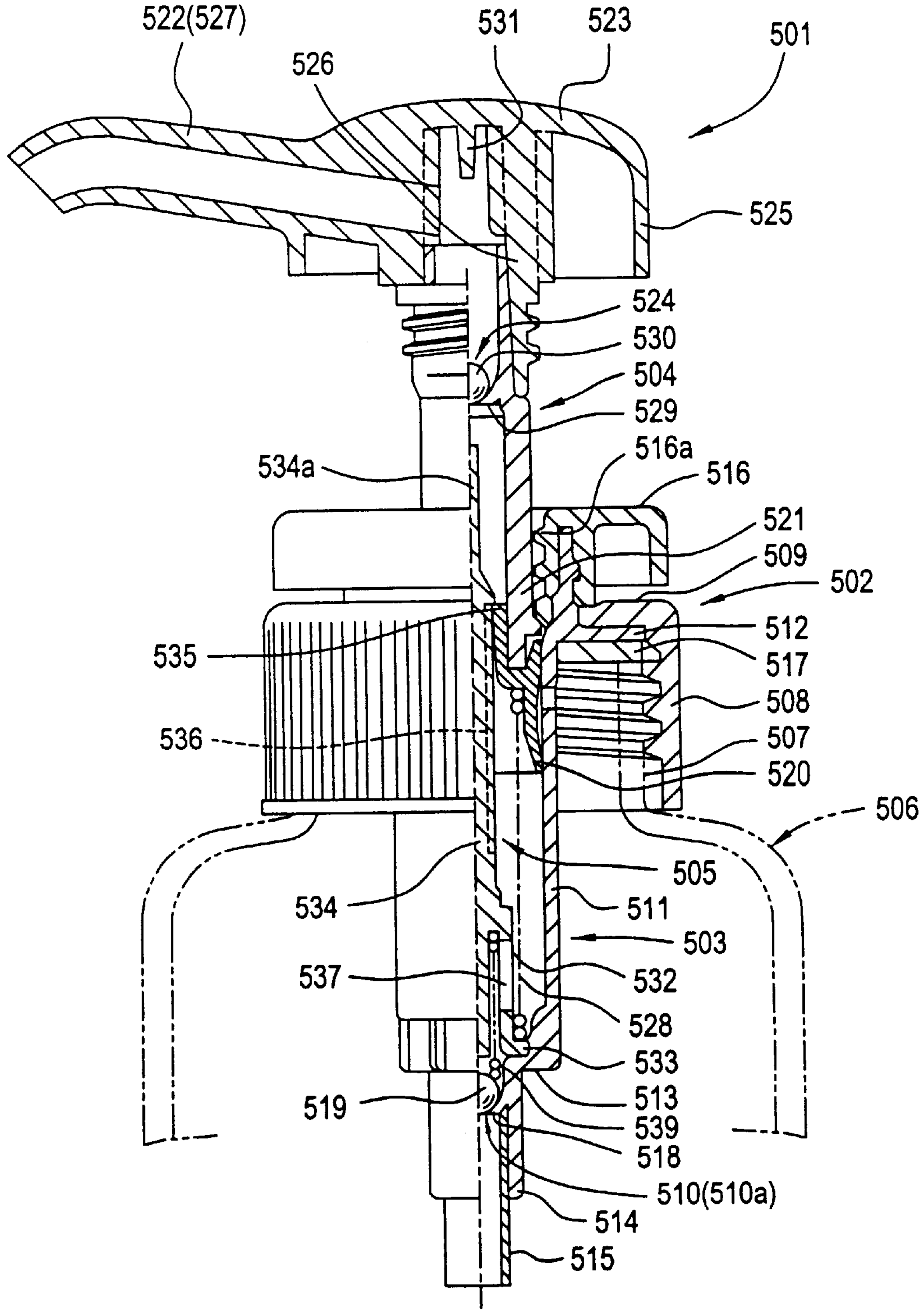
FIG. 33 is a vertical sectional view showing other embodiment of the present invention.

FIG. 33 illustrates other embodiment of the present invention, wherein there is provided a suction valve 510*a* including a valve member 519 biased by a resilient member in the valve hole closing direction at all times.

In accordance with this embodiment, the lower edge of a coil spring 539 weak in it resilience for the resilient member with its upper edge fitted to the outer periphery of the engagement rod 538 is press-fitted to the upper surface of the valve member 519. Other configurations are the same as those in the embodiment discussed above.

Figure 34:
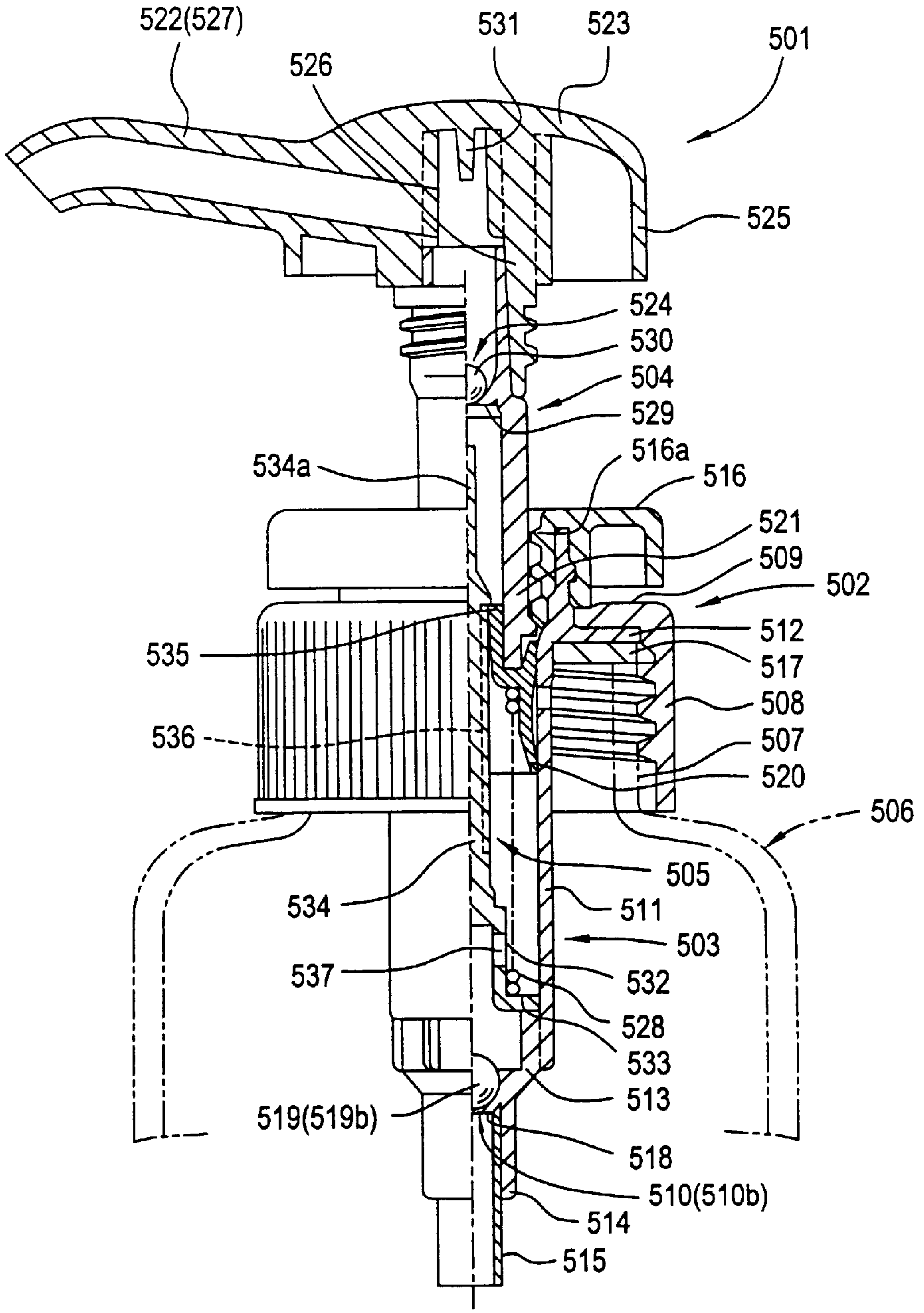
FIG. 34 is a vertical sectional view illustrating other embodiment of the present invention.
Figure 35:
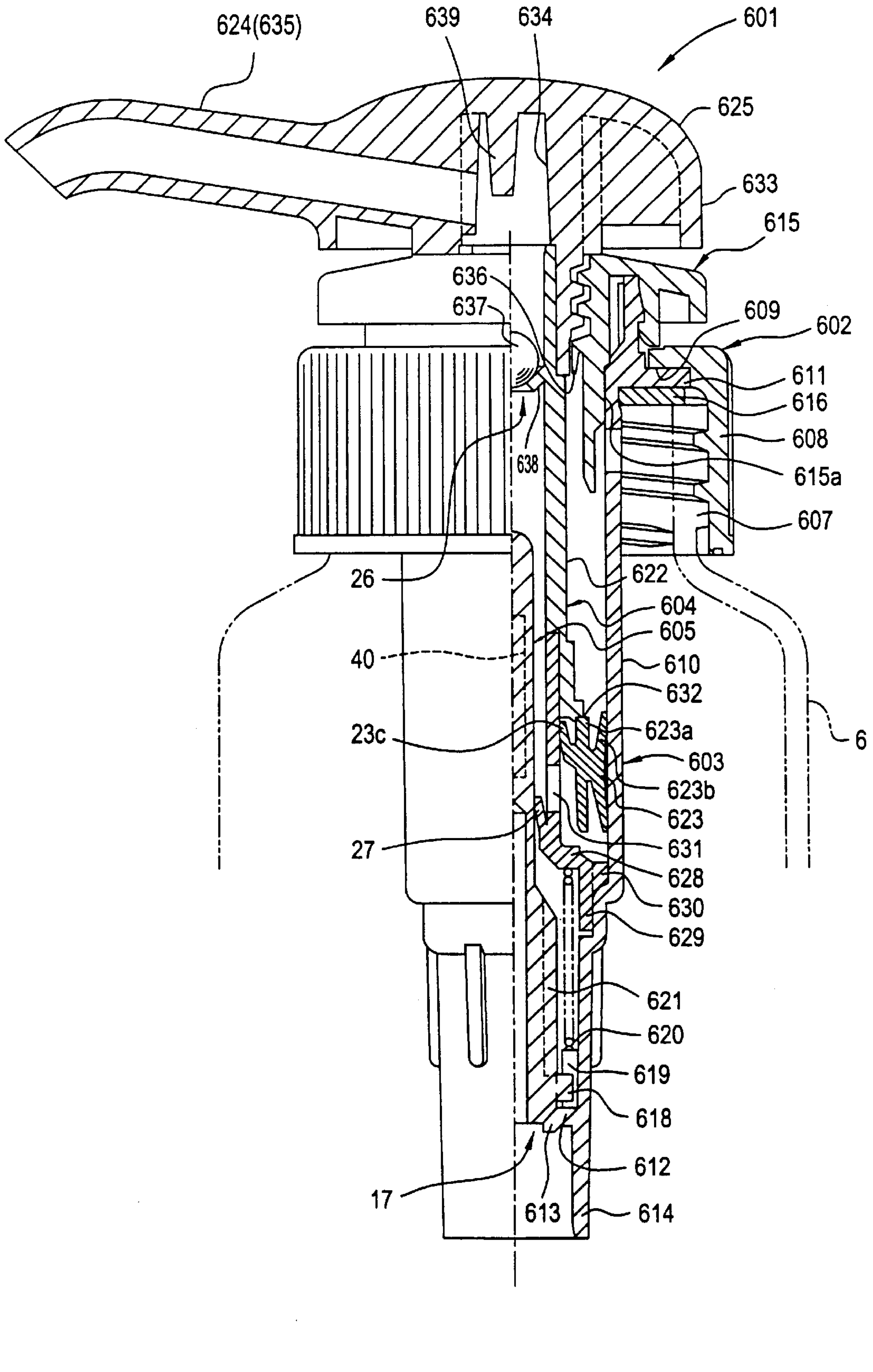
FIG. 35 is a sectional view showing one embodiment of the present invention.

FIG. 34 also illustrates other embodiment of the present invention, wherein there is provided a suction valve 510*b* including a suction valve member 519*a* having a weight that is more than twice the weight of the discharge valve member 530. Other configurations area the same as those in the embodiment of FIG. 31.

Note that the respective members described above are properly selectively composed of synthetic resins, metals and materials such as particularly elastomer exhibiting an elasticity.

In the suction valve 510*a* in the embodiment illustrated in FIG. 33, the valve member 519 is always biased in the valve hole clogging direction, and hence the suction valve 510 is surely prevented from being opened till the discharge valve member 524 is closed. As a result, the suction valve 510 won't open till the discharge valve 524 s closed, and the liquid in the head vertical cylinder 526 certainly flows back upstream of the discharge valve 524. Consequently, the liquid in the nozzle 522 flows back into the vertical cylinder 526.

Further, in the suction valve 510*b* in accordance with the embodiment illustrated in FIG. 34, the valve member 519*b* thereof has the weight that is more than twice the valve member 530, and similarly the suction valve 510 is prevented from surely being opened till the discharge valve 524 is closed.

As discussed above, according to the pump of the present invention, the lower edge thereof is fixed to the lower edge within the cylinder to permit the flow of liquid, and there is provided the bar-like member with its upper edge protruding in the stem. The tip of the bar-like member is positioned downwardly of the valve seat of the discharge valve in the maximum ascent position and protrudes upwardly of the valve seat with the gap along the periphery when pushing down the vertically movable member, and the liquid existing downstream of the discharge valve flows back upstream of the discharge valve via the gap when the vertically movable member rises. Hence, when jetting the liquid by pushing down the vertically movable member, the discharge valve member can be certainly pushed down to the predetermined position by use of the tip of the bar-like member. Further, when the interior of the cylinder is negative-pressurized with the ascent of the pushed down vertically movable member, the discharge valve member never immediately clogs the valve hole. The valve does not close till at least the tip of the bar-like member retracts downwardly of the valve seat, and, therefore, the liquid existing downstream of the discharge valve flows back into the stem disposed upstream of the discharge valve. Correspondingly, the liquid in the nozzle flows back into the head vertical cylinder, and the liquid dropping out of the nozzle tip can be thereby obviated.

Moreover, since the liquid in the nozzle flows back into the head vertical cylinder, there is caused no such inconvenience that the liquid is dry-solidified even when used for jetting the high-viscosity liquid.

Also, as described above, the discharge valve member can be controlled in terms of a time of the vertical movement thereof by use of the tip of the bar-like member, and hence the liquid dropping can be prevented without depending on whether or not the liquid has the viscosity.

Further, the pump exhibits such advantages that the pump can be constructed by modifying a slight part of structure of the conventional pump and is therefore easily manufactured at the low cost.

In addition, it is possible to surely prevent the suction valve from being opened till the discharge valve is closes after the predetermined amount of liquid flows back into the stem disposed upstream of the discharge vale out of the valve hole of the discharge valve. Therefore, the liquid in the nozzle is allowed to certainly flow back into the head vertical cylinder. As a result, it is feasible to prevent the liquid dropping and the liquid dry-solidification as well more preferably.

Other embodiment of the present invention will hereinafter be discussed with reference to the drawings.

FIGS. 35 to 40 illustrate one embodiment of the present invention, wherein the numeral 601 designates a liquid jet pump. The pump 601 includes a mounting cap 602, a cylinder 603, a vertically movable member 604 and a suction valve member 605.

The mounting cap 602 serves to fix the cylinder 603 to a container 606 and is constructed such that an inward-flange-like top wall 609 extends from an upper edge of a peripheral wall 609 helically-fitted to an outer periphery of a container cap fitted neck portion 607.

The cylinder 603 is fixed to the container 606 through the mounting cap 462, and the lower edge portion thereof extends vertically into the container.

In accordance with this embodiment, the cylinder 603 has an outward flange 611 protruding outward from the outer peripheral upper portion of a cylindrical peripheral wall 610 and a flange-like valve seat 613 protruding inward downward obliquely from the peripheral edge of a window hole holed in the central portion of a bottom wall 612. The cylinder 603 is also provided with a fitting cylindrical portion 614 protruding downward from the lower surface peripheral edge of the bottom wall 612. The upper edge of a pipe (unillustrated) is attached to this fitting cylindrical portion 614, and lower portion thereof extends downward in the container.

Further, an engagement member 615 for engaging the vertically movable member 604 in the push-down state is fixedly fitted to the upper edge of the peripheral wall 610. The engagement member 615 is constructed such that the fitting cylindrical portion fitted via a rugged engagement element to the outer periphery of the upper edge of the cylinder 603 perpendicularly extends from a doughnut-like top plate, and an inner cylinder 615 fitted to the upper edge of the inner peripheral of the cylinder 603 extends perpendicularly from the inner peripheral edge of the top plate. An inner cylinder 615*a* and an upper edge inner surface of the cylinder 603 are prevented from being turned round by the engagement of vertical protrusions with each other, and a thread for helical fitting of the vertically movable member is formed along the inner peripheral upper portion of the inner cylinder 615*a*.

Then, the outward flange 611 is placed via a packing 616 on the upper surface of the container neck portion 607 and is caught by a top wall 609 of the mounting cap 602 helically fitted to the outer periphery of the neck portion and by the upper surface of the container neck portion 607.

The suction valve 605 includes a suction valve 617 formed with its lower surface closely fitted onto the valve seat 613 provided in the inner lower portion of the cylinder 603 and takes a bar-like shape erecting upward to permit its vertical movement at a predetermined stroke.

In accordance with this embodiment, the lower surface peripheral edge portion is so tapered as to be closely fitted to the upper surface of the valve seat 613, and there is provided the suction valve member 605 with its lower half hollowed. Further, the member 605 is so constructed as to be vertically movable till each engagement protrusion 618 impinges on a coil spring 620, wherein the plurality of rectangular engagement protrusions 618 are protruded in the peripheral direction from the lower edge of the outer periphery thereof, and, on the other hand, the lower edge surface of the coil spring 620 for biasing upward the vertically movable member 604 is secured to the upper surface of a plurality of rectangular plate ribs 619 formed in the peripheral direction on the inner peripheral lower edge portion of the peripheral wall 610 of the cylinder 603. Note that a plurality of ribs generally designated 621 in the Figure are formed in the peripheral direction on the outer peripheral upper portion of the suction valve member 605.

The vertically movable member 604 includes a stem 622, an annular piston 623, a push-down head 625 with a nozzle 624 and a discharge valve 626.

The stem 622 has an annular seal portion 627 including its inner peripheral edge liquid-tightly slidably fitted to the outer periphery of the suction valve member 605 and protruding from the inner peripheral lower edge and is so constructed as to be vertically movable in the upward biased state.

In accordance with this embodiment, there is protruded an upward skirt-like annular seal portion 627 taking the cylindrical shape with its upper and lower edge surfaces opened and ascending inward obliquely from the inner peripheral lower edge, and the inner peripheral edge thereof is fitted to the outer periphery of the suction vale member 605. Further, an outward flange 628 is protruded from the outer peripheral lower edge portion, and a vertically descending wall 629 extends vertically from the outer peripheral edge of the flange 628 with a gap from the cylinder inner surface. Further, a plurality of protrusions 630 are protruded in the peripheral direction from the outer surface upper portion of the vertically descending all 629. There is a slight gap between the outer peripheral surface of each protrusion 630 and the cylinder inner surface, and this functions to compensate a trajectory thereof if a lateral deflection is caused when the stem 622 moves up and down. Note the stem 622 is composed of the two members in this embodiment.

Moreover, the vertically movable member 604 is always biased upward by contact securing the upper surface of the coil spring 620 to the lower surface of the flange 628.

In the annular piston 623, the stem 622 is so fitted to the outer peripheral lower edge as to be vertically movable at the predetermined stroke, the outer peripheral edge thereof is slidably attached to the cylinder inner surface, and a through-hole 631 holed in the lower edge portion of the stem 622 is so provided as to be openable and closable.

In accordance with this embodiment, there is protruded an outside slide portion **623*b* taking a circular arc shape in section with its upper portion protruding outward from the outer peripheral surface of a cylindrical proximal portion 623*a*, and an upward skirt-like inside slide portion 623*c* ascending obliquely is protruded from the inner peripheral surface of the proximal portion 623*a*, thus constituting the annular piston 623. On the other hand, a downward stepped portion 632 is formed in a predetermined position above the outward flange 628 along the outer periphery of the stem 622, and a through-hole 631 is formed in the stem between the stepped portion 632 and the outward flange 628**.

Then, the outside slide portion **623*b* is liquid-tightly slidably fitted to the inner surface of the cylinder 603, and the inside slide portion is liquid-tightly slidably fitted to the outer periphery of the stem 622. Further, there is vertically movably fitted to the stem 622 at the predetermined stroke from a position where the upper surface of a proximal portion 623*a* impinges on the lower surface of the stepped portion 632 to a position where the lower surface of the proximal portion 623*a* impinges on the upper surface of the flange 628. Also, when the vertically movable member 604 rises, the lower edge of the proximal portion 623*a* liquid-tightly contacts the upper surface of the flange 628, thus clogging the through-hole 631. When the vertically movable member 604 is pushed down, the annular piston 623 is thrust upward by the liquid pressure with respect to the stem 622, thereby opening the through-hole 631. Moreover, in the maximum ascent position of the vertically movable member 604, the upper edge of the proximal portion 623*a* impinges and engages with the lower surface of an inner cylinder 615*a* of the engagement member 615. A push-down head 625 formed in continuation from the upper edge of the stem 622 is vertically movable above the mounting cap 602. In accordance with this embodiment, the push-down head 625 includes a cylindrical casing 633 with an opening formed in the lower edge surface and a peripheral wall perpendicularly extending from the peripheral edge of the top wall, and a lower portion of a vertical cylinder 634 vertically extending from the center of the top wall lower surface of the casing 633 is attached to the outer peripheral upper edge of the stem 622, thus fixing it to the stem 622. Further, a horizontal cylinder 635 with its proximal portion opened to the upper front surface of the vertical cylinder 634 penetrates the casing peripheral wall and protrudes forward therefrom, thus forming this horizontal cylinder 635 as a nozzle 624. The nozzle 624** is constructed so that its proximal portion ascends obliquely forward, while its tip descends obliquely. With this construction, the liquid dropping can be prevented moire surely.

Furthermore, a thread formed along the outer periphery of the vertical cylinder 634 with respect to a portion protruding downward from the casing 633 meshes with the thread of the engagement member 615 when pushing down the vertically movable member 604 and is thus made possible of engagement therewith in the state where the vertically movable member 604 is pushed down. Also, on this occasion, the construction is such that the outer peripheral lower edge of the vertically descending wall 629 protruding from the stem 622 is liquid-tightly fitted to the inner surface of a reducible diameter portion formed at the lower portion of the cylinder peripheral wall 610. Further, the outer peripheral lower edge of the vertically cylinder 634 is liquid-tightly fitted to the inner periphery of a downward skirt-like annular protruded piece 636 provided on the inner surface of an inner cylinder **615*a* of the engagement member 615**.

In the discharge valve 626, the valve member 637 for closing the valve hole formed in the inner upper portion of the stem 622 is so provided as to be vertically movable by the liquid pressure.

In accordance with this embodiment, a flange-like valve seat 638 descending inward obliquely is protruded at the upper portion within the stem 622, and then a valve hole is formed in the central portion thereof. A ball-like valve member 637 is placed on the valve seat 638 to clog the valve hole, thus constituting the discharge valve 626. Further, the valve member 637 is so formed as to be vertically movable up to a position where it impinges on the lower surface of an engagement rod 639 extending perpendicularly from the top wall of the casing 633.

The pump according to the present invention is utilized for jetting the liquid exhibiting the high viscosity on the order of, e.g., 500 cps–15000 cps. When using the high viscosity liquid as described above, it hardly happens that the discharge valve member 637 pushed up by the liquid pressure immediately drops down to the valve seat 638 by a self-weight thereof. The discharge valve member 331 vertically moves substantially along the flow of liquid, although slightly different depending on the liquid viscosity and a weight of the valve member. Accordingly, there is seen no remarkable error between a flow rate of the liquid and a moving velocity of the valve member.

Further, in accordance with this embodiment, let Va be the volumetric capacity of the nozzle 624, let Vb be the volumetric capacity of a liquid passageway where the discharge valve member 637 is vertically movable, and let Vc be the volume of the discharge valve member 637, wherein the vertical stroke of the discharge valve member 439 is regulated so that Vb−Vc is equal to or larger than Va. An actual vertical stroke of the discharge valve member 637 based on this regulation is, though different depending on the length and inside diameter of the nozzle and the inside diameter of the stem 622, on the order of 5 mm–30 mm larger than in the conventional pump constructed by putting the ball valve on the valve seat. In this connection, this type of conventional valve has a minimum clearance of approximately 1–4 mm enough for the valve hole to permit the passage of liquid when opening the valve. More preferably, the actual vertical stroke thereof is 10 mm or above.

Figure 36:
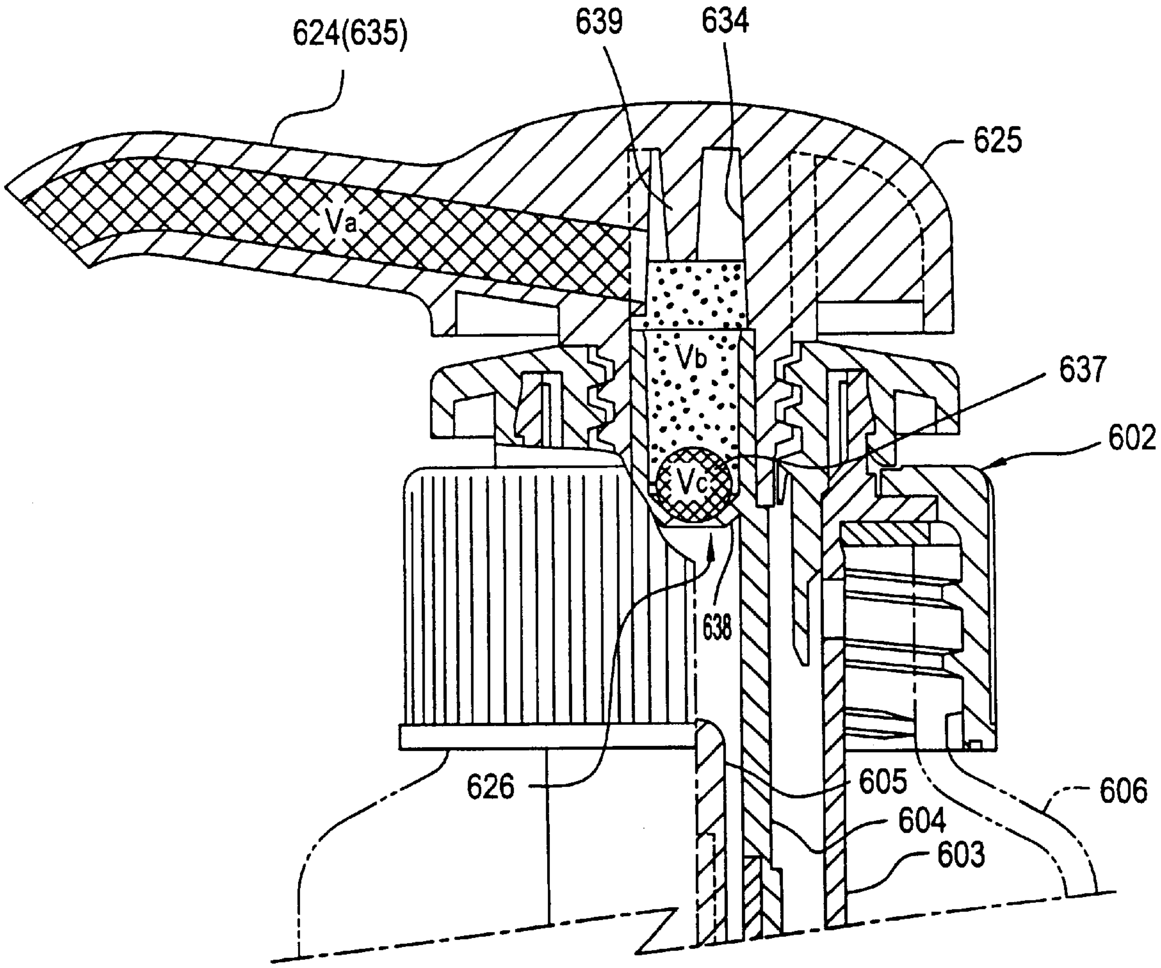
FIG. 36 is an explanatory view illustrating the push-down head in the same embodiment.
Figure 37:
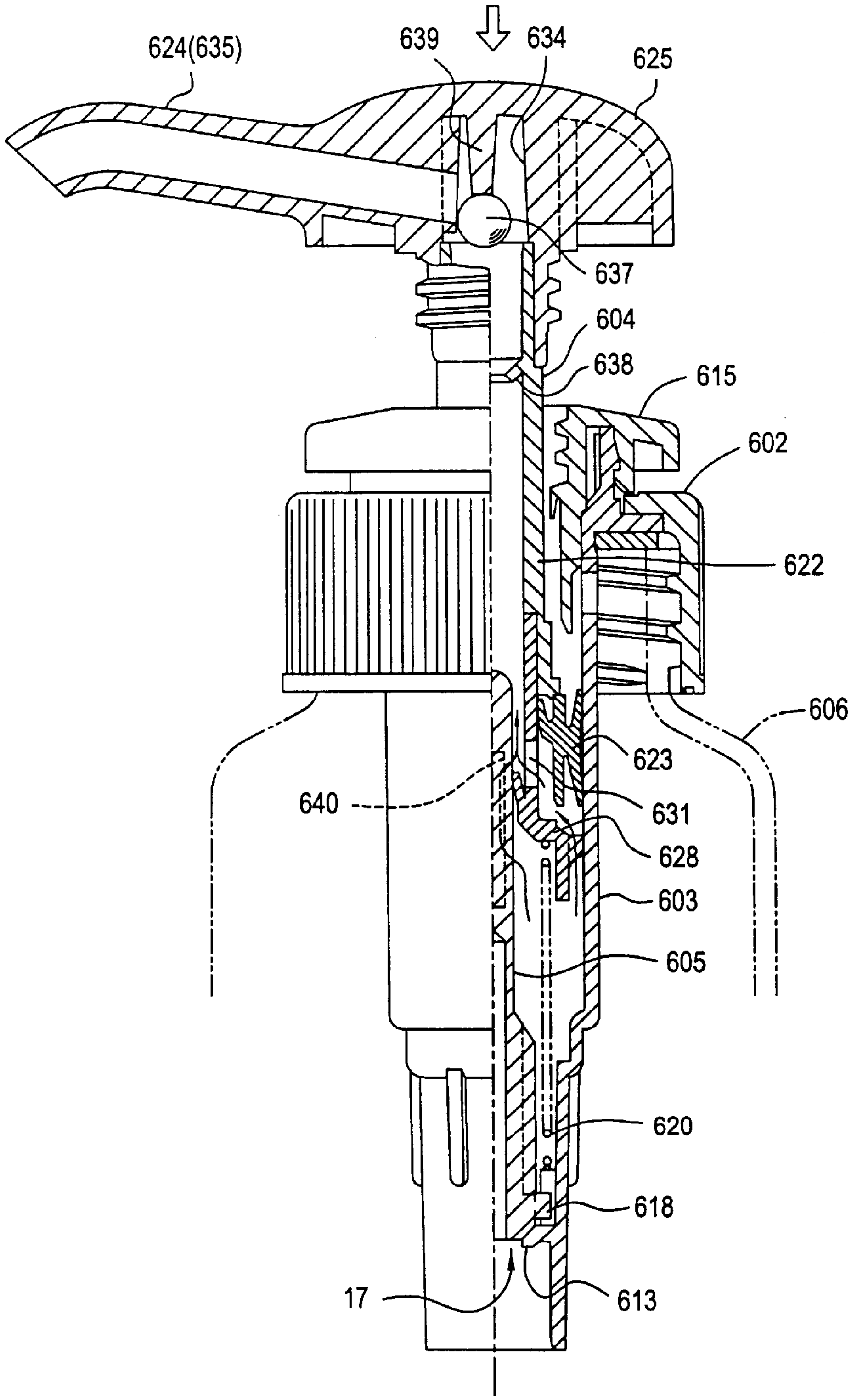
FIG. 37 is an explanatory sectional view when the head is pushed down in the same embodiment.
Figure 38:
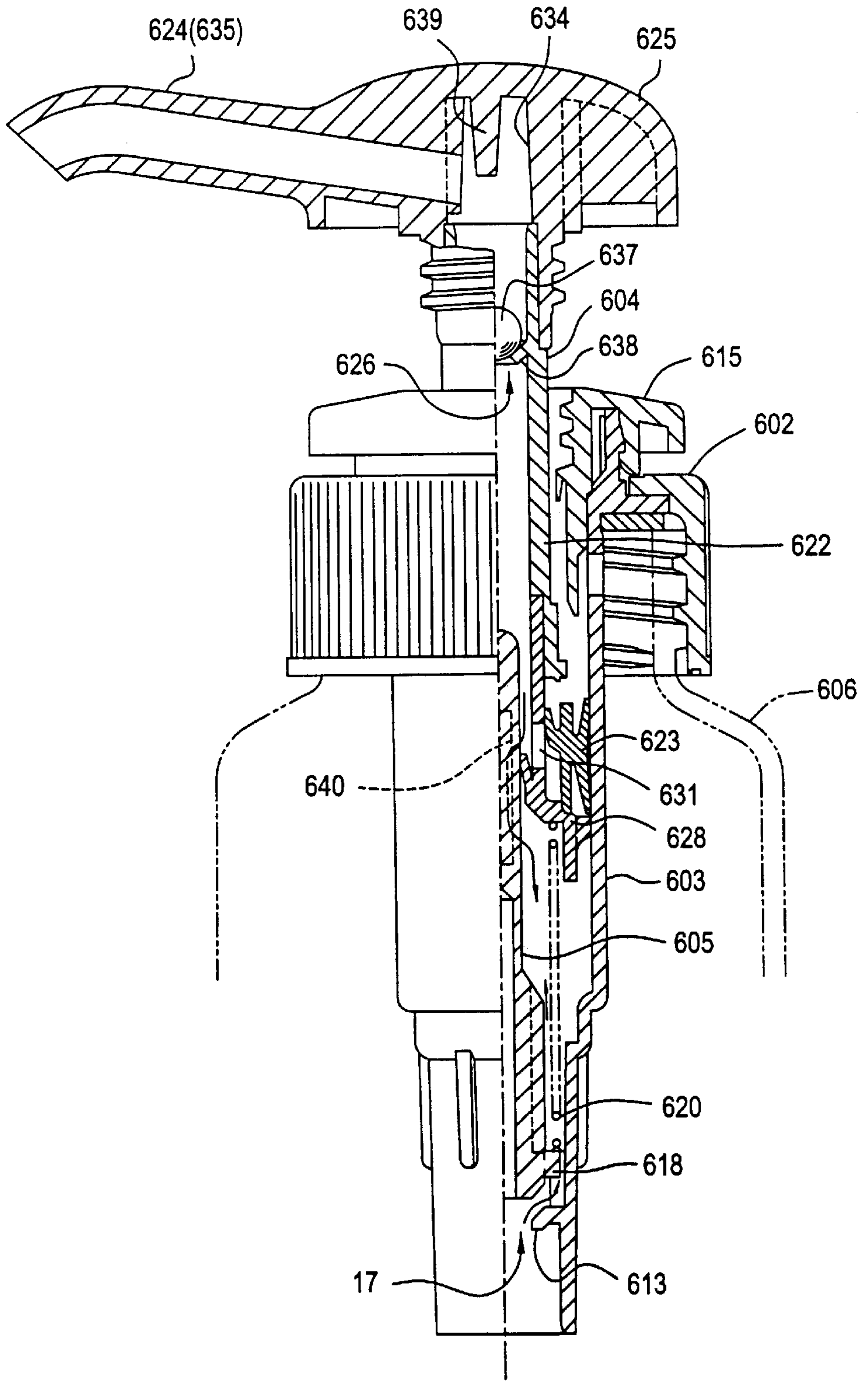
FIG. 38 is an explanatory sectional view when the head rises in the same embodiment.
Figure 39:
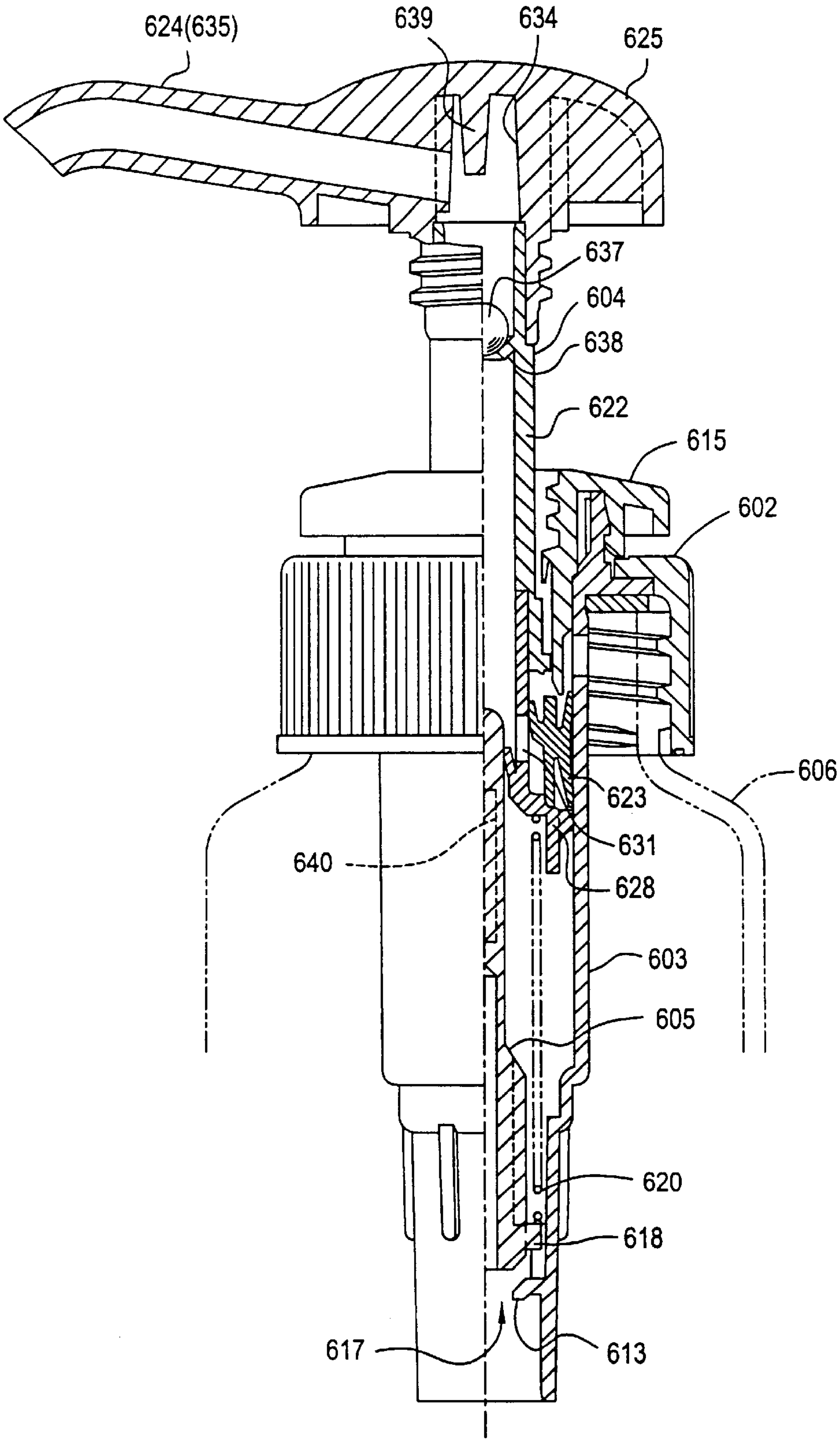
FIG. 39 is an explanatory sectional view showing the head maximum ascent position in the same embodiment.
Figure 40:
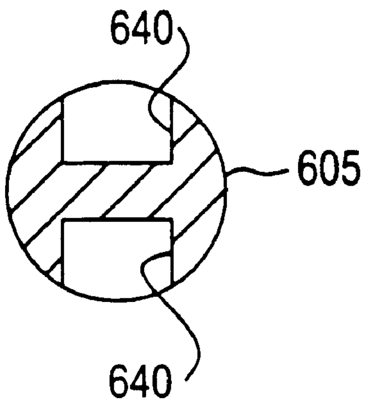
FIG. 40 is a cross-sectional view illustrating the suction valve member in the same embodiment.

Further, according to the present invention, vertical grooves 640 for the backflow of the liquid are formed along the outer periphery of the suction valve member 605. The vertical grooves 605 serve for the backflow of the liquid in the stem 622 into the cylinder 603 when the vertically movable member 604 rises. In this embodiment, as illustrated in FIG. 40, a pair of vertical grooves 640 each assuming a rectangular shape in cross-section are formed. Further, the vertical groove 640 is, as illustrated in FIG. 1, formed so that the annular seal portion 627 is positioned under the vertical groove 640 in a state where the vertically movable member 604 is pushed and engaged but is, as shown in FIG. 36, positioned above the vertical groove 640 when the vertically movable member 604 is in the maximum ascent position. Note that the cross-sectional structure of the vertical groove 640 is not limited to the above-mentioned but may be properly selected, and the number of the vertical grooves is not confined to 2 but may be properly selected.

Then, when the vertically movable member 604 is raised after pouring the liquid by pushing down the vertically movable member 604, the liquid in the stem 622 flows back via the vertical grooves 640 into the cylinder 603 negative-pressurized. Further, the liquid in the passageway where the discharge valve member 637 flows back into the stem 622, and, besides, the liquid in the nozzle 624 flows back into the above passageway. On this occasion, if Vb−Vc is equal to or larger than Va, the liquid in the nozzle flows back substantially into the above passageway.

Figure 41:
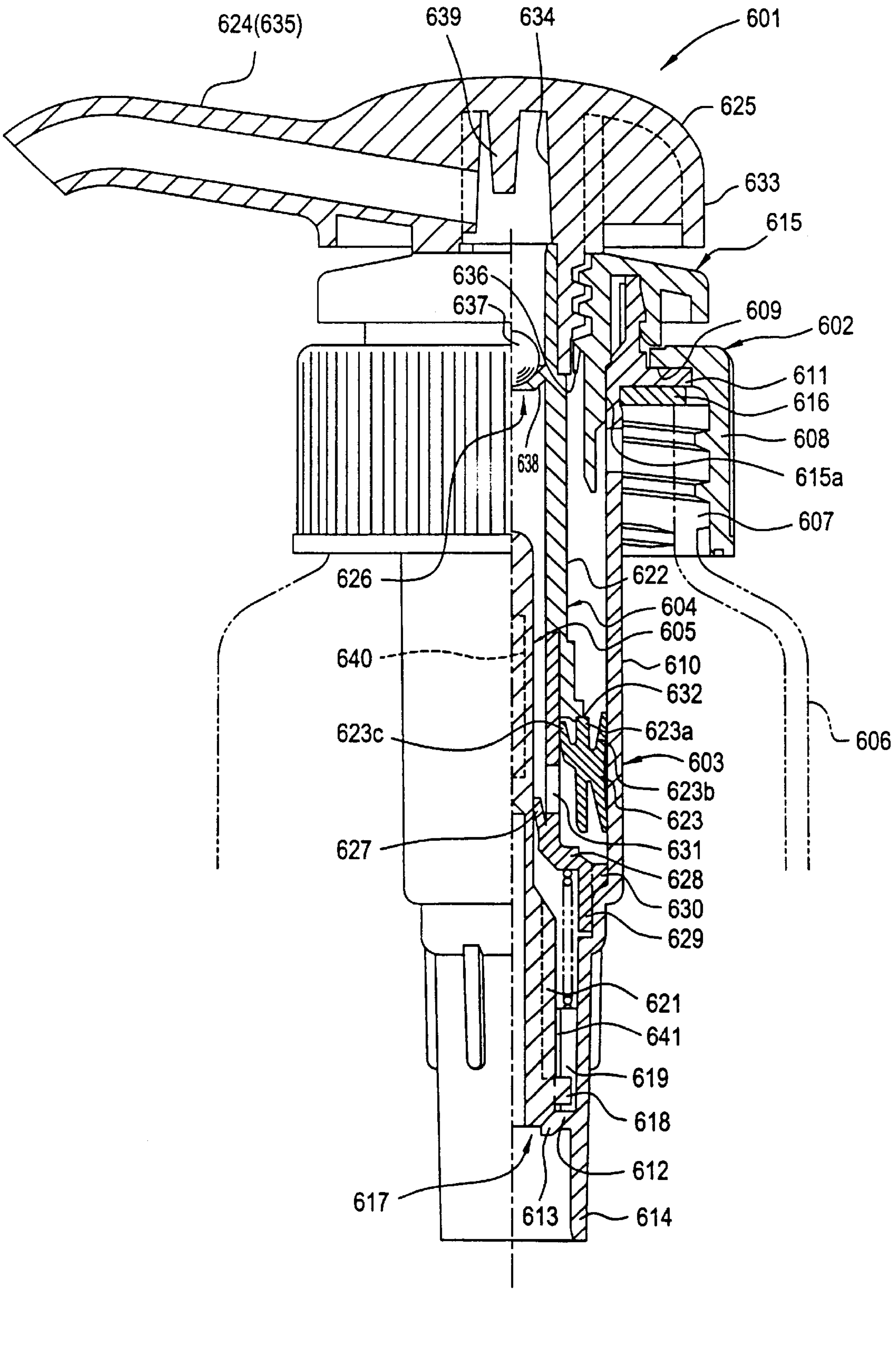
FIG. 41 is a sectional view showing other embodiment of the present invention.
Figure 42:
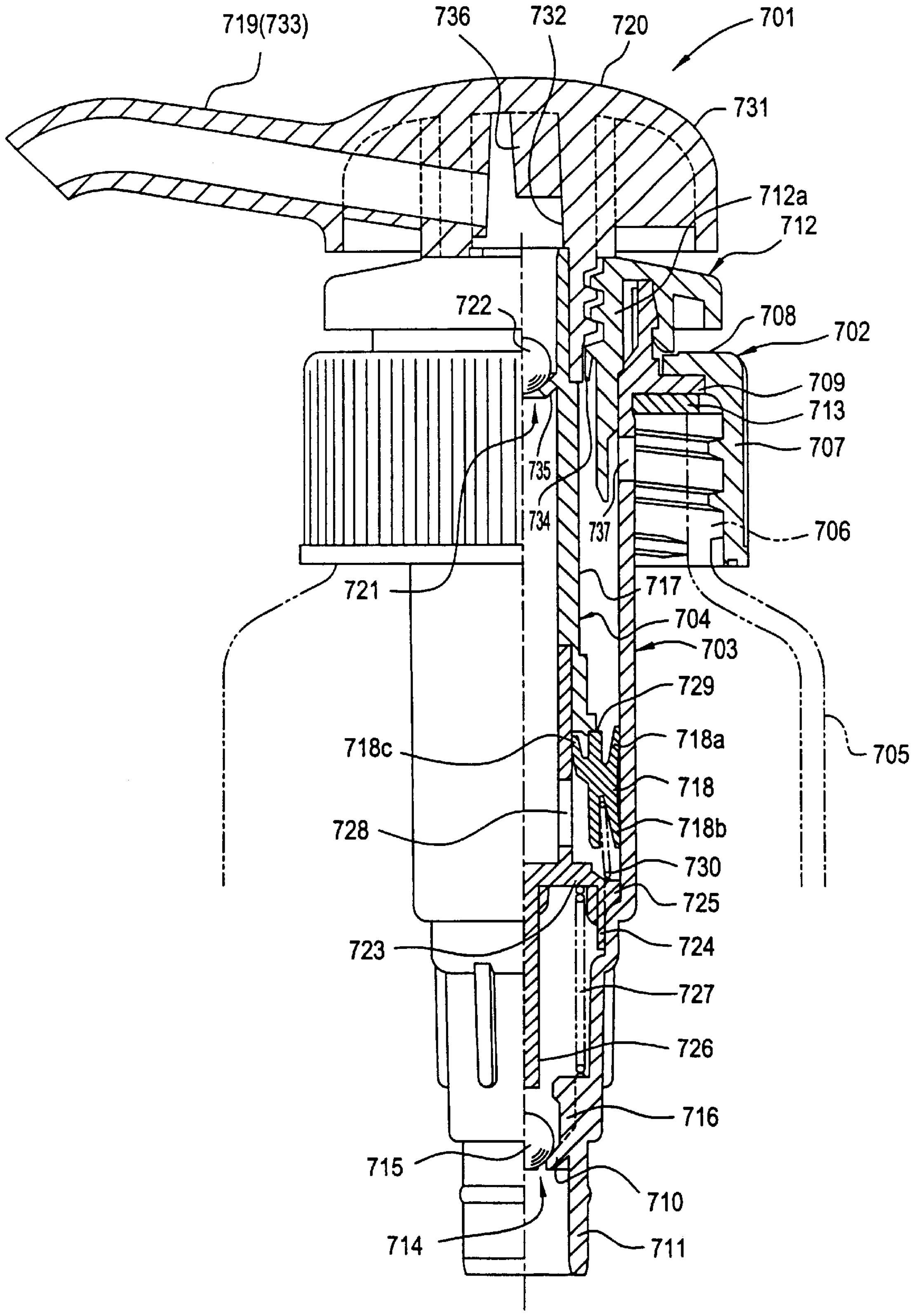
FIG. 42 is a sectional view showing one embodiment of the present invention.
Figure 43:
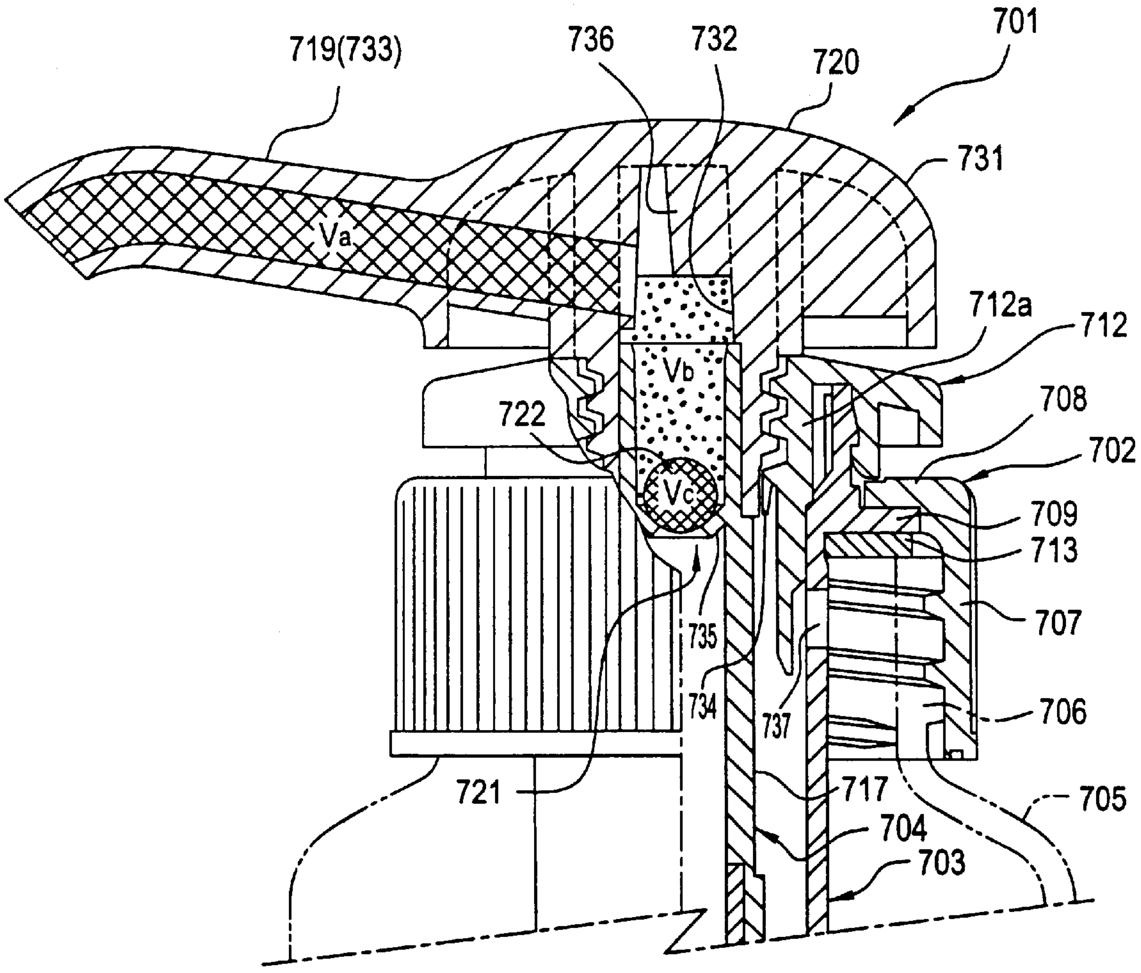
FIG. 43 is an explanatory view showing the push-down head in the same embodiment.
Figure 44:
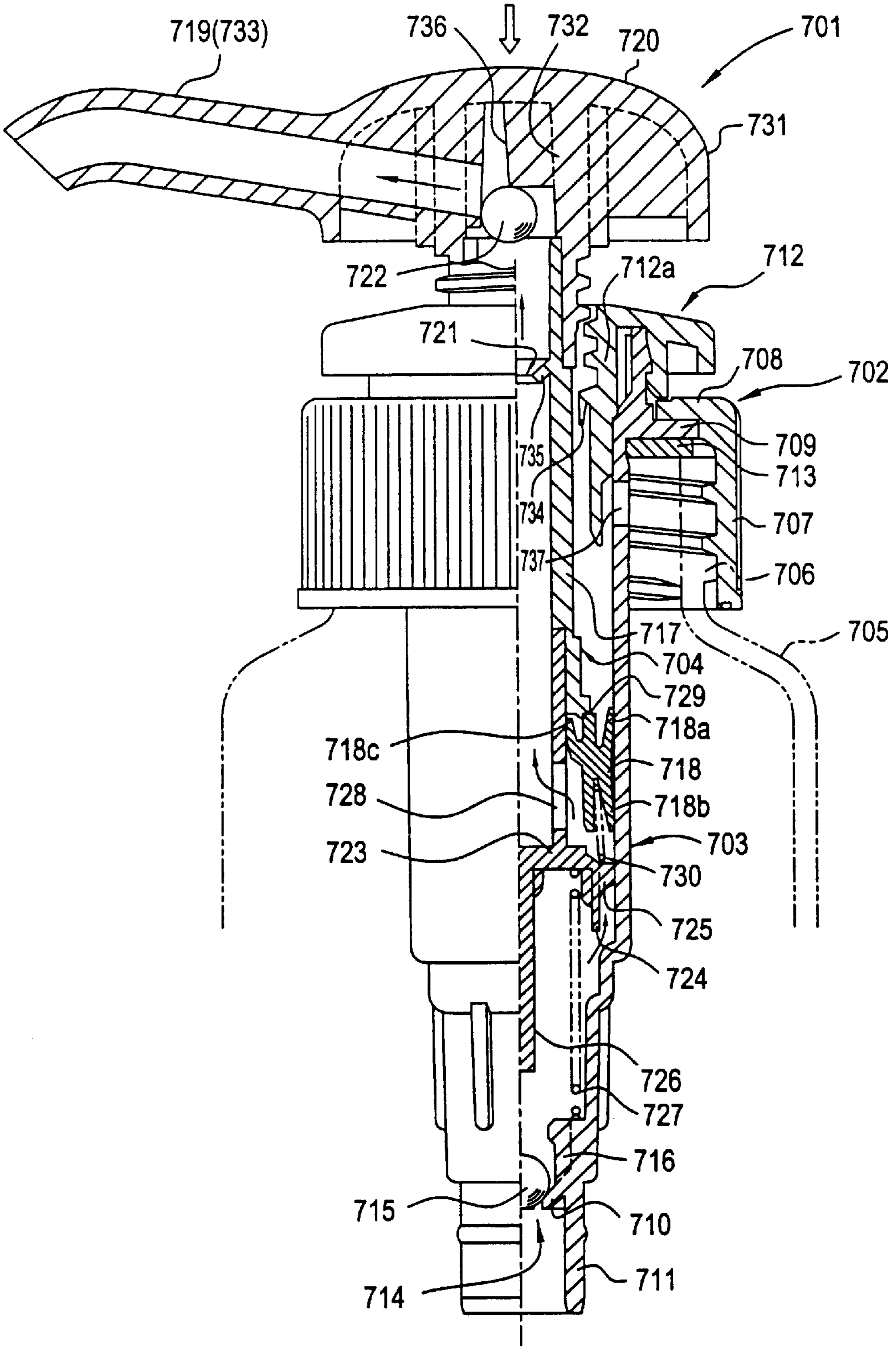
FIG. 44 is an explanatory sectional view when pushing down the head in the same embodiment.
Figure 45:
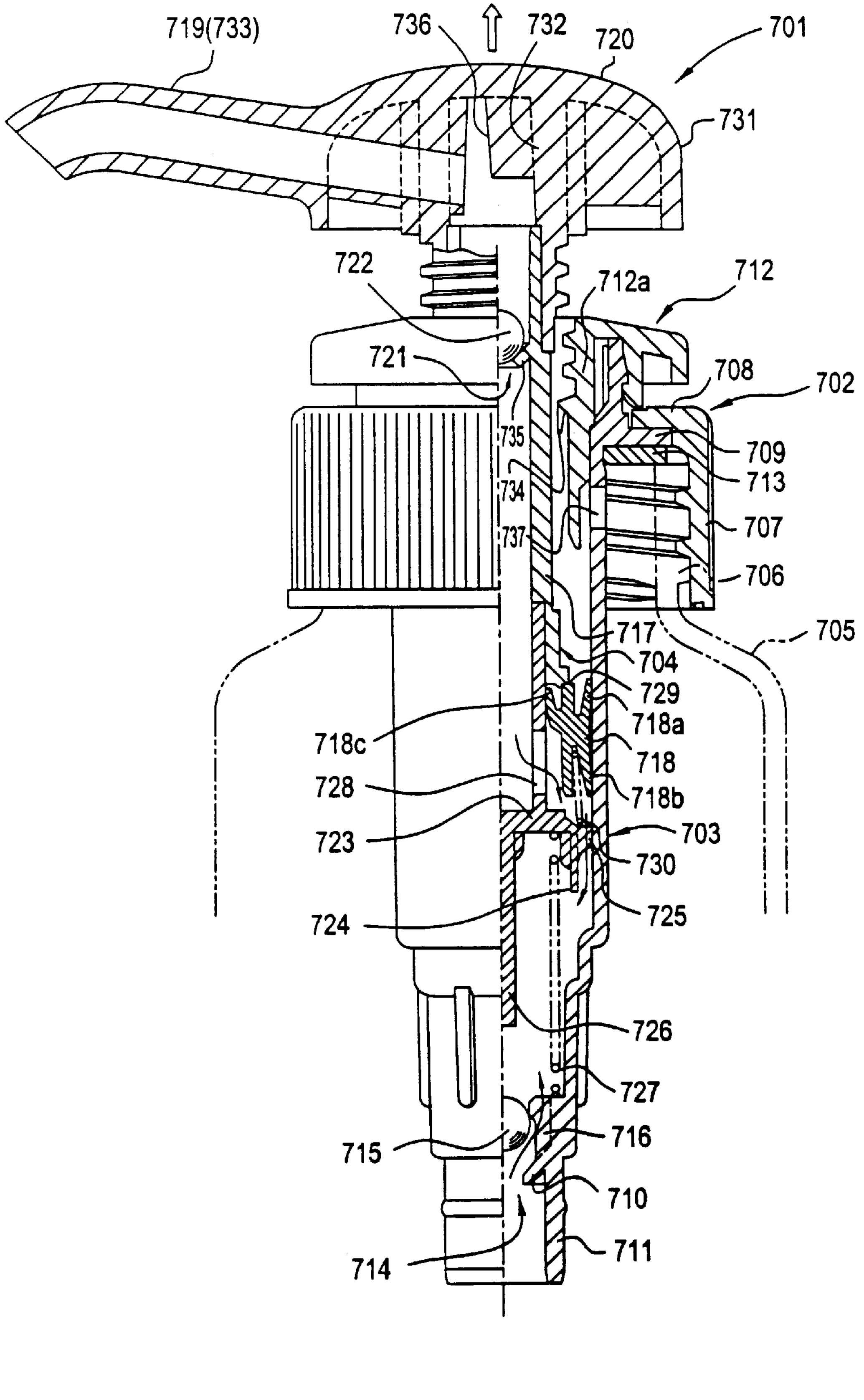
FIG. 45 is an explanatory sectional view when the head rises in the same embodiment.
Figure 46:
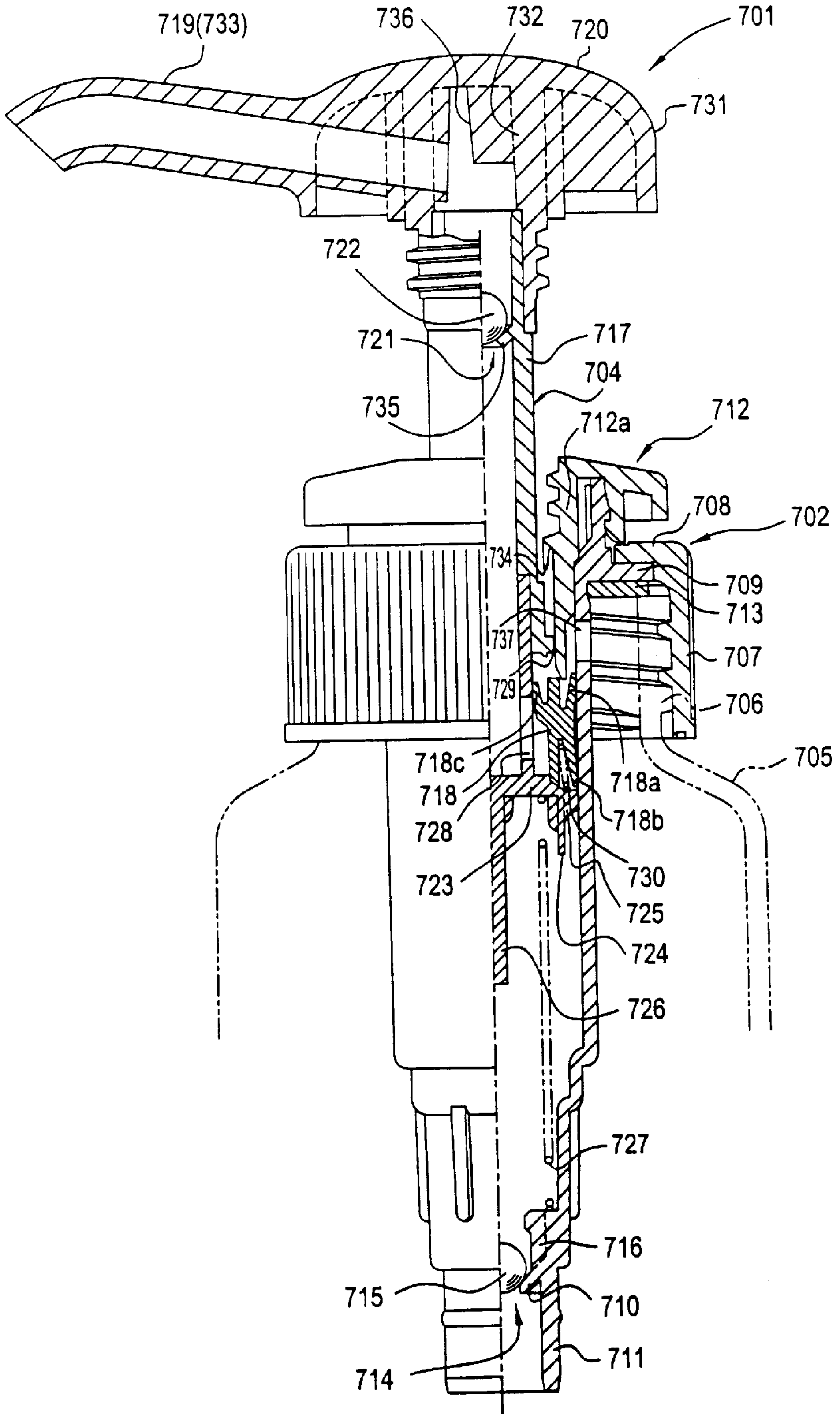
FIG. 46 is an explanatory sectional view illustrating the head maximum ascent position in the same embodiment.
Figure 47:
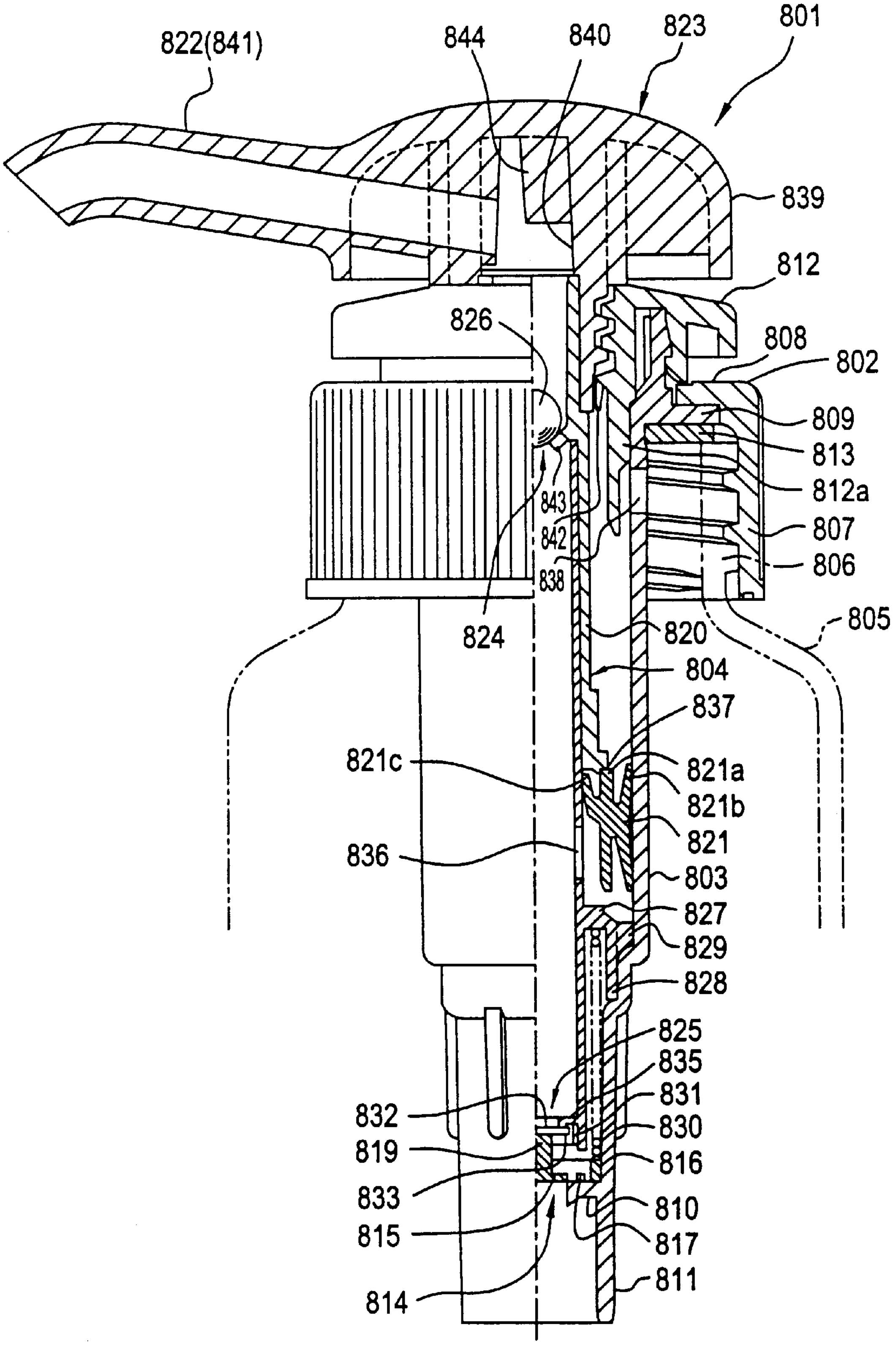
FIG. 47 is a sectional view illustrating one embodiment of the present invention.

FIG. 41 illustrates other embodiment of the present invention. In accordance with this embodiment, the suction valve member 605 is always biased by a resilient member 641 in the valve hole closing direction. In accordance with this embodiment, a horizontal spiral portion of the upper edge is fixedly attached between the upper surface of each plate rib 619 and the lower surface of a coil spring 620, the cylindrical portion extending from the inner peripheral edge of the spiral portion is provided downward along the inner surface of each rib 619, and there is also provided a coil spring 641 serving as a resilient member secured to the upper surface of each engagement protrusion 618 of the suction valve member 605 in the embodiment discussed above. Other configurations are the same as those in the embodiment described above.

In the embodiment illustrated in FIG. 41, the suction valve member 605 is always biased in the valve hole closing direction, and, therefore, when the vertically movable member 604 is raised, the suction valve 617 remains closed by the biasing force of the resilient member 641 till the discharge valve 626 at its initial stage is closed. After the discharge valve 626 has been closed, the negative pressure in the cylinder 603 works greatly in such a direction as to move the suction valve member 615 upward. Accordingly, the suction valve 617 opens after the discharge vale 626 has been closed.

It is to be noted that the respective members are properly selectively composed of synthetic resins, metals and materials such as particularly elastomer exhibiting an elasticity.

As explained above, the pump according to the present invention includes the discharge valve in which the valve hole formed in the upper portion in the stem is clogged by the valve member moved up and down by the liquid pressure, and the vertical grooves for the backflow of the liquid are formed along the outer periphery of the suction valve member. Hence, when using the pump of the present invention for discharging the liquid exhibiting the viscosity, the intra stem liquid flows back into the cylinder via the vertical grooves till the discharge valve is closed when the head is raised after jetting the liquid by pushing down the push-down head. Correspondingly, the liquid in the passageway where the discharge valve member moves up and down flows back into the stem, and further the intra nozzle liquid flows back into the above passageway. Hence it is feasible to obviate the liquid dropping out of the nozzle tip and prevent the liquid dry-solidification as much as possible.

Further, the backflow of the intra nozzle liquid into the passageway where the discharge valve member moves up and down is attributed directly to the negative-pressurization in the cylinder. Then, the backflow quantity per unit time is larger than the backflow attributed to the increase in the volumetric capacity of the stem due to the relative descent of the conventional bar-like suction valve member (because of, as a matter of course, a cylinder diameter being larger than a diameter of the bar-like suction valve member), and a sufficient quantity of intra nozzle liquid can be flowed back faster than by this type of conventional pump.

Further, the pump exhibits such advantages that the pump can be constructed by modifying a part of structure of this kind of conventional pump and is therefore easily manufactured at a low cost.

Moreover, let Va be the volumetric capacity of the nozzle, let Vb be the volumetric capacity of the liquid passageway where the discharge valve member is vertically movable, and let Vc be the volume of the discharge valve member, wherein the vertical stroke of the discharge valve member is regulated so that Vb−Vc is equal to or larger than Va. With this arrangement, substantially the whole amount of liquid in the nozzle blows back into the passageway where the discharge valve member moves up and down, and it is possible to prevent the liquid dropping and the liquid dry-solidification more certainly.

Further, the suction valve can be surely closed till the discharge valve is closed after the predetermined quantity of liquid flows back into the stem disposed upstream of the discharge valve via the valve hole of the discharge valve, and hence the intra nozzle liquid is allowed to flow back into the above passageway more surely. As a result, the liquid dropping and the liquid dry-solidification can be prevented more preferably.

Other embodiment of the present invention will hereinafter be described with reference to the drawings.

FIGS. 42 to 46 illustrate other embodiment of the present invention, wherein the numeral 701 designates a liquid jet pump. The pump 701 includes a mounting cap 702, a cylinder 703 and a vertically movable member 704.

The mounting cap 702 serves to fix the cylinder 703 to a container 705 and is constructed such that an inward flange-like top wall 708 extends from an upper edge of a peripheral wall 707 helically-fitted to an outer periphery of a container cap fitted neck portion 706.

The cylinder 703 is fixed to the container 705 through the mounting cap 702, and the lower edge portion thereof extends inwardly of the container.

In accordance with this embodiment, the cylinder 703 has a flange 709 taking a cylindrical shape with its upper and lower edge surfaces opened, wherein the lower portion is reducible in diameter at three stages, an outward flange 709 is protruded from the outer peripheral upper portion, and a flange-like valve seat 710 protruding inward downward in the inner lower edge portion. Also, a fitting cylindrical portion 711 for fitting a suction pipe is formed in the lower portion of the valve seat 710. The upper edge of a suction pipe (unillustrated) is attached to this fitting cylindrical portion 711, and a lower portion thereof extends downward in the container.

Further, an engagement member 712 for engaging the vertically movable member 704 in the push-down state is fixedly fitted to the upper edge thereof. The engagement member 712 is constructed such that the fitting cylindrical portion fitted via a rugged engagement element to the outer periphery of the upper edge of the cylinder 703 perpendicularly extends from a doughnut-like top plate, and an inner cylinder 712*a* fitted to the upper edge of the inner peripheral of the cylinder 703 extends perpendicularly from the inner peripheral edge of the top plate. An inner cylinder 712*a* and an upper edge inner surface of the cylinder 703 are prevented from being turned round by the engagement of vertical protrusions with each other, and a thread for helical fitting of the vertically movable member is formed along the inner periphery of the upper portion of the inner cylinder 712*a*.

Then, the outward flange 709 is placed via a packing 713 on the upper surface of the container neck portion 706 and is caught by a top wall 708 of the mounting cap 702 helically fitted to the outer periphery of the neck portion and by the upper surface of the container neck portion 706.

Also, the suction valve 714 is provided in the inner lower portion of the cylinder 703. This suction valve 714 is constructed of the valve seat 710 and a ball-like valve member 715 placed on the valve seat 710. Further, a plurality of engagement ribs 716 are formed in the peripheral direction along the peripheral wall of the valve seat 710, and the valve member 715 is engaged so that the valve member does not come off upward any more due to the protrusions formed on the inner side surface of the upper edges of the respective engagement ribs 716, thus regulating the vertical stroke.

The vertically movable member 704 includes a stem 717, an annular piston 718, a push-down head 720 with a nozzle 719 and a discharge valve 721.

The stem 717 with its lower edge surface closed is so provided as to be vertically movable biased state in the central portion within the cylinder 703 and includes a discharge valve 427 in the upper portion of the interior thereof. This discharge valve 721 is constructed such that a valve hole formed in the inner upper portion is clogged by a valve member vertically movable by the liquid pressure.

According to this embodiment, the stem 717 takes the cylindrical shape with the lower edge surface closed and has a flange 723 protruding outward from the lower edge of the outer periphery, and a vertically descending wall 724 extends vertically from the outer peripheral edge of the flange 723 with a gap from the cylinder inner surfaces Further, a plurality of protrusions 725 are protruded in the peripheral direction from the outer surface upper portion of the vertically descending wall 724. There is a slight gap between the outer peripheral surface of each protrusion 725 and the cylinder inner surface, and this functions to compensate a trajectory thereof if a lateral deflection is caused when the stem 717 moves up and down. Further, a bar-like protrusion 726 extends perpendicularly from the central portion of the rear surface of the stem bottom wall, and its lower edge extends down to the position of the upper edge of each engagement rib 716 of the cylinder 703, which functions to perform the push-down operation if the suction valve 715 is caught between the upper edge protrusions of the respective engagement ribs 716. Note the stem 717 is composed of the two members in this embodiment.

Moreover, a coil spring 727 is interposed between the lower surface of the flange 723 and an upward stepped portion formed on the inner surface of the cylinder 703 with respect to the upper edge surface portion of the engagement ribs 716, and the stem 717 is thereby always biased upward.

In the annular piston 718, the stem 717 is so fitted to the outer peripheral lower edge as to be vertically movable at the predetermined stroke, the outer peripheral edge thereof is slidably attached to the cylinder inner surface, and a through-hole 728 holed in the lower edge portion of the stem 717 is so provided as to be openable and closable.

In accordance with this embodiment, there is protruded an outside slide portion 718*b* taking a circular arc shape in section with its upper portion protruding outward from the outer peripheral surface of a cylindrical proximal portion 718*a*, and an upward skirt-like inside slide portion 718*c* ascending obliquely is protruded from the inner peripheral surface of the proximal portion 718*a*, thus constituting the annular piston 718. On the other hand, a downward stepped portion 729 is formed in a predetermined position above the outward flange 723 along the outer periphery of the stem 717, a through-hole 728 is formed in the stem peripheral wall between the stepped portion 729 and the outward flange 723.

Then, the outside slide portion 718*b* is liquid-tightly slidably fitted to the inner surface of the cylinder 703, and the inside slide portion is liquid-tightly slidably fitted to the outer periphery of the stem 717. Further, there is vertically movably fitted to the stem 717 at the predetermined stroke from a position where the upper surface of the proximal portion 718*a* impinges on the lower surface of the stepped portion 729 to a position where the lower surface of the proximal portion 718*a* impinges on the upper surface of the flange 723.

According to the present invention, this annular position 718 is so constructed as to be always biased upward with respect to the stem 717, and the through-hole 728 is closable only in the maximum ascent position of the stem.

In accordance with this embodiment, the coil spring 730 is interposed between the upper surface of each protrusion 725 of the stem 717 and the lower joint surface of the outside slide portion 718*b* to the proximal portion 718*a* in the annular piston 718, whereby the upper surface of the proximal portion 718*a* always impinges on the lower surface of the stepped portion 729. Accordingly, the interior of the cylinder communicates via the through-hole 728 with the interior of the stem at all times. Further, this coil spring 730 is selected to have a resilient force smaller than the coil spring 727 for biasing upward the stem 717. When the stem 717 is pushed upward, the upper edge of the proximal portion 718*a* of the annular piston 718 impinges and engages with the lower surface of the inner cylinder 712*a* of the engagement member 712. On the other hand, the stem 717 is raised up to a position where the lower surface of the proximal portion 718*a* closely contacts the upper surface of the flange 723 and is then engaged therewith. Accordingly, the through-hole 728 is closed in the stem maximum ascent position.

Note that the numeral 737 represents a though-hole, formed in the cylinder, for taking in the outside air, the outside air is taken into the container negative-pressurized via this through-hole 737 from between the stem 717 and the inner cylinder 712*a* when the vertically movable member rises, and it is shut off by the annular piston when the stem is in the maximum ascent position.

The push-down head 720 is so provided in continuation from the upper edge of the stem 717 as to be vertically movable above the mounting cap 702. In accordance with this embodiment, the push-down head 720 includes a cylindrical casing 731 with an opening formed in the lower edge surface and a peripheral wall perpendicularly extending from the peripheral edge of the top wall, and a lower portion of a vertical cylinder 732 vertically extending from the center of the top wall lower surface of the casing 731 is attached to the outer peripheral upper edge of the stem 717, thus fixing it to the stem 717. Further, a horizontal cylinder 733 with its proximal portion opened to the upper front surface of the vertical cylinder 732 penetrates the casing peripheral wall and protrudes forward therefrom, thus forming this horizontal cylinder 733 as a nozzle 719. The nozzle 719 is constructed so that its proximal portion ascends obliquely forward, while its tip descends obliquely. With this construction, the liquid dropping can be prevented moire surely.

Furthermore, a thread formed along the outer periphery of the vertical cylinder 732 with respect to a portion protruding downward from the casing 731 meshes with the thread of the engagement member 712 when pushing down the vertically movable member 704 and is thus made possible of engagement therewith in the state where the vertically movable member 704 is pushed down. Also, on this occasion, the construction is such that the outer surface of the vertically descending wall 724 protruding from the stem 717 is liquid-tightly fitted to the inner surface of a reducible diameter portion formed at the lower portion of the cylinder peripheral wall. Further, the outer peripheral lower edge of the vertically cylinder 732 is liquid-tightly fitted to the inner periphery of a downward skirt-like annular protruded piece 734 provided on the inner surface of an inner cylinder 712*a* of the engagement member 712.

In the discharge valve 721, the valve member 722 for closing the valve hole formed in the inner upper portion of the stem 717 is so provided as to be vertically movable by the liquid pressure.

In accordance with this embodiment, a flange-like valve seat 735 descending inward obliquely is protruded at the upper portion within the stem 717, and then a valve hole is formed in the central portion thereof. A ball-like valve member 722 is placed on the valve seat 735 to clog the valve hole, thus constituting the discharge valve 721. Further, the valve member 722 is so formed as to be vertically movable up to a position where it impinges on the lower surface of an engagement plate 736 extending perpendicularly from the top wall of the casing 731.

The pump according to the present invention is utilized for jetting the liquid exhibiting the high viscosity on the order of, e.g., 500 cps–15000 cps. When using the high viscosity liquid as described above, it hardly happens that the discharge valve member 722 pushed up by the liquid pressure immediately drops down to the valve seat 735 by a self-weight thereof. The discharge valve member vertically moves substantially along the flow of liquid, although slightly different depending on the liquid viscosity and a weight of the valve member. Accordingly, there is seen no remarkable error between a flow rate of the liquid and a moving velocity of the valve member.

Further, in accordance with this embodiment, let Va be the volumetric capacity of the nozzle 719, let Vb be the volumetric capacity of a liquid passageway where the discharge valve member 722 is vertically movable, and let Vc be the volume of the discharge valve member 722, wherein the vertical stroke of the discharge valve member 722 is regulated so that Vb−Vc is equal to or larger than Va. An actual vertical stroke of the discharge valve member 722 based on this regulation is, though different depending on the length and inside diameter of the nozzle and the inside diameter of the stem 717, on the order of 5 mm–30 mm larger than in the conventional pump constructed by putting the ball valve on the valve seat. In particular, the actual vertical stroke thereof is preferably 10 mm or above.

Then, when the vertically movable member 704 is raised after pouring the liquid by pushing down the vertically movable member 704, the liquid in the stem 717 flows back via the through-hole 728 into the cylinder 703 negative-pressurized. Further, the liquid in the passageway where the discharge valve member 722 flows back into the stem 717, and, besides, the liquid in the nozzle 719 flows back into the above passageway. On this occasion, if Vb−Vc is equal to or larger than Va, the liquid in the nozzle flows back substantially into the above passageway.

It is to be noted that the respective members are properly selectively composed of synthetic resins, metals and materials such as particularly elastomer exhibiting an elasticity.

As discussed above, the pump according to the present invention is constructed so that the annular piston is always biased upward with respect to the stem, and the through-hole is closable only in the stem maximum ascent position. Hence, when using the pump of the present invention for discharging the liquid exhibiting the viscosity, the intra stem liquid flows back into the cylinder via the through-hole till the discharge valve is closed when the head is raised after jetting the liquid by pushing down the push-down head. Correspondingly, the liquid in the passageway where the discharge valve member moves up and down flows back into the stem, and further the intra nozzle liquid flows back into the above passageway. Hence it is possible to obviate the liquid dropping out of the nozzle tip and prevent the liquid dry-solidification as much as possible.

Besides, as in the prior art, the through-hole is clogged by the annular piston in the maximum ascent position even when the container in use is turned over carelessly, the pump has such an effect that the liquid leakage from the nozzle tip can be prevented as much as possible.

Further, the pump exhibits such advantages that the pump can be constructed by modifying a part of structure of this kind of conventional pump and is therefore easily manufactured at a low cost.

Moreover, let Va be the volumetric capacity of the nozzle, let Vb be the volumetric capacity of the liquid passageway where the discharge valve member is vertically movable, and let Vc be the volume of the discharge valve member, wherein the vertical stroke of the discharge valve member is regulated so that Vb−Vc is equal to or larger than Va. With this arrangement, substantially the whole amount of liquid in the nozzle blows back into the passageway where the discharge valve member moves up and down, and it is therefore possible to prevent the liquid dropping and the liquid dry-solidification more preferably.

Other embodiment of the present invention will hereinafter be described with reference to the drawings.

FIGS. 47 to 57 illustrate other embodiment of the present invention, wherein the numeral 801 designates a liquid jet pump. The pump 801 includes a mounting cap 802, a cylinder 803 and a vertically movable member 804.

The mounting cap 802 serves to fix the cylinder 803 to a container 805 and is constructed such that an inward flange-like top wall 808 extends from an upper edge of a peripheral wall 807 helically-fitted to an outer periphery of a container cap fitted neck portion 806.

The cylinder 803 is fixed to the container 805 through the mounting cap 802, and the lower edge portion thereof extends inwardly of the container.

In accordance with this embodiment, the cylinder 803 has a flange 709 taking a cylindrical shape with its upper and lower edge surfaces opened, wherein the lower portion is reducible in diameter at two stages, an outward flange 809 is protruded from the outer peripheral upper portion, an inward flange-like bottom portion 810 extends toward the inner lower edge, and a valve hole is holed in the central portion thereof. Also, a fitting cylindrical portion 811 for fitting a suction pipe is formed in the lower portion of the bottom wall 810. The upper edge of a suction pipe (unillustrated) is attached to this fitting cylindrical portion 811, and a lower portion thereof extends downward in the container.

Further, an engagement member 812 for engaging the vertically movable member 804 in the push-down state is fixedly fitted to the upper edge thereof. The engagement member 812 is constructed such that the fitting cylindrical portion fitted via a rugged engagement element to the outer periphery of the upper edge of the cylinder 803 perpendicularly extends from a doughnut-like top plate, and an inner cylinder 812*a* fitted to the upper edge of the inner peripheral of the cylinder 803 extends perpendicularly from the inner peripheral edge of the top plate. An inner cylinder 812*a* and an upper edge inner surface of the cylinder 803 are prevented from being turned round by the engagement of vertical protrusions with each other, and a thread for helical fitting of the vertically movable member is formed along the inner periphery of the upper portion of the inner cylinder 812*a*.

Then, the outward flange 809 is placed via a packing 813 on the upper surface of the container neck portion 806, the mounting cap 802 is helically fitted to the outer periphery of the neck portion, and the flange 809 is caught by the top wall 808 and by the upper surface of the container neck portion 806.

Also, the suction valve 814 is provided in the inner lower portion of the cylinder 803. This suction valve 814 is constructed such that a valve plate 815 for clogging the upper surface of a valve hole holed in the bottom portion 810 is so integrally supported as to be vertically movable by a plurality of bar-like elastic portions 817 protruding from the inner surface of a cylindrical proximal portion 816 fixedly fitted to the inner lower edge of the cylinder 803.

Figure 48:
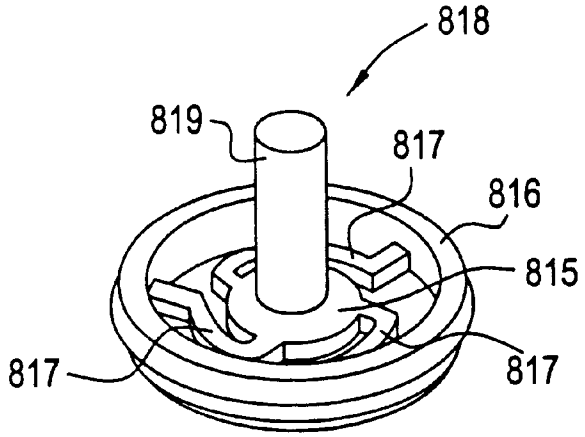
FIG. 48 is a perspective view showing the suction valve member in the same embodiment.

In accordance with this embodiment, as illustrated in FIG. 48, a suction valve member 818 is prepared. The suction valve member 818 includes three pieces of bar-like elastic portions 817 disposed at equal intervals. The elastic portion 817 extends toward the center from the lower portion of the inner surface of a short cylindrical proximal portion 816 and then extends in a circular arc shape along the inner surface of the proximal portion. The elastic portions 817 further extend toward the center, and the tips thereof are connected integrally to the outer surface of a disk-like valve plate 815. The cylindrical proximal portion 816 of the valve member 818 is fixedly fitted to the lower edge of the periphery wall of the cylinder, and the valve hole upper surface is liquid-tightly closed by the valve plate 815. Further, in this embodiment, a circular cylindrical bar-like portion 819 is protruded integrally from the upper surface of the valve plate 815 so as to contact support the valve plate lower surface of a non-return valve which will be mentioned later.

The vertically movable member 804 includes a stem 820, an annular piston 821, a push-down head 823 with a nozzle 822 and a discharge valve 824.

The stem 820 is so provided as to be vertically movable in the upward biased state in the central portion within the cylinder 803 and includes a discharge valve 824 in the upper portion of the interior thereof and a non-return valve 825 in the lower edge portion. This discharge valve 824 is constructed such that a valve hole formed in the stem inner upper portion is clogged by a valve member 826 vertically movable by the liquid pressure.

According to this embodiment, the stem 820 takes the cylindrical shape with the lower edge surface closed by the non-return valve 825 and has a flange 827 protruding outward from the lower portion of the outer periphery, and a vertically descending wall 828 extends vertically from the outer peripheral edge of the flange 827 with a gap from the cylinder inner surface. Further, a plurality of plate-like protrusions 829 are protruded in the peripheral direction from the outer surface upper portion of the vertically descending wall 828. There is a slight gap between the outer peripheral surface of each protrusion 829 and the cylinder inner surface, and this functions to compensate a trajectory thereof if a lateral deflection is caused when the stem 820 moves up and down. Note the stem 820 is composed of the two members in this embodiment.

Moreover, a coil spring 830 is interposed between the lower surface of the flange 827 and the upper surface of the cylindrical proximal portion 816, thus biasing the stem 820 upward at all times.

The non-return valve 825 serves to provide a one-way flow into the cylinder 803 from within the stem 820 and is provided in the lower edge portion of the stem 820.

Figure 49:
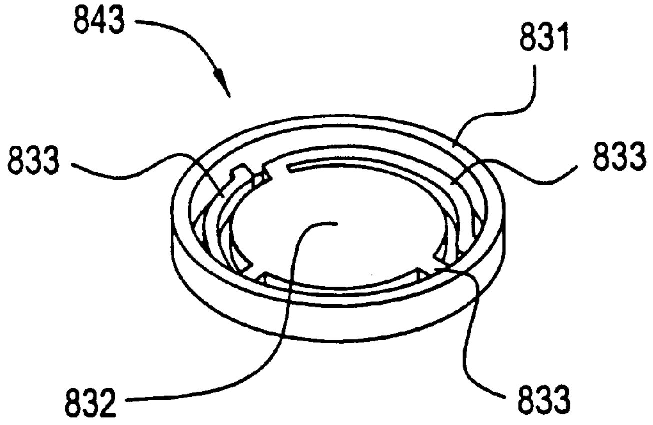
FIG. 49 is a perspective view showing a non-return valve in the same embodiment.
Figure 50:
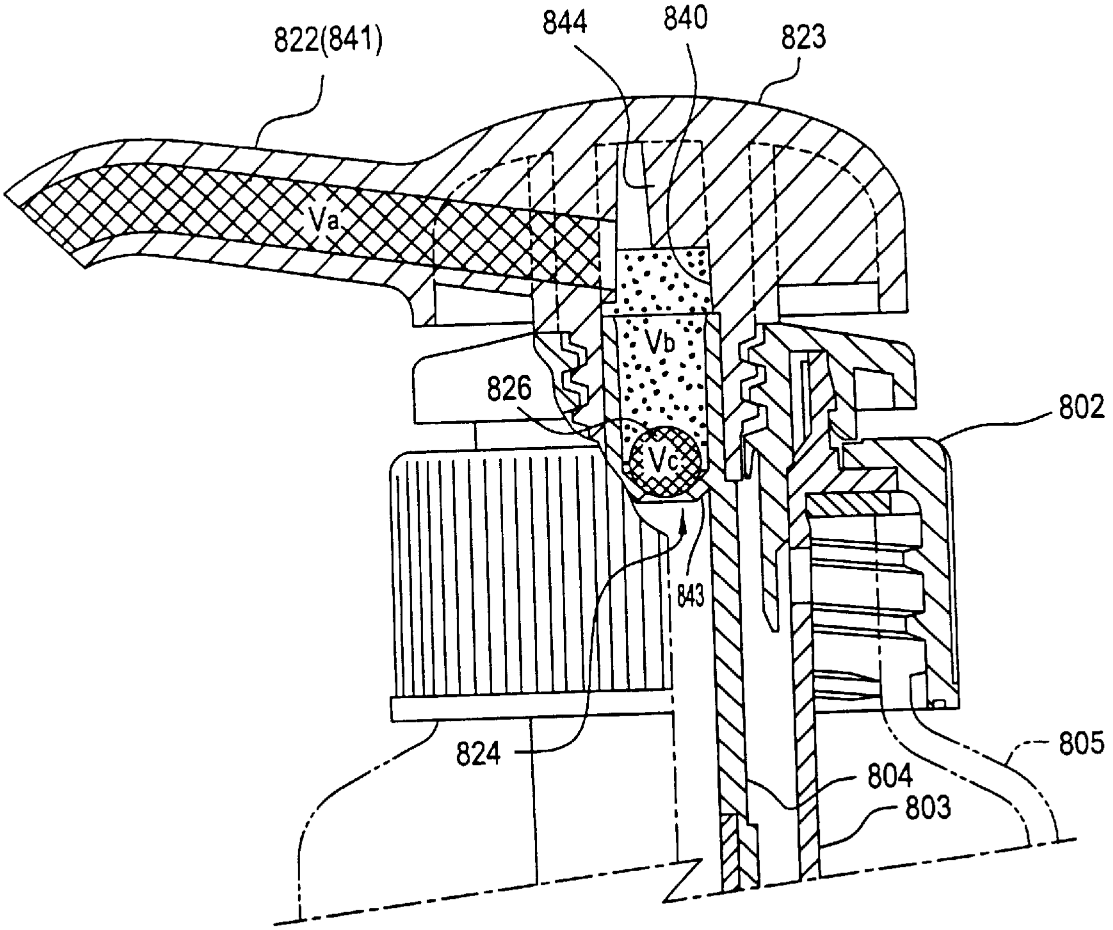
FIG. 50 is an explanatory view showing the push-down head in the same embodiment.
Figure 51:
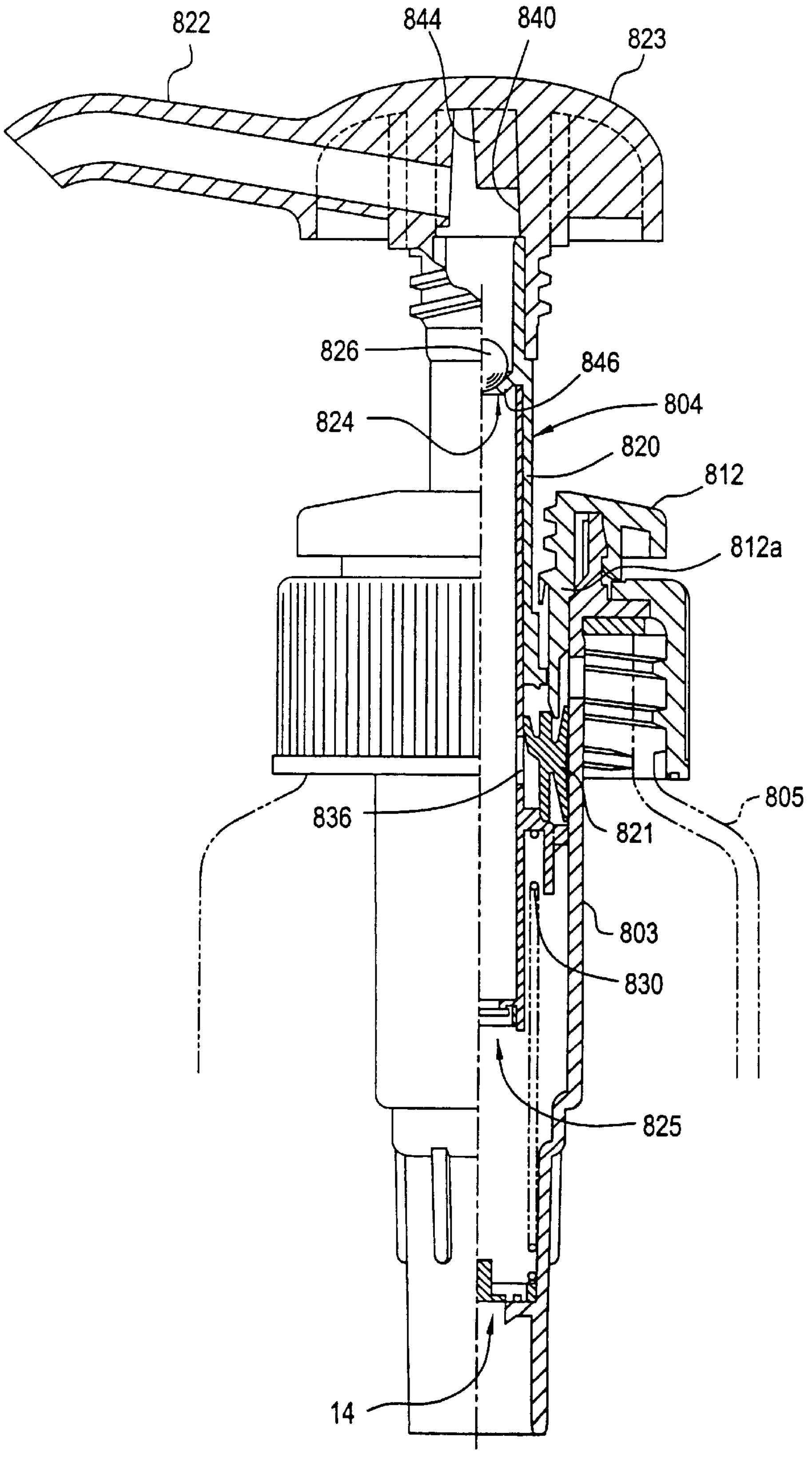
FIG. 51 is an explanatory sectional view in the head maximum ascent position in the same position.
Figure 52:
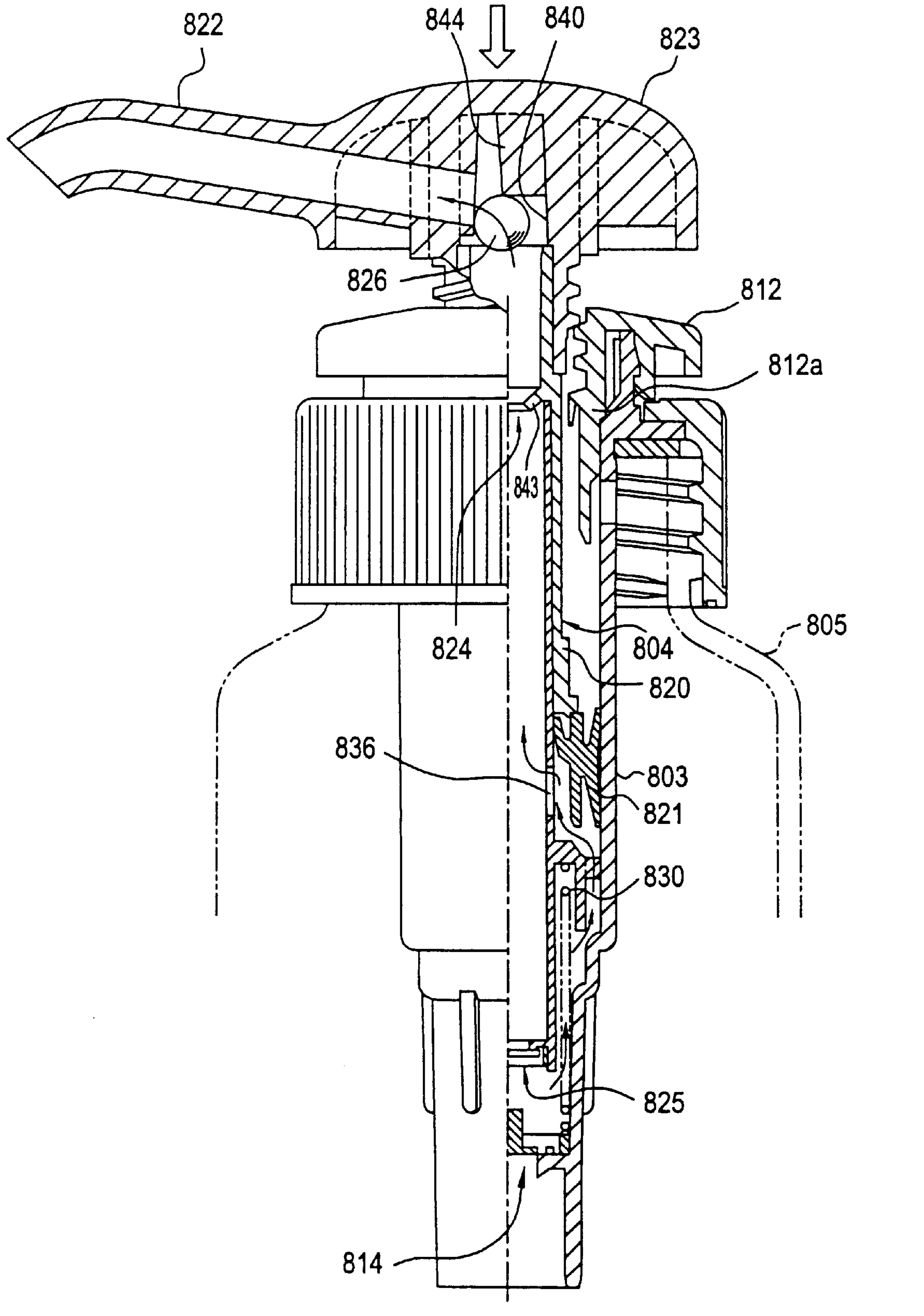
FIG. 52 is an explanatory sectional view when pushing down the head in the same embodiment.
Figure 53:
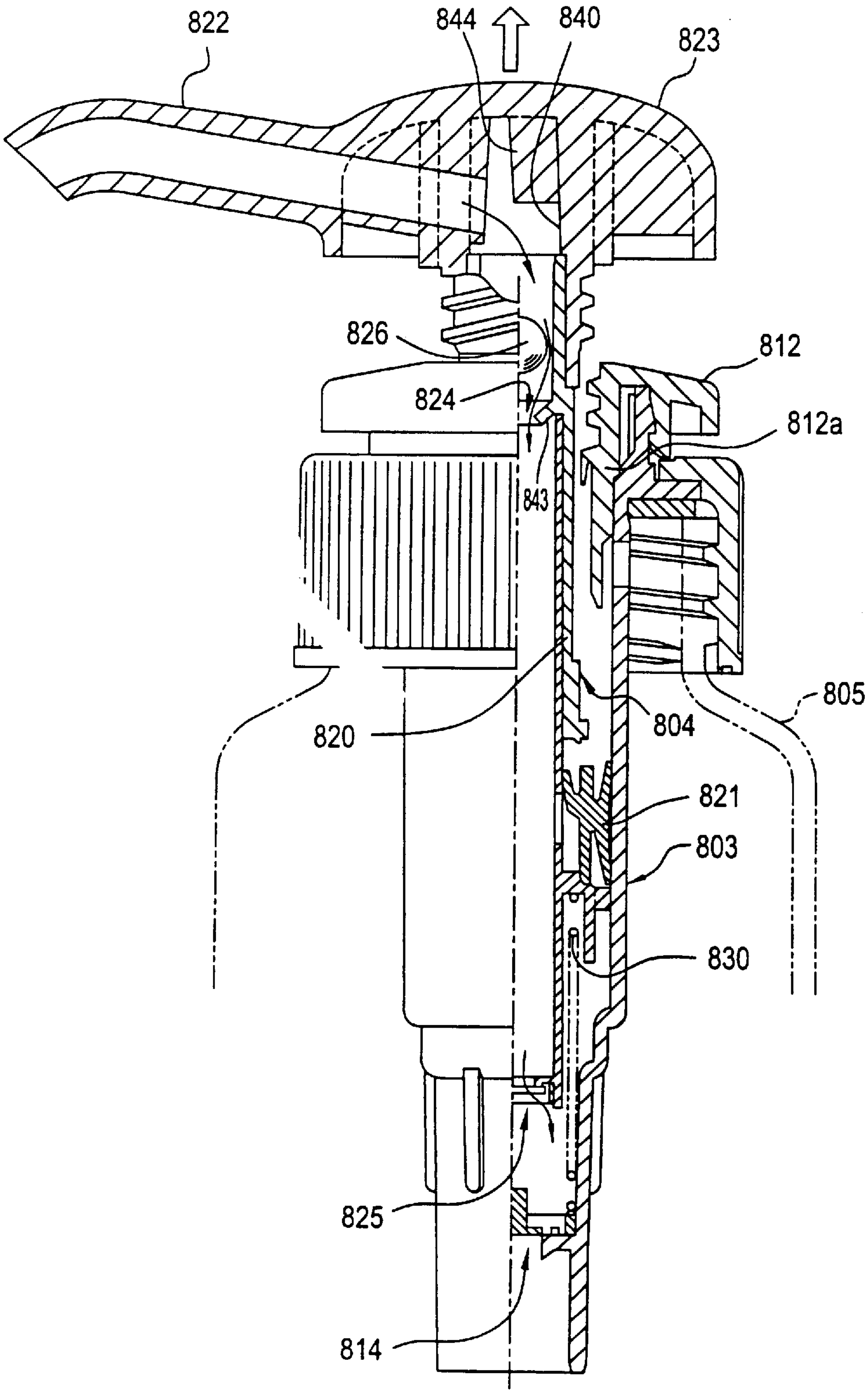
FIG. 53 is an explanatory sectional view when the head rises in the same embodiment.
Figure 54:
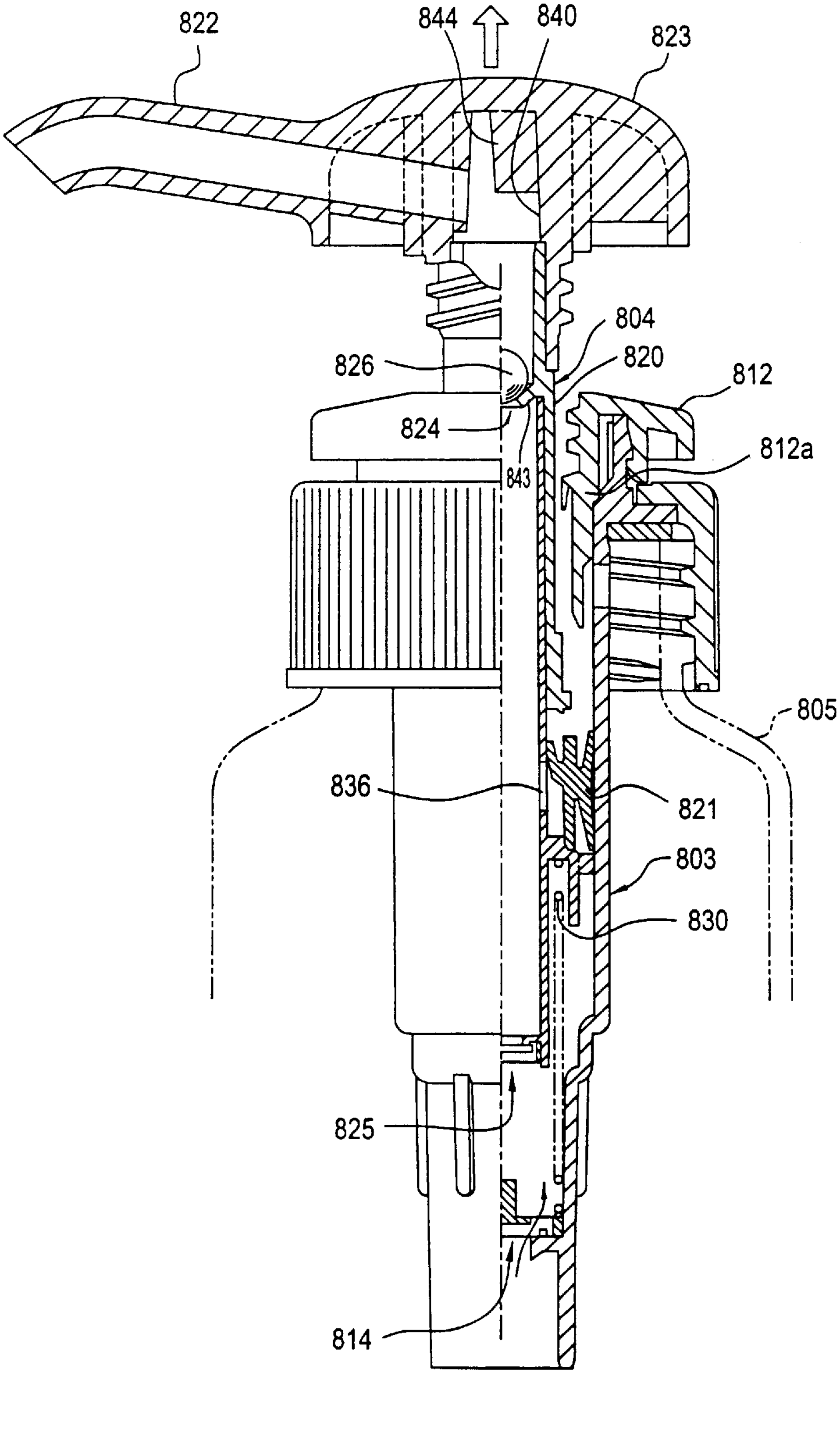
FIG. 54 is an explanatory sectional view when the head further rises in the same embodiment.

In accordance with this embodiment, as illustrated in FIG. 49, a suction valve member 834 is prepared. The suction valve member 834 includes three pieces of bar-like elastic portions 833 disposed at equal intervals. The elastic portion 833 extends toward the center from the central portion in the up-and-down directions of the inner surface of a short cylindrical proximal portion 831 and then extends in a circular arc shape along the inner surface of the proximal portion 831. The elastic portions 833 further extend toward the center, and the tips thereof are connected integrally to the outer, surface of a disk-like valve plate 832 at the center of the proximal portion. On the other hand, a bottom portion 835 extends in the lower edge portion of the stem 820, and short cylindrical valve hole is formed extending downward at the central portion thereof. Further, the peripheral wall under the bottom wall 835 is formed as a fitting cylindrical portion. Then, a cylindrical proximal portion 831 of the above valve member 834 is fixedly fitted to the inner surface of the fitting cylindrical portion, and the valve lower surface is liquid-tightly closed by the valve plate 8322, thus constituting the non-return valve 825.

Note that this non-return valve 825 is constructed by, e.g., a method of thinly forming each bar-like elastic portion 833, etc. so that the valve 825 is opened by a force smaller than in the above suction valve 814.

The annular piston 821 is so fitted to the lower portion of the outer periphery of the stem 820 as to be vertically movable at a predetermined stroke, the outer peripheral edge thereof is slidably attached to the inner surface of the cylinder, and a through-hole 836 formed in the lower portion of the stem peripheral wall is so provided as to be openable and closable.

In accordance with this embodiment, there is protruded an outside slide portion **821*b* taking a circular arc shape in section with its upper portion protruding outward from the outer peripheral surface of a cylindrical proximal portion 821*a*, and an upward skirt-like inside slide portion 821*c* ascending obliquely is protruded from the inner peripheral surface of the proximal portion 821*a*, thus constituting the annular piston 821. On the other hand, a downward stepped portion 837 is formed in a predetermined position above the outward flange 827 along the outer periphery of the stem 820, and a through-hole 836 is formed in the stem peripheral wall portion between the stepped portion 837 and the outward flange 827**.

The outside slide portion **821*b* is liquid-tightly slidably fitted to the inner surface of the cylinder 803, and the inside slide portion 821*c* is liquid-tightly slidably fitted to the outer periphery of the stem 820. Further, there is vertically movably fitted to the stem 820 at the predetermined stroke from a position where the upper surface of the proximal portion 821*a* impinges on the lower surface of the stepped portion 837 to a position where the lower surface of the proximal portion 821*a* impinges on the upper surface of the flange 827. Also, when the vertically movable member 804 is pushed down, the annular piston 821 relatively rises with respect to the stem 820, and the through-hole 836 is opened, with the result that the interior of the cylinder 803 communicates with the interior of the stem 820. On the other hand, when the vertically movable member 804 is raised, the annular piston 821 relatively descends, ad the through-hole 836** is closed.

Further, the annular piston 821 functions to shut off the through-hole 838, formed in the cylinder 803, for taking in the outside air in the maximum ascent position thereof. The through-hole 838 is formed in the upper portion of the cylinder peripheral wall. When the vertically movable member 804 is raised, the outside air is taken into the container negative-pressurized via the through-hole 838 from between the stem 820 and the inner cylinder **812*a*. If the stem 820 is in the maximum ascent position, the upper edge of the proximal portion 821*a* of the annular piston 821 contacts air-tightly the lower edge of the inner cylinder 812*a***, thus shutting off the interior and exterior of the container.

The push-down head 823 is formed in continuation from the upper edge of the stem 820 so that the upper portion of the mounting cap 802 is movable up and down. In accordance with this embodiment, the push-down head 823 includes a cylindrical casing 839 having its peripheral wall extending perpendicularly from the top wall peripheral edge and its lower edge surface opened. The lower edge of a vertical cylinder 840 perpendicularly extending from the lower surface central portion of the top wall of the casing 839 is attached to the outer peripheral upper edge of the stem 820, thus fixing it to the stem 820. Further, a horizontal cylinder 841 with its proximal portion opened to the front surface of the upper portion of the vertical cylinder 840 penetrates the casing peripheral wall and thus protrudes forward. This horizontal cylinder 841 is constructed as a nozzle 822. The nozzle 822 is constructed so that the proximal portion thereof ascends forward obliquely while its tip descends obliquely. With this construction, it is possible to prevent the liquid from dropping.

Moreover, a thread formed along the outer periphery of the vertical cylinder 840 with respect to the portion protruding downward from the casing 839 meshes with the thread of the engagement member 812 when pushing down the vertically movable member 804 and is thus made possible of engagement therewith in the state where the vertically movable member 804 is pushed down. On this occasion, the outer surface of the vertically descending wall 828 protruding from the stem 820 is light-tightly fitted to the inner surface of the reducible diameter portion provided at the lower portion of the cylinder peripheral wall. Further, the outer peripheral lower edge of the vertical cylinder 840 is liquid-tightly fitted to the inner periphery of a downward skirt-like annular protruded piece 842 provided on the inner surface of the inner cylinder **812*a* of the engagement member 812, and further the upper surface of the bar-like portion 819 impinges on the lower surface of the valve plate 832 of the no-return valve 825**.

The discharge valve 824 has a valve member 826 clogging a valve hole holed in the inner upper portion of the stem 820 so that the valve member 826 is vertically movable by the liquid pressure.

In accordance with this embodiment, a flange-like valve seat 843 descending inward obliquely is protruded from the inner upper portion of the stem 820, a valve hole is formed in the central portion thereof but is closed by placing a ball-like valve member 826 on the valve seat 843, thus constituting a discharge valve 824. Further, the valve member 826 is so constructed as to be vertically movable up to a position where it impinges on the lower surface of the engagement plate 844 extending perpendicularly from the top wall of the casing 839.

The pump according to the present invention is utilized for jetting the liquid exhibiting the high viscosity on the order of, e.g., 500 cps–15000 cps. When using the high viscosity liquid as described above, it hardly happens that the discharge valve member 826 pushed up by the liquid pressure immediately drops down to the valve seat 843 by a self-weight thereof. The discharge valve member 826 vertically moves substantially along the flow of liquid, although slightly different depending on the liquid viscosity and a weight of the valve member. Accordingly, there is seen no remarkable error between a flow rate of the liquid and a moving velocity of the valve member.

Further, in accordance with this embodiment, let Va be the volumetric capacity of the nozzle 822, let Vb be the volumetric capacity of a liquid passageway where the discharge valve member 826 is vertically movable, and let Vc be the volume of the discharge valve member 826, wherein the vertical stroke of the discharge valve member 826 is regulated so that Vb−Vc is equal to or larger than Va. An actual vertical stroke of the discharge valve member 826 based on this regulation is, though different depending on the length and inside diameter of the nozzle and the inside diameter of the stem 820, on the order of 5 mm–30 mm larger than in the conventional pump constructed by putting the ball valve on the valve seat. More preferably, the actual vertical stroke thereof is 10 mm or above.

Then, after the liquid has been poured by pushing down the vertically movable member 804, the vertically movable member 804 is raised, and, at this time, upon opening the non-return valve 825 the liquid in the stem 820 flows back into the cylinder 803 negative-pressurized. Further, the liquid in the passageway where the discharge valve member 826 moves up and down flows back into the stem 820 disposed upstream of the discharge valve 824, and the liquid within the nozzle 822 flows back into the above passageway. On this occasion, if Vb−Vc is equal to or larger than Va, the liquid in the nozzle flows back substantially into the vertical cylinder.

Figure 55:
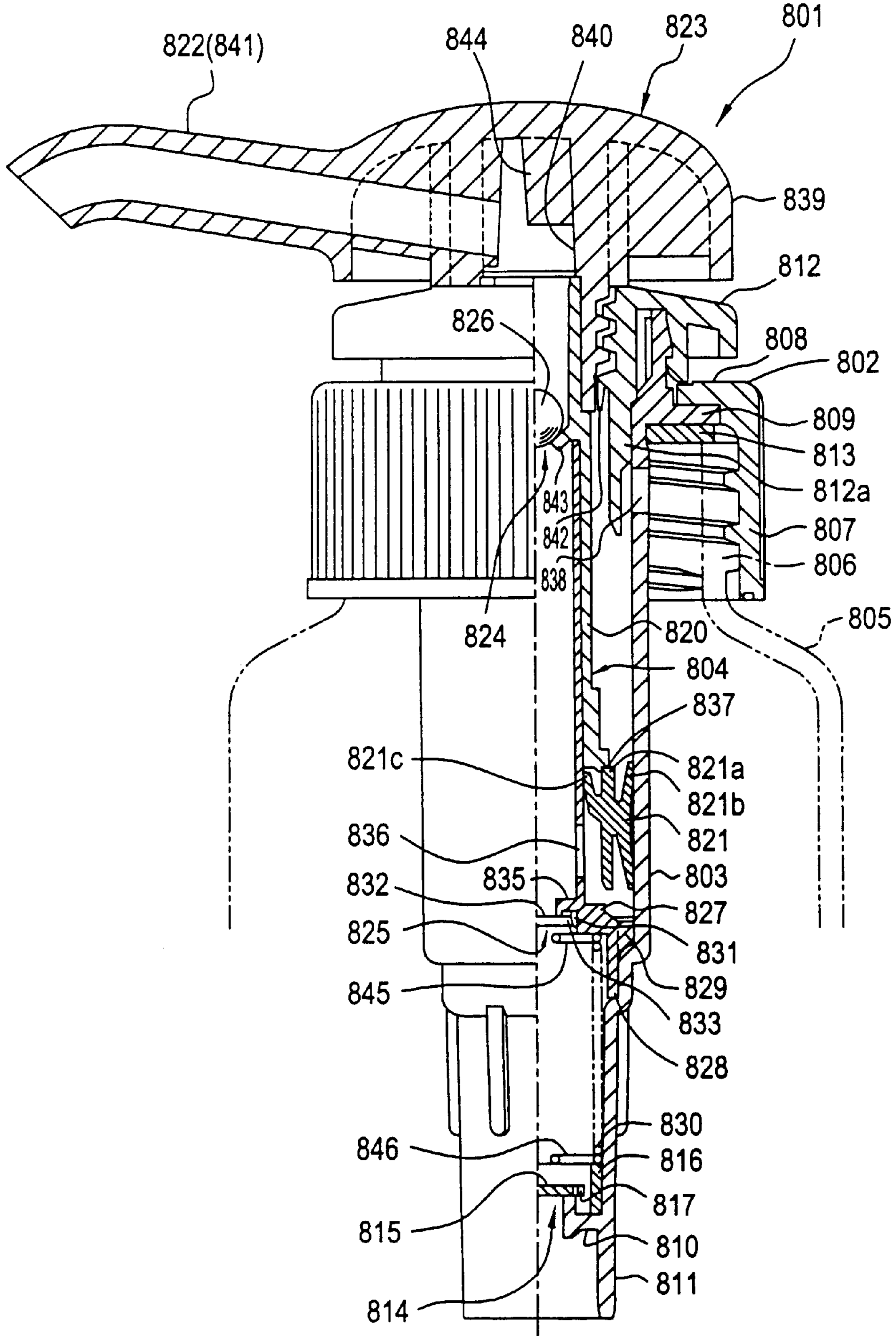
FIG. 55 is a sectional view showing other embodiment of the present invention.
Figure 56:
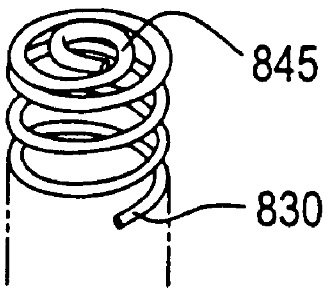
FIG. 56 is a perspective view showing a part of coil spring in the same embodiment.
Figure 57:
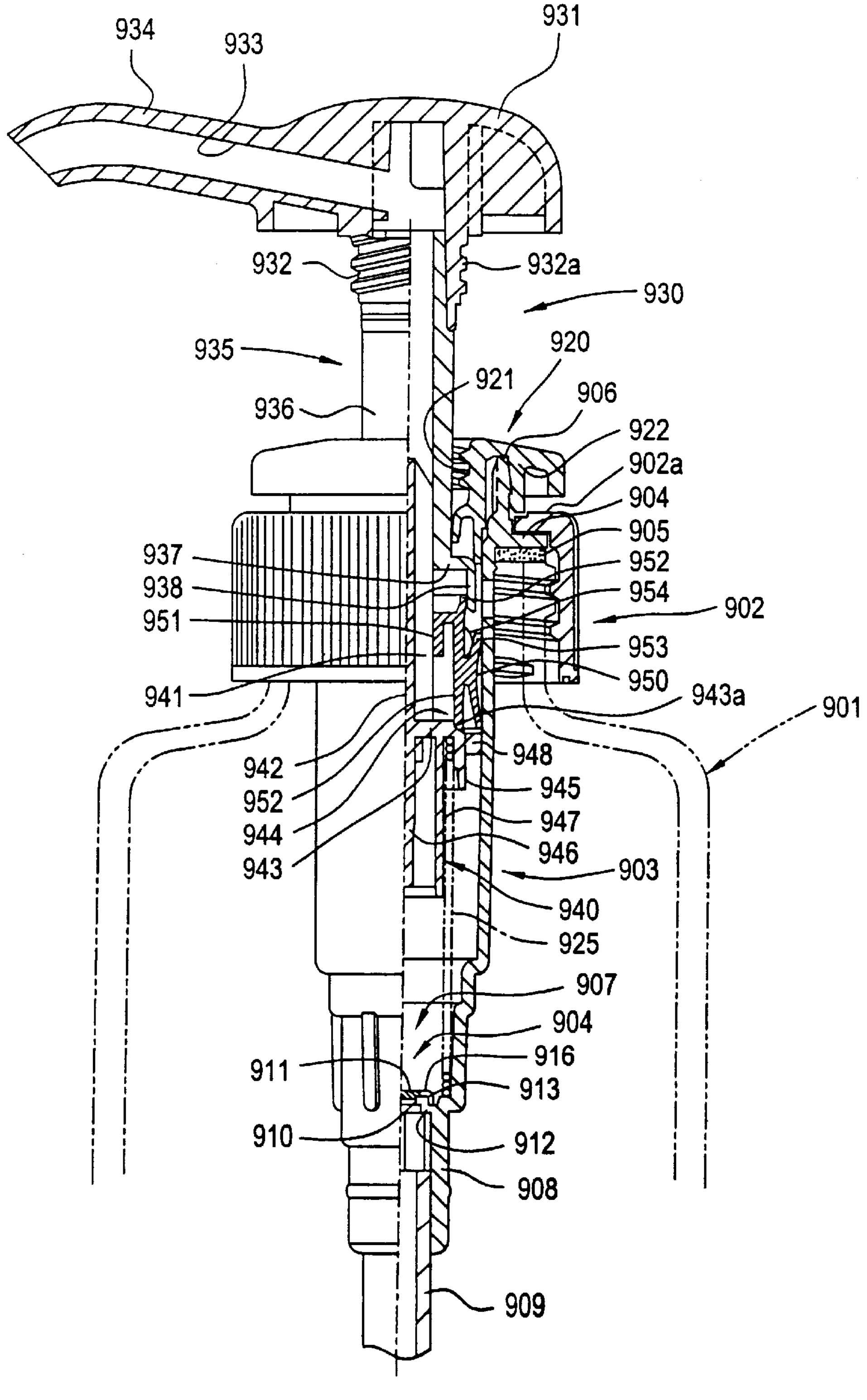
FIG. 57 is a half-sectional view of a container according to the present invention.
Figure 58:
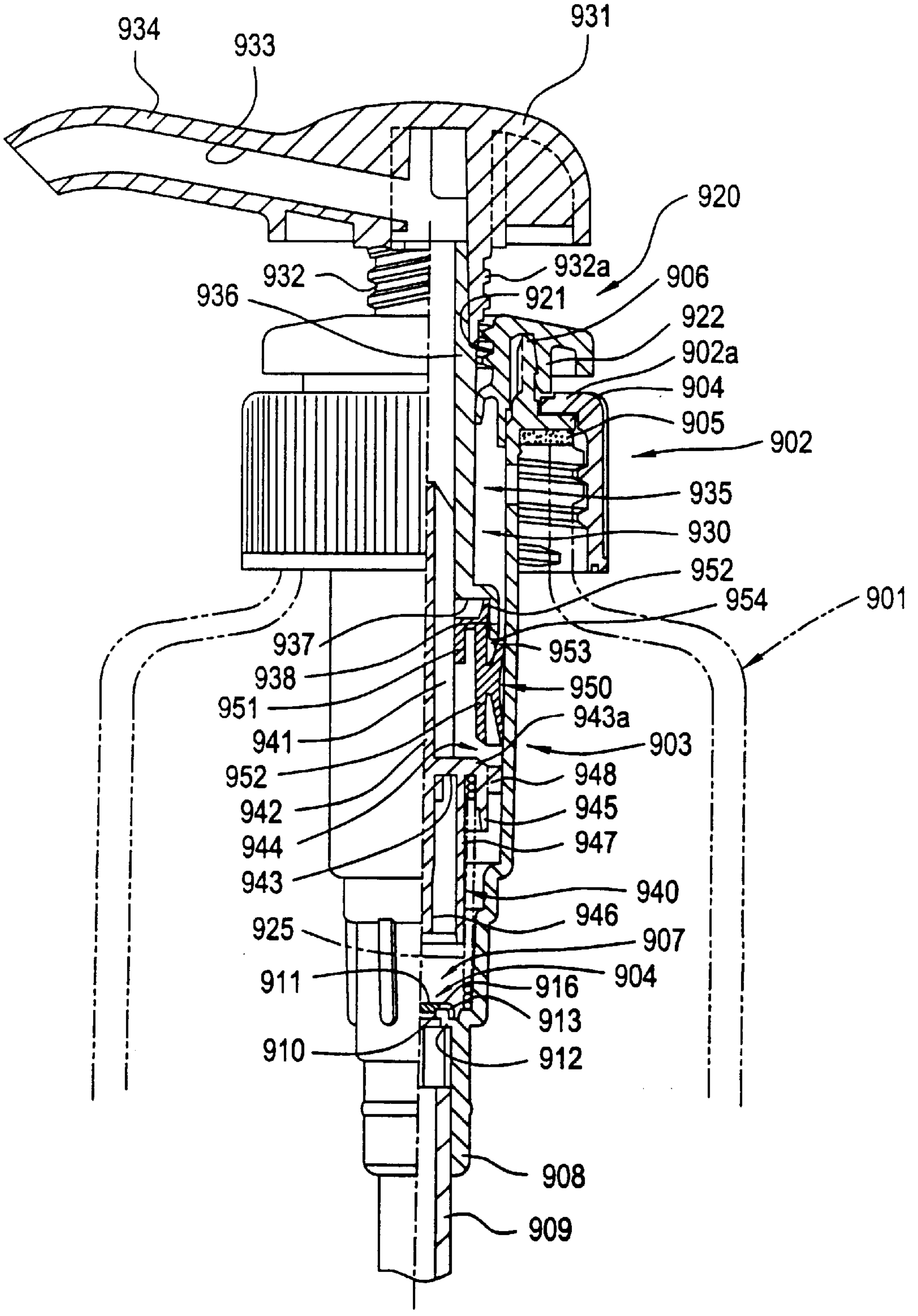
FIG. 58 is a half-sectional view showing a state where the operating member is pushed down.
Figure 59:
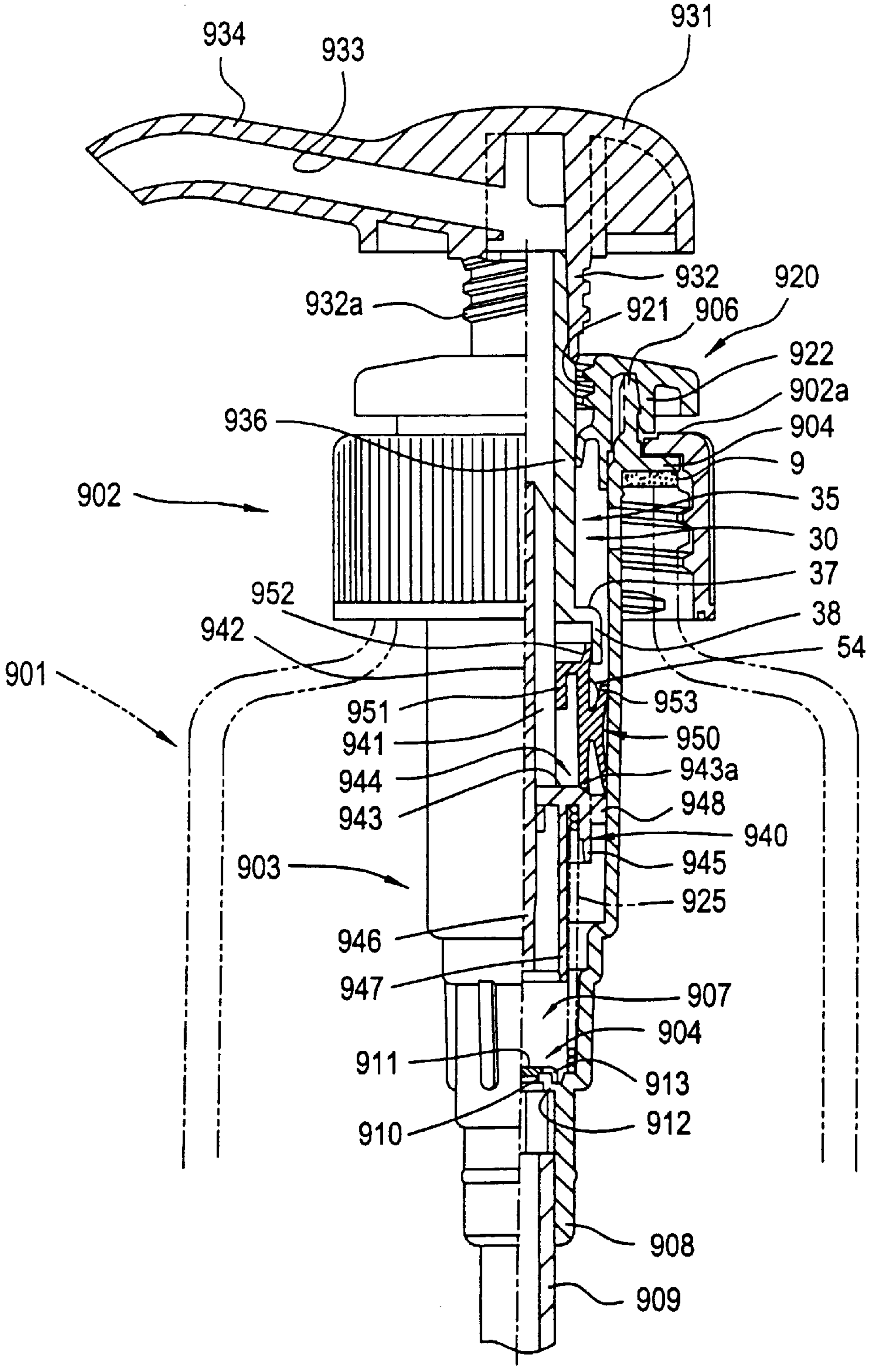
FIG. 59 is a half-sectional view showing a state where the operating member slightly rises from the state of FIG. 58.

FIGS. 55 and 56 illustrate other embodiment of the present invention, wherein engagement protrusions 845, 846 for regulating the vertical strokes of the respective valve plates are protruded in a predetermined position under a non-return valve plate 833 and in a predetermined position above a suction valve plate 815.

In accordance with this embodiment, as illustrated in FIG. 56, a horizontal spiral upper edge of a coil spring interposed between the stem 820 and the cylindrical proximal portion 816 of the suction valve member 818 is protruded in a lower position spaced at a predetermined interval from the non-return valve plate 832, and this portion is formed as the engagement protrusion 845. Further, a horizontal spiral lower edge of the coil spring is protruded in an upper position spaced at a predetermined interval from the suction valve plate 815, and this portion is formed as the engagement protrusion 846.

Further, in accordance with this embodiment, there is no bar-like portion on the upper surface of the suction valve plate 815, and there is used the suction valve member 818 taking the same configuration as the non-return valve member 834. Also, the non-return valve 825 is so constructed as to pen by a smaller force than in the suction valve 814 as in the above-discussed embodiment.

Note that the respective members are properly selectively composed of synthetic resins, metals and materials such as particularly elastomer exhibiting an elasticity.

As explained above, the pump according to the present invention includes the discharge valve in which the valve hole formed in the inner upper portion of the stem is closed by the valve member vertically movable by the liquid pressure, and the non-return valve for permitting the one-sides flow into the cylinder from within the stem is provided at the lower edge portion of the stem. Hence, if the pump according to the present invention is utilized for jetting the liquid having the viscosity, the intra stem liquid flows back into the cylinder via the non-return valve till the discharge valve is closed when the head rises after jetting the liquid by pushing down the push-down head, and, on this occasion, correspondingly the liquid in the passageway where the discharge valve member moves up and down flows back into the stem. Further in the nozzle flows back into the passageway, and, therefore, it is possible to obviate the liquid dropping out of the nozzle tip and prevent the liquid dry-solidification as much as possible.

Besides, as in the prior art, the through-hole is clogged by the annular piston even when the container in use is turned over carelessly, the pump has such an effect that the liquid leakage from the nozzle tip can be prevented as much as possible.

Further, the pump exhibits such advantages that the pump can be constructed by modifying a slight part of structure of the conventional pump and is therefore easily manufactured at a low cost.

Moreover, let Va be the volumetric capacity of the nozzle, let Vb be the volumetric capacity of the liquid passageway where the discharge valve member is vertically movable, and let Vc be the volume of the discharge valve member, wherein the vertical stroke of the discharge valve member is regulated so that Vb−Vc is equal to or larger than Va. With this arrangement, substantially the whole amount of liquid in the nozzle blows back into the passageway where the discharge valve member moves up and down, and it is therefore possible to prevent the liquid dropping and the liquid dry-solidification more preferably.

In addition, it is possible to prevent the suction valve from opening till the discharge valve is closed. As a result, the backflow of the predetermined amount of liquid within the stem can be performed more certainly, and it is also feasible to prevent the liquid leakage and the liquid dry-solidification more surely.

Furthermore, the respective valve plates of the non-return valve and the suction valve are prevented from unnecessarily moving up and down, thereby enhancing the durabilities of the non-return valve member and the suction valve member.

An embodiment of the present invention will be explained in terms of a third characteristic thereof.

A container generally designated by 901 has a neck portion erected.

A mounting cylinder 902 is helically fitted to the outer surface of the neck portion, and an inward flange **902*a*** is attached to the upper edge of the mounting cylinder.

A cylinder 903 extends vertically into the container, and an outward flange 904 attached to the upper edge of the cylinder is fitted to the inner surface of the upper edge of the mounting cylinder through an engagement with the lower surface of the inward flange **902*a*, and it is thus placed on the mouth top surface of the container through a packing 905. Then, it is caught by the mouth top surface and the inward flange of the mounting cylinder. A spiral tube fitting cylinder 906 erects from the inner peripheral portion of the outward flange 904, and a suction valve 907 is provided on the inner surface of the cylinder bottom portion. Then, the suction pipe 909 extends downward from within the cylinder serving as a pipe fitting cylinder 908** at the lower edge of the cylinder.

Figure 60:
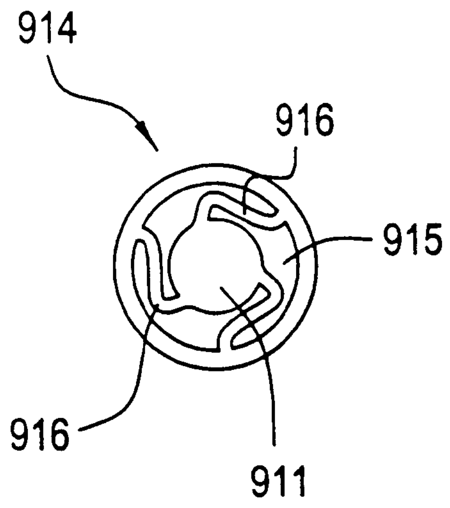
FIG. 60 is a plan view illustrating a suction valve member used in the container according to the present invention.

The suction valve 907 is formed as a self-closing valve in which a valve hole 910 is elastically closed by a valve member 911. In the illustrative embodiment, an inward flange 912 is formed on the inner surface of the cylinder bottom, and a recessed groove 913 is formed along the upper surface of a middle portion between the outer peripheral portion of the flange and the inner peripheral portion thereof. Then, a short cylinder extending from the outer periphery of the valve member 914 is set into the recessed groove, resisting the elasticity. In the valve member, the central portion of the upper wall which closes the upper surface of the short cylinder is formed as a valve member 911, and the valve hole formed as a flange hole is closed by putting the outer peripheral portion of the valve member on the upper surface of the inner peripheral portion of the inward flange 912. Then, a plurality of holes 915 are, as illustrated in FIG. 60, holed in the upper wall portion between the outer peripheral portion of the valve member and the inner surface of the upper edge of the short cylinder, thus forming a plural leg pieces 916 . . . on the upper wall portions between the equi-holes. The suction valve is so provided as to open only when the interior of the cylinder is negative-pressurized with an ascent of the operating member while a discharge valve which will be mentioned alter remains closed, and other structures may be taken as far as it is provided in this way.

A spiral tube member 920 is fitted into the already-described spiral tube fitting cylinder 906 and has a female thread cylinder 921 so attached to the inner surface of the fitting cylinder 906 as to be unrotatably. The spiral tube fitting cylinder 906 is caught by the cylinder 921 and an engagement cylinder 922 extending downward from the top plate.

An operating member 930 is erected from within the above cylinder 903 by biasing it upward with a coil spring 925. The operating member 930 includes a push-down head, a stem, a lower member and a cylindrical piston.

The push-down head 931 is constructed such that a stem fitting cylinder 932 extends downward from the top wall, the proximal edge of a nozzle hole 933 opens to the inner surface of a middle part of the stem fitting cylinder thereof, a nozzle 934 protrudes slightly outward obliquely, the nozzle tip is bent downward outward, and the stem fitting cylinder lower portion is so provided as to be helically fitted to the inner surface of the above female thread cylinder 921.

A stem 935 is structured such that a cylindrical portion 936 is fixedly attached to the interior of the lower portion of the stem fitting cylinder 932, and a small-diameter cylinder 938 extends downward from the lower edge of the cylindrical portion through a flange 937. The cylindrical portion is inserted into a female thread cylinder 921 of the above spiral tube and erects upward from within the cylinder 903.

A lower member 940 is constructed in such a way that the upper portion thereof is fixedly fitted to the interior of the lower portion of the stem cylindrical portion 936, a passageway forming groove 941 is perpendicularly formed in the outer surface, and a large-diameter board-like portion 943 is provided at the lower edge of a bar-like portion 942. The bar-like portion is formed in cross in cross-section. According to the illustrative embodiment, a small outside-diameter portion 943*a* is formed on the outer periphery of the upper edge portion of the board-like portion 943 through an upward stepped portion, and a discharge valve 944 is constructed of the small outside-diameter portion and a middle cylindrical lower edge of the cylindrical piston, which will be described later. An outer cylinder 945 extends from the outer periphery of the board-like portion, a presser bar 946 extends from the central portion thereof, and a middle cylinder 947 extends from the middle portion, respectively. When pushing down the operating member 930 and spirally fastening the above male thread cylinder to the female thread cylinder 921, the lower edge of the presser bar forcibly closes the suction valve 907 while contacting the upper surface of the valve member 911, and further the lower edge of the middle cylinder 947 presses the upper edge outer peripheral portion of the valve member. A plurality of engagement elements 948 are formed on the outer surface of the outer cylinder, and the tips thereof are made close to the inner wall surface of the cylinder, thereby preventing a lateral deflection of the lower part of the lower member 940. The upper portion of the coil spring 925 is secured between the outer cylinder 945 and the middle cylinder 947, and, besides, the lower edge of the spring is press-fitted to the outer peripheral portion of the inward flange 912, thus biasing the operating member 930 upward.

A cylindrical piston 950 is formed in a triple-cylindrical shape connected through a flange, a inner cylindrical portion 951 thereof is slidably attached to the outer surface of the bar-like portion 942, the outer surface of the upper portion of the middle cylindrical portion 952 is slidably fitted to the inner surface of the small-diameter cylinder 938, and the outer surface of an outer cylindrical portion 953 is likewise fitted to the inner wall surface of the cylinder 903. Further, the plower edge of the middle cylindrical portion 952 is provided to close the discharge valve 944 formed by water-tightly attaching to the outer surface of the small outside-diameter portion 943*a* of the above board-like portion 943 when the bar-like portion 942 is raised with respect to the cylindrical piston 950 and to negative-pressurize the interior of the cylinder chamber disposed under the board-like portion 943 with an ascent of the operating member 930. A proper number of engagement pieces 954 are provided between an upper half of the middle cylindrical portion 952 and an upper half of the outer cylindrical portion 953, and an upper limit of the cylindrical piston 950 is determined with respect to the small-diameter cylinder 938 while the lower edge of the small-diameter cylinder 938 contacts the upper edge surface of the engagement pieces. The interior of the upper part communicates with the passageway forming groove 941.

A stroke of the cylindrical piston 950 and an inside diameter of the small-diameter cylinder 938 with respect to the stem 935 and the lower member 940 may be determined corresponding to a liquid quantity requiring a return from within the nozzle hole in order to prevent the liquid dropping out of the nozzle tip immediately after the end of the liquid discharge.

According to the thus constructed present invention, the upper part of the bar-like portion 942 of the lower member 940 is fixed to the interior of the cylindrical portion of the stem 935, the lower member 940 including the large-diameter board portion 943 at its lower edge and formed perpendicularly with the passageway forming groove 941 in its outer surface. Then, the cylindrical piston 950 is so attached to the outer surface of the bar-like portion thereof as to be vertically movable, and the upper part of the middle cylindrical portion 952 of the cylindrical piston is water-tightly fitted into the small-diameter cylinder 938 extending downward from the lower edge of the stem cylindrical portion through the outward flange 907. Then, the interior of the upper part of the middle cylindrical portion communicates with the passageway forming groove 941, and, thereafter, the discharge valve 944 is constructed of the outer peripheral part of the board-like portion 943 and the lower edge part of the middle cylindrical portion 952. Hence, it follows that a capacity of the above liquid passageway portion during closing of the discharge valve 944 constructed by making the loser edge part of the middle cylindrical portion of the cylindrical piston contact with the outer peripheral part of the board-like portion 943 of the lower member 940 when the operating member is raised is larger than a capacity of the liquid passageway portion from the lower edge of the cylindrical piston 950 up to the upper edge of the stem 935 when the operating member is pushed down. Also, the suction valve 907 keeps the closed state till the discharge valve 944 is closed, and, therefore, it follows that the intra nozzle hole is returned into the stem by the negative pressure caused due to the increase in the capacity. As a result, the liquid leakage from the nozzle tip can be prevented. Further, the capacity in the liquid passageway portion is increased or reduced depending on the slide of the cylindrical piston 950 in the up-and-down directions, in which the upper part of the middle cylindrical portion 952 is fitted to the inner wall surface of the small-diameter cylinder 938 of the stem. Consequently, as in the second prior art described earlier, there is produced an effect wherein the intra nozzle hole liquid can be returned simply by pushing down the cylindrical piston by the stroke with respect to the stem without pushing the operating member deeply down to the lower part.

Industrial Applicability

The liquid jetting pump according to the present invention can be, because of its having been improved as discussed above, utilized suitably for jetting a variety of liquids ranging from a liquid cosmetic material and is therefore high in terms of the applicability.

What is claimed is:

1. A liquid jetting pump comprising:

a mounting cap fitted to a container neck portion;

a cylinder fixed to a container through said cap and including a suction valve provided in a lower edge part extending downward into said container, said suction valve including a valve member always biased in a valve hole closing direction by a resilient member, a bar-like protrusion protruding above a top outer wall of the fixed cylinder;

a stem which has an annular piston fitted to an interior of said cylinder, and protruding from a lower part of an outer periphery so as to be vertically movable in an upward-biased state;

a push-down head, with a nozzle, disposed in continuation from an upper edge of said stem and vertically movable above said mounting cap; and a discharge valve provided with a valve member, for closing a valve hole formed in an inner upper part of said stem and being vertically movable by a liquid pressure, a vertical liquid passageway being defined in the stem between the nozzle and the valve hole, a liquid within said container being sucked into said cylinder through said suction valve, and a liquid within said cylinder being jetted out of said nozzle through said discharge valve from said stem by vertically moving a vertically movable member constructed of said stem and said push-down head.

2. The liquid jetting pump of claim 1, wherein a vertical stroke of said discharge valve member is regulated so that Vb−Vc is equal to or larger than Va, wherein Va is the volumetric capacity of said nozzle, Vb is the volumetric capacity of the liquid passageway where said discharge valve member is vertically movable, and Vc is the volume of said discharge valve member.

3. The liquid jetting pump of claim 1, wherein said suction valve member is a ball-like suction valve member.

4. The liquid jetting pump of claim 3, further comprising a coil spring provided between the fixed cylinder and the ball-like suction valve member, the coil spring serving as the resilient member biasing the valve member in a valve hole closing direction.

5. The liquid jetting pump of claim 4, wherein a lower end of the coil spring is press-fitted onto an upper surface of the ball-like suction valve member.

6. The liquid jetting pump of claim 4, wherein an upper end of the coil spring is secured to an outer periphery of a bar-like protrusion protruding below the fixed cylinder.

7. The liquid jetting pump of claim 1, wherein when the stem is pushed down, an inner peripheral surface of the stem is lightly fitted to the outside periphery of the bar-like protrusion.

8. The liquid jetting pump of claim 1, wherein the nozzle has a proximal end portion that extends obliquely upward to a tip that descends obliquely.

9. The liquid jetting pump of claim 1, wherein a vertical stroke of the discharge valve member is at least 10 mm.

10. A liquid jetting pump comprising:

a mounting cap fitted to a container neck portion;

a cylinder fixed to a container through said cap and including a suction valve provided in a lower edge part extending downward into said container, said suction valve including a valve member always biased in a valve hole closing direction by a resilient member;

a stem which has an annular piston fitted to an interior of said cylinder, and protruding from a lower part of an outer periphery so as to be vertically movable in an upward-biased state;

a push-down head, with a nozzle, disposed in continuation from an upper edge of said stem and vertically movable above said mounting cap; and a discharge valve provided with a valve member, for closing a valve hole formed in an inner upper part of said stem and being vertically movable by a liquid pressure, a vertical liquid passageway being defined in the stem between the nozzle and the valve hole, a liquid within said container being sucked into said cylinder through said suction valve, and a liquid within said cylinder being jetted out of said nozzle through said discharge valve from said stem by vertically moving a vertically movable member constructed of said stem and said push-down head, wherein a vertical stroke of said discharge valve member is regulated so that Vb−Vc is equal to or larger than Va, wherein Va is the volumetric capacity of said nozzle, Vb is the volumetric capacity of the liquid passageway where said discharge valve member is vertically movable, and Vc is the volume of said discharge valve member.

11. The liquid jetting pump of claim 10, wherein said valve member is a ball-like suction valve member.

12. The liquid jetting pump of claim 11, further comprising a coil spring provided between the fixed cylinder and the ball-like suction valve member, the coil spring serving as the resilient member biasing the valve member in a valve hole closing direction.

13. The liquid jetting pump of claim 12, wherein a lower end of the coil spring is press-fitted onto an upper surface of the ball-like suction valve member.

14. The liquid jetting pump of claim 12, wherein an upper end of the coil spring is secured to an outer periphery of a bar-like protrusion protruding below the fixed cylinder.

15. The liquid jetting pump of claim 10, wherein a bar-like protrusion protrudes above a top outer wall of the fixed cylinder.

16. The liquid jetting pump of claim 15, wherein when the stem is pushed down, an inner peripheral surface of the stem is lightly fitted to the outside periphery of the bar-like protrusion.

17. The liquid jetting pump of claim 16, wherein the nozzle has a proximal end portion that extends obliquely upward to a tip that descends obliquely.

18. The liquid jetting pump of claim 10, wherein a vertical stroke of the discharge valve member is at least 10 mm.

* * * * *